US012707386B2

(12) United States Patent
Kim et al.

(10) Patent No.: US 12,707,386 B2
(45) Date of Patent: Aug. 11, 2026

(54) METHOD AND DEVICE FOR REDUCING POWER CONSUMPTION OF TERMINAL IN WIRELESS COMMUNICATION SYSTEM

(71) Applicant: Samsung Electronics Co., Ltd., Gyeonggi-do (KR)

(72) Inventors: Donggun Kim, Gyeonggi-do (KR); Taehyoung Kim, Gyeonggi-do (KR); Sangbum Kim, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 371 days.

(21) Appl. No.: 17/799,072

(22) PCT Filed: Feb. 10, 2021

(86) PCT No.: PCT/KR2021/001821
§ 371 (c)(1),
(2) Date: Aug. 11, 2022

(87) PCT Pub. No.: WO2021/162470
PCT Pub. Date: Aug. 19, 2021

(65) Prior Publication Data

US 2023/0119379 A1 Apr. 20, 2023

(30) Foreign Application Priority Data

Feb. 14, 2020 (KR) ........................ 10-2020-0018613
Feb. 19, 2020 (KR) ........................ 10-2020-0020710
(Continued)

(51) Int. Cl.
*H04W 52/02* (2009.01)
*H04W 72/23* (2023.01)
*H04W 76/28* (2018.01)

(52) U.S. Cl.
CPC ... *H04W 52/0216* (2013.01); *H04W 52/0229* (2013.01); *H04W 72/23* (2023.01); *H04W 76/28* (2018.02)

(58) Field of Classification Search
CPC ......... H04W 52/0216; H04W 52/0229; H04W 76/28; H04W 72/23
See application file for complete search history.

(56) References Cited

U.S. PATENT DOCUMENTS 10,652,826 B2 5/2020 Lin et al.
11,405,866 B2 8/2022 Kim et al.
(Continued)

FOREIGN PATENT DOCUMENTS

KR 10-2020-0127536 11/2010
WO WO 2019/182428 9/2019

OTHER PUBLICATIONS

Samsung, "PDCCH-based Power Saving Signal/Channel", R1-1906980, 3GPP TSG RAN WG1 #97, May 13-17, 2019, 12 pages.
(Continued)

*Primary Examiner* — Robert C Scheibel
*Assistant Examiner* — Sang C Lee
(74) *Attorney, Agent, or Firm* — The Farrell Law Firm, P.C.

(57) ABSTRACT

The disclosure relates to a communication technique that merges IoT technology with a 5G communication system for supporting higher data transmission rates than 4G systems, and a system therefor. The disclosure may be applied to intelligent services (for example, smart homes, smart buildings, smart cities, smart cars or connected cars, healthcare, digital education, retail business, security and safety-related services, etc.) on the basis of 5G communication technology and IoT-related technology. In addition, the disclosure pro-
(Continued)

vides a method and device for reducing the power consumption of a UE in a wireless communication system.

14 Claims, 12 Drawing Sheets

(30) Foreign Application Priority Data

Apr. 9, 2020 (KR) ........................ 10-2020-0043549
Oct. 16, 2020 (KR) ........................ 10-2020-0134414

(56) References Cited

U.S. PATENT DOCUMENTS

| | | | | |
|---|---|---|---|---|
| 11,477,731 | B2 * | 10/2022 | Hwang | H04L 1/1822 |
| 11,490,334 | B2 * | 11/2022 | Zhou | H04L 1/1614 |
| 2020/0092814 | A1 * | 3/2020 | Zhou | H04W 52/0235 |
| 2021/0377854 | A1 * | 12/2021 | Hwang | H04W 52/0216 |
| 2022/0191793 | A1 * | 6/2022 | Murray | H04W 52/0232 |
| 2022/0225139 | A1 * | 7/2022 | Seo | H04L 5/0053 |
| 2022/0287071 | A1 * | 9/2022 | Seo | H04L 5/0094 |
| 2022/0295405 | A1 * | 9/2022 | Seo | H04W 52/02 |
| 2022/0312325 | A1 * | 9/2022 | Turtinen | H04W 74/0841 |
| 2022/0338119 | A1 * | 10/2022 | Seo | H04W 72/044 |
| 2022/0394614 | A1 * | 12/2022 | Hwang | H04L 1/1822 |

OTHER PUBLICATIONS

LG Electronics, "Discussions on Triggering Adaptation of UE Power Consumption Characteristics", R1-1900600, 3GPP TSG RAN WG1 Ad-Hoc Meeting 1901, Jan. 21-25, 2019, 7 pages.

European Search Report dated Jun. 7, 2023 issued in counterpart application No. 21753347.0-1206, 10 pages.

PCT/ISA/210 Search Report issued on PCT/KR2021/001821, Apr. 23, 2021 p. 5.

PCT/ISA/237 Written Opinion issued on PCT/KR2021/001821, Apr. 23, 2021, p. 4.

Samsung, "Remaining issues for PDCCH-based power saving signal/channel", R1-1912486, 3GPP TSG RAN WG1 #99, Reno, USA, Nov. 8, 2019, p. 9.

Nokia et al., "On PDCCH-based power saving techniques", R1-1913111, 3GPP TSG RAN WG1 #99, Reno, USA, Nov. 8, 2019, p. 14.

CATT, "Summary of PDCCH-based Power Saving Signal/Channel", R1-1913281, 3GPP TSG RAN WG1 #99, Reno, USA, Nov. 19, 2019, p. 38.

Panasonic, "Discussion on PDCCH-based power saving signal/channel (PoSS)", R1-1913050, 3GPP TSG RAN WG1 #99, Reno, USA, Nov. 8, 2019, p. 10.

Korean Office Action dated Mar. 9, 2026 issued in counterpart application No. 10-2020-0134414, 11 pages.

* cited by examiner

FIG. 2

1 frame [200]

1 subframe [201]

slot [202]

slot [203]

DRX group 1 for cell group 1 (701)
DRX group 2 for cell group 2 (702)
DRX cycle (703)
onDuration timer 2 (704)
Inactivity timer 1 (705)
onDuration timer 2 (706)
Inactivity timer 2 (707)
(708)
(709)
(710)
(711)
(712)
time
time
Monitoring occasions for DCI format 2_6

FIG. 10

Activated SCell

Deactivated SCell

1001 Normal BWP

1002 Dormant BWP

1003 No activated BWP

METHOD AND DEVICE FOR REDUCING POWER CONSUMPTION OF TERMINAL IN WIRELESS COMMUNICATION SYSTEM

PRIORITY

This application is a National Phase Entry of PCT International Application No. PCT/KR2021/001821, which was filed on Feb. 10, 2021, and claims priority to Korean Patent Application Nos. 10-2020-0018613, 10-2020-0020710, 10-2020-0043549, and 10-2020-0134414, which were filed on Feb. 14, 2020, Feb. 19, 2020, Apr. 9, 2020, and Oct. 16, 2020, respectively, the entire content of each of which is incorporated herein by reference.

TECHNICAL FIELD

The disclosure relates to a method and a device for reducing power consumed by a terminal in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post long term evolution (post LTE)" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

It has become possible to provide various services as a result of the above description and development of wireless communication systems, there is a need for a scheme for efficiently providing such services. Particularly, there is a need for a communication method which saves power of a terminal in order to provide services to a user for a longer period of time.

DISCLOSURE OF INVENTION

Technical Problem

A disclosed embodiment may provide a method and a device for saving power of a terminal in a wireless communication system.

Solution to Problem

In order to solve the above-mentioned problems, a method for controlling power by a terminal in a wireless communication system according to the disclosure may include: receiving power saving signal (POSS) configuration information from a base station; monitoring a physical downlink control channel (PDCCH) regarding a POSS based on the POSS configuration information: receiving downlink control information (DCI) corresponding to the POSS through the PDCCH; and performing power saving indicated by the DCI.

Advantageous Effects of Invention

A disclosed embodiment may provide a method and a device for effectively saving power of a terminal in a wireless communication system.

BRIEF DESCRIPTION OF DRAWINGS

FIG. 2 is a diagram illustrating a structure of a frame, a sub-frame, and a slot of a 5G system.

FIG. 6 is a diagram illustrating an example of a DRX operation of a 5G system.

FIG. 10 is a diagram illustrating an example of an operation of a dormant bandwidth part according to an embodiment of the disclosure.

MODE FOR THE INVENTION

Figure 1:
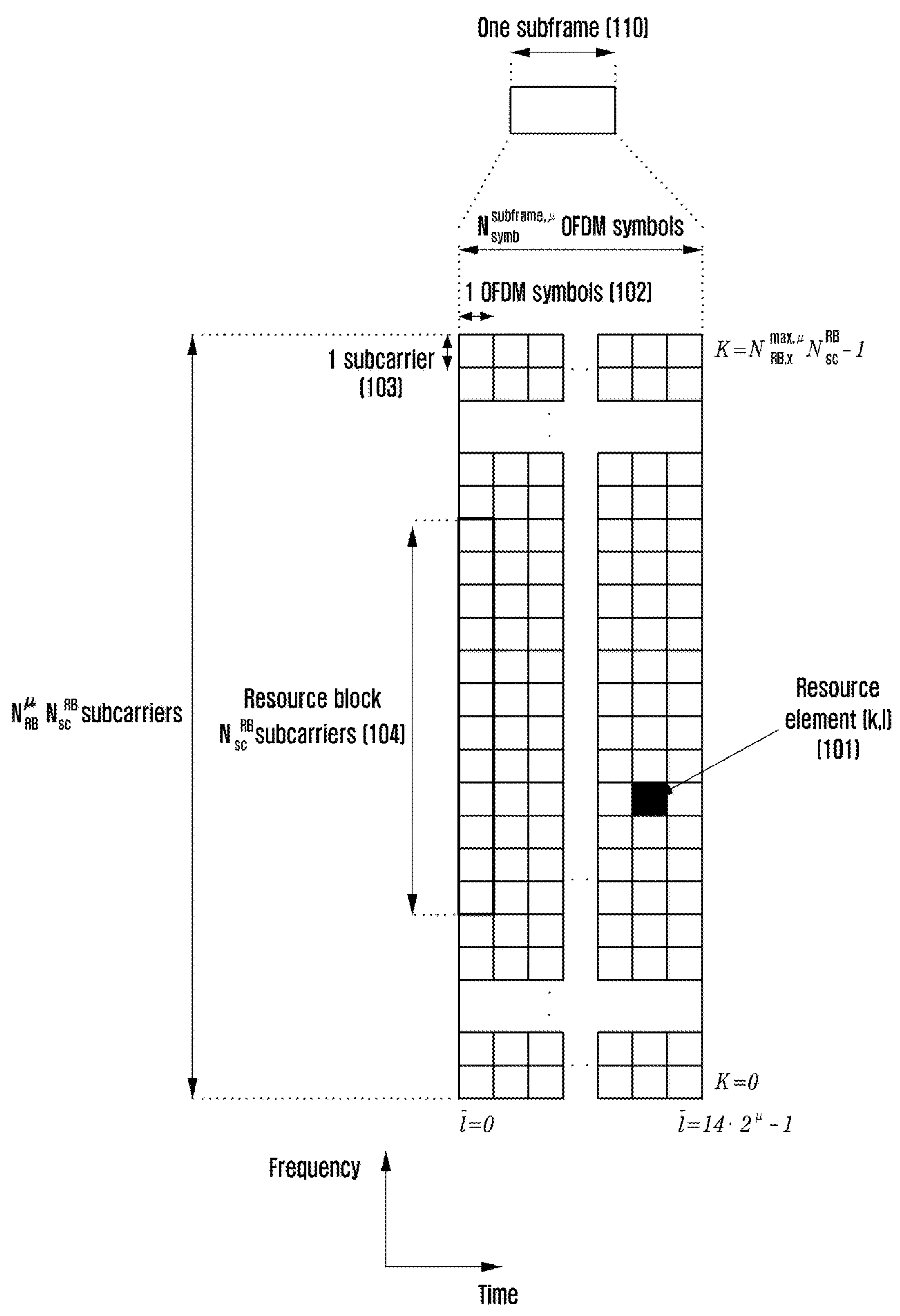
FIG. 1 is a diagram illustrating a basic structure of a time-frequency domain of a 5G system.

Hereinafter, embodiments of the disclosure will be described in detail with reference to the accompanying drawings.

In describing the embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE, LTE-A, or 5G systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system is advancing to a broadband wireless communication system for providing high-speed and high-quality packet data services using communication standards, such as high-speed packet access (HSPA) of 3GPP, LTE (long-term evolution or evolved universal terrestrial radio access (E-UTRA)), LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery lifetime, such as 10 to 15 years, because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and may also require a design for assigning a large number of resources in a frequency band in order to secure reliability of a communication link.

Three services in 5G, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the three services described above.

Hereinafter, a frame structure of the 5G system will be described in more detail with reference to the drawings.

FIG. 1 is a diagram illustrating a basic structure of a time-frequency domain, which is a radio resource domain in which data or control channel is transmitted in a 5G communication system.

The horizontal and vertical axes of FIG. 1 represent the time domain and the frequency domain, respectively. The basic unit of resource in the time domain and frequency domain is a resource element (RE) 101, which may be defined as one orthogonal frequency division multiplexing (OFDM) symbol 102 on the time axis and may be defined as one subcarrier 103 on the frequency axis. In the frequency domain, $$N_{sc}^{RB}$$

(e.g., 12) consecutive REs may configure one resource block (RB) 104.

Figure 2:
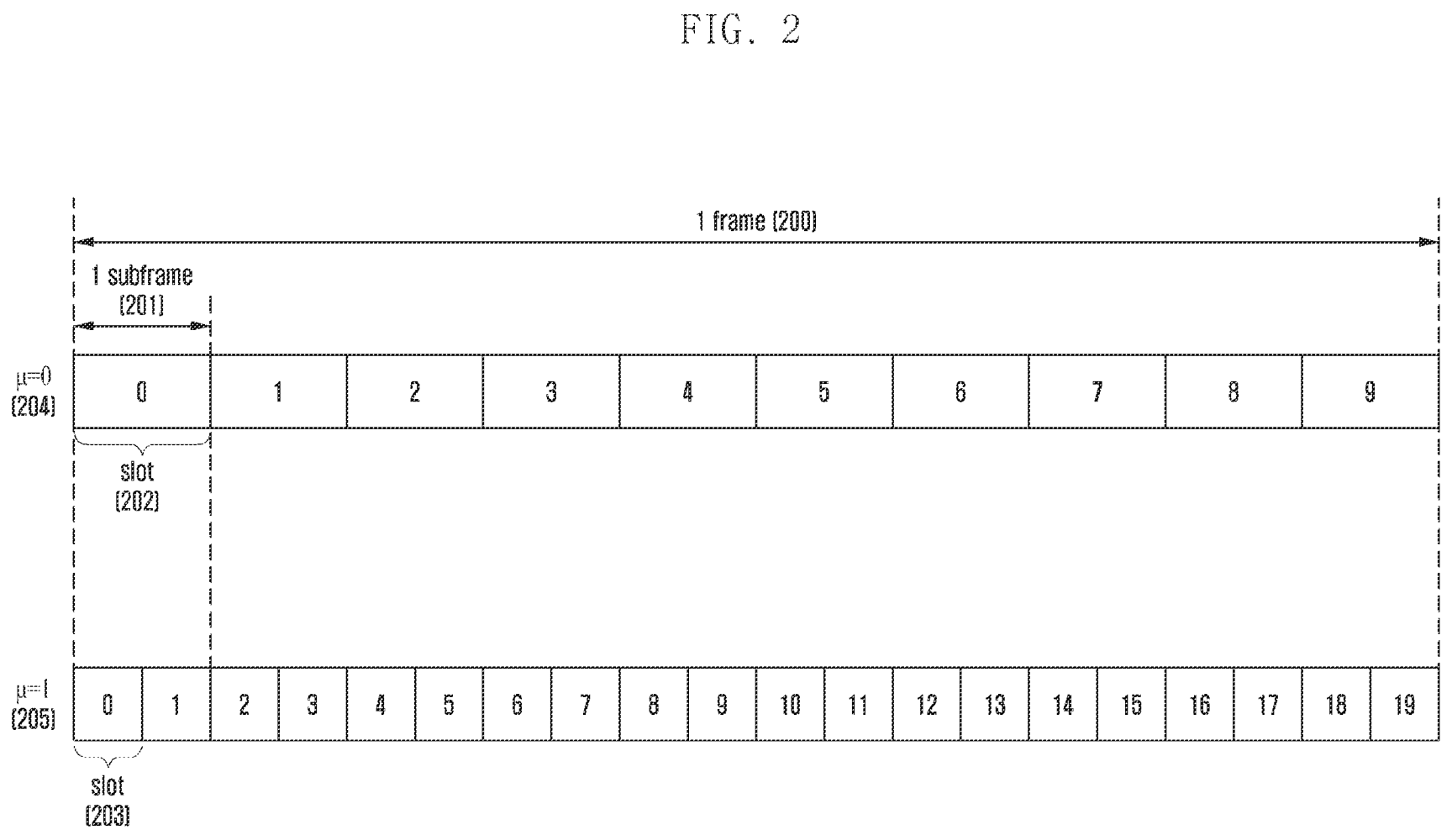

FIG. 2 is a diagram illustrating a slot structure considered in a 5G communication system.

FIG. 2 illustrates an example of a structure of a frame 200, a subframe 201, and a slot 202. One frame 200 may be defined as 10 ms. One subframe 201 may be defined as 1 ms, and accordingly, one frame 200 may consist of a total of 10 subframes 201. One slot 202 and 203 may be defined as 14 OFDM symbols (that is, the number of symbols per slot $$\left(N_{symb}^{slot}\right) = 14).$$

One subframe 201 may consist of one or more slots 202 and 203, and the number of slots 202 and 203 per one subframe 201 may vary according to a set value μ 204 and 205 for the subcarrier spacing. In an example of FIG. 2, a case where the subcarrier spacing set value μ=0 204 and μ=1 205 is illustrated. In a case where μ=0 204, one subframe 201 may consist of one slot 202, and in a case where μ=1 205, one subframe 201 may consist of two slots 203. That is, depending on the set value p for the subcarrier spacing, the number of slots per one subframe $$\left(N_{slot}^{subframe,\mu}\right)$$

may vary, and accordingly, the number of slots per one frame $$\left(N_{slot}^{frame,\mu}\right)$$

may vary. The $$\left(N_{slot}^{subframe,\mu}\right)$$

and $$\left(N_{slot}^{frame,\mu}\right)$$

according to each subcarrier spacing set value p may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a bandwidth part (BWP) configuration in a 5G communication system will be described in detail with diagrams.

Figure 3:
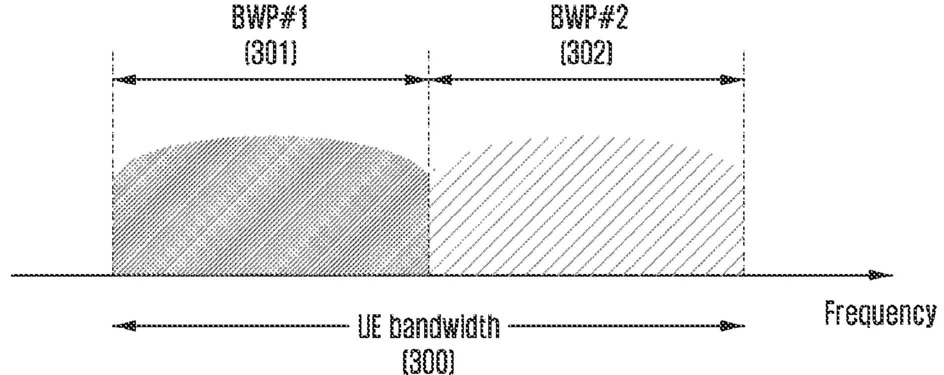
FIG. 3 is a diagram illustrating an example of a bandwidth part configuration of a 5G system.

FIG. 3 is a diagram illustrating an example of configuration for a bandwidth part of a 5G communication system.

FIG. 3 illustrates an example in which a UE bandwidth 300 is configured to two bandwidth parts, namely, a bandwidth part #1 (BWP #1) 301 and a bandwidth part #2 (BWP #2) 302. The base station may configure one or more bandwidth parts to the UE, and may configure information below for each bandwidth part.

TABLE 2

```
BWP ::=                      SEQUENCE {
bwp-Id                                 BWP-Id,
 (bandwidth part identifier)
locationAndBandwidth         INTEGER (1..65536),
 (bandwidth part location)
subcarrierSpacing            ENUMERATED {n0, n1, n2, n3,
n4, n5},
 (subcarrier spacing)
cyclicPrefix                        ENUMERATED { extended
}
 (cyclic prefix)
}
```

Not limited to the above example, and various parameters related to bandwidth part may be configured in the UE in addition to the above-described configuration information. The above-described information may be delivered by the base station to the UE through higher layer signaling, for example, radio resource control (RRC) signaling. At least one bandwidth part among one or more configured bandwidth parts may be activated. Whether to activate the configured bandwidth part may be semi-statically delivered from the base station to the UE through RRC signaling or may be dynamically delivered through downlink control information (DCI).

According to some embodiments, the UE before the radio resource control (RRC) connection may receive a configured initial bandwidth part (initial BWP) for the initial connection from the base station through the master information block (MIB). More specifically, in the initial access step, the UE may receive the configuration information on the control resource set (CORESET) through which PDCCH for receiving system information (may correspond to remaining system information; RMSI or system information block 1; SIB1) required for initial access may be transmitted and the search space through the MIB. The control resource set and the search space configured through the MIB may be regarded as identifier (identity, ID) 0, respectively. The base station may notify the UE of configuration information such as frequency allocation information, time allocation information, and numerology for the control resource set #0 through the MIB. In addition, the base station may notify the UE through the MIB of configuration information on the monitoring period and occasion for the control resource set #0, that is, configuration information on the search space #0. The UE may regard the frequency domain configured as the control resource set #0 obtained from the MIB as an initial bandwidth part for initial access. In this case, the identifier (ID) of the initial bandwidth part may be regarded as 0.

The configuration for the bandwidth part supported by the 5G may be used for various purposes.

According to some embodiments, in a case where the bandwidth supported by the UE is narrower than the system bandwidth, this may be supported through the bandwidth part configuration. For example, the base station may configure the frequency location (configuration information 2) of the bandwidth part to the UE, so that the UE may transmit and receive data at a specific frequency location within the system bandwidth.

In addition, according to some embodiments, for the purpose of supporting different numerologies, the base station may configure a plurality of bandwidth parts to the UE. For example, to support both data transmission and reception by using a subcarrier spacing of 15 kHz and a subcarrier spacing of 30 kHz to an arbitrary UE, two bandwidth parts may be configured as the subcarrier spacing of 15 kHz and 30 kHz, respectively. Different bandwidth parts may be frequency division multiplexed, and when data is transmitted/received with a specific subcarrier space, a bandwidth part configured with the corresponding subcarrier space may be activated.

In addition, according to some embodiments, for the purpose of reducing power consumption of the UE, the base station may configure bandwidth parts having different bandwidths to the UE. For example, in a case where the UE supports a very wide bandwidth, for example, a bandwidth of 100 MHz and always transmits and receives data with the corresponding bandwidth, very large power consumption may be caused. Particularly, it is very inefficient in terms of power consumption for the UE to monitor the downlink control channel for an unnecessarily large bandwidth of 100 MHz in a situation in which there is no traffic. For reducing power consumption of the UE, the base station may configure a relatively narrow bandwidth part to the UE, for example, a bandwidth part of 20 MHz. In the absence of traffic, the UE may monitor in a bandwidth part of 20 MHz, and when data are generated, the UE may transmit/receive data with the bandwidth part of 100 MHz according to the indication of the base station.

In the method of configuring the bandwidth part, the UEs before the RRC connection may receive the configuration information on the initial bandwidth part through the master information block (MIB) in the initial access step. More specifically, the UE may receive from the MIB of the physical broadcast channel (PBCH), a configured control resource set (CORESET) for a downlink control channel through which downlink control information (DCI) scheduling system information block (SIB) may be transmitted. The bandwidth of the control resource set configured through the MIB may be regarded as an initial bandwidth part, and through the configured initial bandwidth part, the UE may receive a physical downlink shared channel (PDSCH) through which the SIB is transmitted. In addition to the purpose of receiving the SIB, the initial bandwidth part may be utilized for other system information (OSI), paging, and random access.

In a case where one or more bandwidth parts are configured to the UE, the base station may indicate the UE to change the bandwidth part by using the bandwidth part indicator field in DCI. As an example, in FIG. 3, in a case where the currently activated bandwidth part of the UE is the bandwidth part #1 301, the base station may indicate to the UE the bandwidth part #2 302 as a bandwidth part indicator in DCI, and the UE may change the bandwidth part to the bandwidth part #2 302 indicated by the bandwidth part indicator in the received DCI.

As described above, because the DCI-based bandwidth part change may be indicated by DCI scheduling PDSCH or PUSCH, in a case where the UE receives the request for changing the bandwidth part, the UE should be able to receive or transmit the PDSCH or PUSCH scheduled by the corresponding DCI without difficulty in the changed bandwidth part. To this end, the standard specifies the requirements for the delay time ($T_{BWP}$) required when changing the bandwidth part, and the requirements may be defined, for example, as illustrated below.

TABLE 3

| μ | NR Slot length (ms) | BWP switch delay $T_{BWP}$ (slots) Type 1[Note 1] | Type 2[Note 1] |
|---|---|---|---|
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The requirement for the bandwidth part change delay time supports type 1 or type 2 according to the capability of the UE. The UE may report the supportable bandwidth part delay time type to the base station.

In a case where the UE receives the DCI including the bandwidth part change indicator in slot n according to the requirement for the bandwidth part change delay time described above, the UE may complete the change to the new bandwidth part indicated by the bandwidth part change indicator at a time point not later than slot n+$T_{BWP}$, and transmit and receive the data channel scheduled by the DCI in the changed new bandwidth part. In a case where the base station intends to schedule the data channel with a new bandwidth part, the time domain resource allocation for the data channel may be determined in consideration of the bandwidth part change delay time ($T_{BWP}$) of the UE. That is, when the base station schedules a data channel with a new bandwidth part, in a method of determining time domain resource allocation for the data channel, the base station may schedule the corresponding data channel after the bandwidth part change delay time. Accordingly, the UE may not expect that the DCI indicating the bandwidth part change indicates a slot offset (K0 or K2) value smaller than the bandwidth part change delay time ($T_{BWP}$).

If the UE receives DCI (e.g., DCI format 1_1 or 0_1) indicating a bandwidth part change, the UE may not perform any transmission or reception during the time interval from the third symbol of the slot in which the PDCCH including the corresponding DCI is received to the start point of the slot indicated by the slot offset (K0 or K2) value indicated by the time domain resource allocation indicator field in the corresponding DCI. For example, if the UE receives a DCI indicating a bandwidth part change in slot n, and the slot offset value indicated by the DCI is K, the UE may not perform any transmission or reception from the third symbol of slot n to the previous symbol of slot n+K (i.e., the last symbol of slot n+K−1).

Next, a synchronization signal (SS)/PBCH block in a 5G wireless communication system will be described.

The SS/PBCH block may refer to a physical layer channel block composed of a primary SS (PSS), a secondary SS (SSS), and a PBCH. Specifically, as follows.

- PSS: A signal that serves as a reference of downlink time/frequency synchronization and provides some pieces of information on cell ID.
- SSS: Serves as a reference of downlink time/frequency synchronization, and provides remaining cell ID information not provided by PSS. Additionally, the SSS may serve as a reference signal for demodulation of the PBCH.
- PBCH: Provides essential system information necessary for transmitting and receiving data channel and control channel of the UE. The essential system information may include search space-related control information indicating radio resource mapping information of a control channel, scheduling control information on a separate data channel for transmitting system information, and the like.
- SS/PBCH block: The SS/PBCH block consists of a combination of PSS, SSS, and PBCH. One or a plurality of SS/PBCH blocks may be transmitted within 5 ms, and each transmitted SS/PBCH block may be distinguished by an index.

The UE may detect the PSS and SSS in the initial access stage and may decode the PBCH. The UE may obtain the MIB from the PBCH, and may receive the configured control resource set (CORESET) #0 (which may correspond to a control resource set having a control resource set index of 0) therefrom. The UE may perform monitoring on the control resource set #0, assuming that the selected SS/PBCH block and a demodulation reference signal (DMRS) transmitted from the control resource set #0 have been Quasi co-located (QCL). The UE may receive system information with downlink control information transmitted from the control resource set #0. The UE may obtain random access channel (RACH)-related configuration information required for initial access from the received system information. The UE may transmit a physical RACH (PRACH) to the base station in consideration of the selected SS/PBCH index, and the base station receiving the PRACH may obtain information on the SS/PBCH block index selected by the UE. The base station may recognize which block the UE has selected from each of the SS/PBCH blocks and monitors the control resource set #0 related thereto.

Next, downlink control information (DCI) in the 5G communication system will be described in detail.

In the 5G system, scheduling information on uplink data (or physical uplink shared channel, PUSCH) or downlink data (or physical downlink shared channel, PDSCH) may be delivered from a base station to a UE through DCI. The UE may monitor a DCI format for fallback and a DCI format for non-fallback for PUSCH or PDSCH. The DCI format for fallback may consist of a fixed field predefined between the base station and the UE, and the DCI format for non-fallback may include a configurable field.

The DCI may be transmitted through a physical downlink control channel (PDCCH) after channel coding and modulation process. A cyclic redundancy check (CRC) is attached to the DCI message payload, and the CRC may be scrambled with a radio network temporary identifier (RNTI) corresponding to the identity of the UE. Different RNTIs may be used according to the purpose of the DCI message, for example, UE-specific data transmission, a power control command, or a random access response. That is, the RNTI is not explicitly transmitted, but is included in the CRC calculation process and transmitted. Upon receiving the DCI message transmitted over the PDCCH, the UE identifies the CRC by using the assigned RNTI, and if the CRC identification result is correct, the UE may recognize that the message has been transmitted to the UE.

For example, DCI scheduling a PDSCH for system information (SI) may be scrambled with SI-RNTI. DCI scheduling a PDSCH for a random access response (RAR) message may be scrambled with an RA-RNTI. DCI scheduling a PDSCH for a paging message may be scrambled with a P-RNTI. DCI notifying a slot format indicator (SFI) may be scrambled with an SFI-RNTI. DCI notifying a transmit power control (TPC) may be scrambled with TPC-RNTI. DCI scheduling UE-specific PDSCH or PUSCH may be scrambled with cell RNTI (C-RNTI).

DCI format 0_0 may be used as a fallback DCI for scheduling PUSCH, and in this case, CRC may be scrambled with C-RNTI. DCI format 0_0 in which CRC is scrambled with C-RNTI may include, for example, information as illustrated below.

TABLE 4

| |
|---|
| Identifier for DCI formats - 1 bit<br>The value of this bit field is always set to 0, indicating an UL DCI format<br>Frequency domain resource assignment -<br>$\lceil \log_2(N_{RB}^{UL,BWP}(N_{RB}^{UL,BWP}+1)/2) \rceil$ bits where $N_{RB}^{UL,BWP}$ is defined in subclause 7.3.1.0<br>For PUSCH hopping with resource allocation type 1:<br>$N_{UL\_hop}$ bits are used to indicate the frequency offset according to Subclause 6.3 of [6, TS 38.214], where $N_{UL\_hop} = 1$ if the higher layer |

TABLE 4-continued parameter frequencyHoppingOffsetLists contains two offset values and $N_{UL\_hop}=2$ if the higher layer parameter frequencyHoppingOffsetLists contains four offset values $\lceil \log_2(N_{RB}^{UL,BWP}(N_{RB}^{UL,BWP}+1)/2)\rceil - N_{UL\_hop}$ bits provides the frequency domain resource allocation according to Subclause 6.1.2.2.2 of [6, TS 38. 214]
For non-PUSCH hopping with resource allocation type 1:
$\lceil \log_2(N_{RB}^{UL,BWP}(N_{RB}^{UL,BWP}+1)/2)\rceil$ bits provides the frequency domain resource allocation according to Subclause 6.1.2.2.2 of [6, TS 38. 214]
Time domain resource assignment - 4 bits as defined in Subclause 6.1.2.1 of [6, TS 38.214]
Frequency hopping flag - 1 bit according to Table 7. 3. 1.1.1-3, as defined in Subclause 6.3 of [6, TS 38.214]
Modulation and coding scheme - 5 bits as defined in Subclause 6.1.4.1 of [6, TS 38.214]
New data indicator - 1 bit
Redundancy version - 2 bits as defined in Table 7.3.1.1.1-2
HARQ process number - 4 bits
TPC command for scheduled PUSCH (Transmit Power Control command for scheduled PUSCH) - 2 bits as defined in Subclause 7.1.1 of [5, TS 38. 213] Padding bits, if required.
UL/SUL indicator (Uplink/Supplementary UL indicator) - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise.
The UL/SUL indicator, if present, locates in the last bit position of DCI format 0_0, after the padding bit(s).
If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
If the UL/SUL indicator is not present in DCI format 0_0 and pucch-Config is configured, the corresponding PUSCH scheduled by the DCI format 0_0 is for the UL or SUL for which high layer parameter pucch-Config is configured.
If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used as a non-fallback DCI for scheduling PUSCH, and in this case, CRC may be scrambled with C-RNTI. DCI format 0_1 in which CRC is scrambled with C-RNTI may include, for example, information as illustrated below.

TABLE 5

Identifier for DCI formats - 1 bit
The value of this bit field is always set to 0, indicating an UL DCI format
Carrier indicator - 0 or 3 bits, as defined in Subclause 10.1 of [5, TS38.213].
UL/SUL indicator (Uplink/Supplementary UL indicator) - 0 bit for UEs not configured with supplementaryUplink in ServingCellConfig in the cell or UES configured with supplementaryUplink in ServingCellConfig in the cell but only PUCCH carrier in the cell is configured for PUSCH transmission; otherwise, 1 bit as defined in Table 7.3.1.1.1-1.
Bandwidth part indicator - 0, 1 or 2 bits as determined by the number of UL BWPs. $n_{BWP,RRC}$ configured by higher layers, excluding the initial UL bandwidth part. The bitwidth for this field is determined as $\lceil \log_2(n_{BWP})\rceil$ bits, _where
$n_{BWP}=n_{SWP,RRC}+1$ if $n_{BWP,RRC}\leq 3$, in which case the bandwidth part indicator is equivalent to the ascending order of the higher layer parameter BWP-Id;
otherwise $n_{BWP}=n_{SWP,RRC}$, in which case the bandwidth part indicator is defined in Table 7.3.1.1.2-1;
If a UE does not support active BWP change via DCI, the UE ignores this bit field.
Frequency domain resource assignment - number of bits determined by the following, where $N_{RB}^{ULBWP}$ is the size of the active UL bandwidth part;
$N_{REG}$ bits if only resource allocation type 0 is configured, where $N_{RBG}$ is defined in Subclause 6.1.2.2.1 of [6, TS 38.214],
- $\lceil \log_2(N_{RB}^{UL,BWP}(N_{RB}^{UL,BWP}+1)/2)\rceil$ bits if only resource allocation type 1 is configured, or $\max(\lceil \log_2(N_{RB}^{UL,BWP}(N_{RB}^{UL,BWP}+1)/2)\rceil, N_{RBG})+1$ bits if both resource allocation type 0 and 1 are configured.
If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
For resource allocation type 0, the $N_{RBG}$ LSBs provide the resource allocation as denned in Subclause 6.1.2.2.1 or [6, TS 38.214].
For resource allocation type 1, the $\lceil \log_2(N_{RB}^{UL,BWP}(N_{RB}^{UL,BWP}+1)/2)\rceil$ LSBs provide the resource allocation as follows:
For PUSCH hopping with resource allocation type 1:
$N_{UL\_hop}$ MSB bits are used to indicate the frequency offset according to Subclause 6.3 of [6, TS 38.214], where $N_{UL\_hop}=1$ if the higher layer parameter frequencyHoppingOffsetLists contains two offset values and $N_{UL\_hop}=2$ if the higher layer parameter frequencyHoppingOffsetLists contains four offset values
$\lceil \log_2(N_{RB}^{UL,BWP}(N_{RB}^{UL,BWP}+1)/2)\rceil - N_{UL\_hop}$ bits provides the frequency domain resource allocation according to Subclause 6.1.2.2.2 of [6, TS 38.214]
For non-PUSCH hopping with resource allocation type 1:
$\lceil \log_2(N_{RB}^{UL,BWP}(N_{RB}^{UL,BWP}+1)/2)\rceil$ bits provides the frequency domain resource allocation according to Subclause 6.1.2.2.2 of [6, TS 38.214]
If "Bandwidth part indicator" field indicates a bandwidth part other than the active bandwidth part and it both resource allocation type 0 and 1 are configured for the indicated bandwidth part,
the US assumes resource allocation type 0 for the indicated bandwidth TABLE 5-continued part if the bitwidth of the "Frequency domain resource assignment" field of the active bandwidth part is smaller than the bitwidth of the "Frequency domain resource assignment" field of the indicated bandwidth part.
Time domain resource assignment - 0, 1, 2, 3, or 4 bits as defined in Subclause 6.1.2.1 of [6, TS38.214]. The bitwidth for this field is determined as $\lceil \log_2(I) \rceil$ bits, where I is the number of entries in the higher layer parameter pusch-TimeDomainAllocationList if the higher layer parameter is configured; otherwise I is the number of entries in the default table.
Frequency hopping flag - 0 or 1 bit:
0 bit if only resource allocation type 0 is configured or if the higher layer parameter frequencyHopping is not configured;
1 bit according to Table 7.3.1.1.1-3 otherwise, only applicable to resource allocation type 1, as defined in Subclause 6.3 of [6, TS 38.214].
Modulation and coding scheme - 5 bits as defined in Subclause 6.1.4.1 of [6, TS 38.214]
New data indicator - 1 bit
Redundancy version - 2 bits as defined in Table 7.3.1.1.1-2
HARQ process number - 4 bits
$1^{st}$ downlink assignment index - 1 or 2 bits:
1 bit for semi-static HARQ-ACK codebook;
2 bits for dynamic HARQ-ACK codebook.
$2^{nd}$ downlink assignment index - 0 or 2 bits:
2 bits for dynamic HARQ-ACK codebook with two HARQ-ACK sub-codebooks;
0 bit otherwise.
- TPC command for scheduled PUSCH (Transmit Power Control command for scheduled PUSCH) - 2 bits as defined in Subclause 7.1.1 of [5, TS38.213]

- $\left\lceil \log_2\left( \sum_{k=1}^{\min(L_{max}, N_{SRS})} \binom{N_{SRS}}{k} \right) \right\rceil$ or $\lceil \log_2(N_{SRS}) \rceil$ bits, where $NSRS$ is the number of configured SRS resources in the SRS resource set associated with the higher layer parameter usage of value 'codeBook' or 'nonCodeBook', $\left\lceil \log_2\left( \sum_{k=1}^{\min(L_{max}, N_{SRS})} \binom{N_{SRS}}{k} \right) \right\rceil$ bits according to Tables 7.3.1.1.2-28/29/30/31 if the higher layer parameter txConfig = nonCodebook, where $N_{SRS}$ is the number of configured SRS resources in the SRS resource set associated with the higher layer parameter usage of value 'nonCodeBook' and
if UE supports operation with maxMIMO-Layers and the higher layer parameter maxMIMO-Layers of PUSCH-ServingCellConfig of the serving cell is configured, $L_{max}$ is given by that parameter
otherwise, $L_{max}$ is given by the maximum number of layers for PUSCH supported by the UE for the serving cell for non-codebook based operation.
$\lceil \log_2(N_{SRS}) \rceil$ bits according to Tables 7.3.1.1.2-32 if the higher layer parameter txConfig = codebook, where $N_{SRS}$ the number of configured SRS resources in the SRS resource set associated with the higher layer parameter usage of value 'codeBook'.
Precoding information and number of layers - number of bits determined by the following:
0 bits if the higher layer parameter txConfig = nonCodeBook;
0 bits for 1 antenna port and if the higher layer parameter txConfig = codebook;
4, 5, or 6 bits according to Table 7.3.1.1.2-2 for 4 antenna ports, if txConfig = codebook, and according to whether transform precoder is enabled or disabled, and the values of higher layer parameters maxRank, and codebookSubset;
- 2, 4, or 5 bits according to Table 7.3.1.1.2-3 for 4 antenna ports, if txConfig = codebook, and according to whether transform precoder is enabled or disabled, and the values of higher layer parameters maxRank, and codebooksubset;
2 or 4 bits according to Table7.3.1.1.2 4 for 2 antenna ports, if txConfig = codebook, and according to whether transform precoder is enabled or disabled, and the values of higher layer parameters maxRank and codebookSubset;
1 or 3 bits according to Table7.3.1.1.2-5 for 2 antenna ports, if txConfig = codebook, and according to whether transform precoder is enabled or disabled, and the values of higher layer parameters maxRank and codebooksubset.
Antenna ports - number of bits determined by the following
2 bits as defined by Tables 7.3.1.1.2-6, if transform precoder is enabled, dmrs-Type=1, and maxLength=1;
4 bits as defined by Tables 7.3.1.1.2-7, if transform precoder is enabled, dmrs-Type=1, and maxLength=2;
3 bits as defined by Tables 7.3.1.1.2-8/9/10/11, if transform precoder TABLE 5-continued

| |
|---|
| is disabled, dmrs-Type=1, and maxLength=1, and the value of rank is determined according to the SRS resource indicator field if the higher layer parameter txConfig = nonCodebook and according to the Precoding information and number of layers field if the higher layer parameter txConfig = codebook; |
| 4 bits as defined by Tables 7.3.1.1.2-12/13/14/15, if transform precoder is disabled, dmrs-Type-1, and maxLength=2, and the value of rank is determined according to the SRS resource indicator field if the higher layer parameter txConfig = nonCodebook and according to the Preceding information and number of layers field if the higher layer parameter txConfig = codebook; |
| - 4 bits as defined by Tables 7.3.1.1.2-16/17/18/19, if transform precoder is disabled, dmrs-Type=2, and maxLength=1, and the value of rank is determined according to the SRS resource |
| Bit field may indicate the related CSI-RS according to subclause 6.1.1.2 of [6, TS 38.214].) |
| CSI request (Channel State Information request) - 0, 1, 2, 3, 4, 5, or 6 bits determined by higher layer parameter reportTriggerSize. |
| CBG transmission information (CBGTI) (Code Block Group transmission information) - 0 bit if higher layer parameter codeBlockGroupTransmission for PDSCH is not configured, otherwise, 2, 4, 6, or 8 bits determined by higher layer parameter maxCodeslockGroupsPerTransportBlock for PUSCH. |
| PTRS-DMRS association (Phase Tracking Reference Signal- Demodulation Reference Signal association) - number of bits determined as follows |
| 0 bit if PTRS-UplinkConfig is not configured and transform precoder is disabled, or if transform precoder is enabled, or if maxRank-1; |
| 2 bits otherwise, where Table 7.3.1.1.2-25 and 7.3.1.1.2-26 are used to indicate the association between PTRS port(s) and DMRS port(s) for transmission of one PT-RS port and two PT-RS ports respectively, and the DMRS ports are indicated by the Antenna ports field. |
| If "Bandwidth part indicator" field indicates a bandwidth part other than the active bandwidth part and the "PTRS-DMRS association" field is present for the indicated bandwidth part but not present for the active bandwidth part, the UE assumes the "PTRS-DMRS association" field is not present for the indicated bandwidth part. |
| beta_offset indicator - 0 if the higher layer parameter betaOffsets = semiStatic; otherwise 2 bits as defined by Table 9.3-3 in [5, TS 38.213]. |
| DMRS sequence initialization (Demodulation Reference Signal sequence initialization) - 0 bit if transform precoder is enabled; 1 bit if transform precoder is disabled. |
| - UL-SCH indicator (Uplink-Shared Channel indicator) - 1 bit. A value of "1" indicates UL-SCH shall be transmitted on the PUSCH and a value of "0" indicates UL-SCH shall not be transmitted on the PUSCH. Except for DCI format 0_1 with CRC scrambled by SP-CSI-RNTI, a UE is not expected to receive a DCI format 0_1 with UL-SCH indicator of "0" and CSI request of all zero(s). (A value of "1" indicates UL-SCH shall be transmitted on the PUSCH and a value of "0" indicates UL-SCH shall not be transmitted on the PUSCH. Except for DCI format 0_1 with CRC scrambled by SP-CSI-RNTI, a UE is not expected to receive a DCI format 0_1 with UL-SCH indicator of "0" and CSI request of all zero(s).) |

DCI format 1_0 may be used as a fallback DCI for scheduling PDSCH, and in this case, CRC may be scrambled with C-RNTI. DCI format 1_0 in which CRC is scrambled with C-RNTI may include, for example, information as illustrated below.

TABLE 6

| |
|---|
| Identifier for DCI formats - 1 bits |
| The value of this bit field is always set to 1, indicating a DL DCI format |
| Frequency domain resource assignment |
| $\lceil \log_2(N_{RB}^{DL,BWP}(N_{RB}^{DL,BWP}+1)/2) \rceil$ bits where $N_{RB}^{DL,BWP}$ is given by subclause 7.3.1.0 |
| If the CRC of the DCI format 1 0 is scrambled by C-RNTI and the "Frequency domain resource assignment" field are of all ones, the DCI format 1_0 is for random access procedure initiated by a PDCCH order, with all remaining fields set as follows: |
| Random Access Preamble index - 6 bits according to ra-PreambleIndex in Subclause 5.1.2 of [8, TS38.321] |
| UL/SUL indicator (Uplink/ Supplementary UL indicator) - 1 bit. If the value of the "Random Access Preamble index" is not all zeros and if the UE is configured with supplementaryUplink in ServingCellConfig in the cell, this field indicates which UL carrier in the cell to transmit the PRACH according to Table 7.3.1.1.1-1; otherwise, this field is reserved |
| SS/PBCH index (Synchronization Signal/ Physical Broadcast Channel index) - 6 bits. If the value of the "Random Access Preamble index" is not all zeros, this field indicates the SS/PBCH that shall be used to determine the RACH occasion for the PRACH transmission; otherwise, this field is reserved. |
| PRACH Mask index (Physical Random Access Channel Mask index) - 4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321]; otherwise, this field is reserved |
| Reserved bits - 10 bits |
| Otherwise, all remaining fields are set as follows: |
| Time domain resource assignment - 4 bits as defined in Subclause 5.1.2.1 of [6, TS 38.214] |
| VRB-to-PRB mapping (virtual resource block-to- physical resource block mapping) |

TABLE 6-continued 1 bit according to Table 7.3.1.2.2-5
Modulation and coding scheme - 5 bits as defined in Subclause 5.1.3 of [6, TS 38.214]
New data indicator - 1 bit
Redundancy version - 2 bits as defined in Table 7.3.1.1.1-2
HARQ process number - 4 bits
Downlink assignment index - 2 bits as defined in Subclause 9.1.3 of [5, TS 38.213], as counter DAI
TPC command for scheduled PUCCH (Transmit Power Control command for scheduled PUSCH) - 2 bits as defined in Subclause 7.2.1 of [5, TS 38.213] PUCCH resource indicator - 3 bits as defined in Subclause 9.2.3 of [5, TS 38.213]
PDSCH-to-HARQ feedback timing indicator - 3 bits as defined in Subclause 9.2.3 of [5, TS 38.213]

DCI format 1_1 may be used as a non-fallback DCI for scheduling PDSCH, and in this case, CRC may be scrambled with C-RNTI. DCI format 1_1 in which CRC is scrambled with C-RNTI may include, for example, information as illustrated below.

TABLE 7

Identifier for DCI formats - 1 bits
The value of this bit field is always set to 1, indicating a DL DCI format
Carrier indicator - 0 or 3 bits as defined in Subclause 10.1 of [5, TS 38.213].
Bandwidth part indicator - 0, 1 or 2 bits as determined by the number of DL BWPs $n_{BWP,PRC}$ configured by higher layers, excluding the initial DL bandwidth part. The bitwidth for this field is determined as $\lceil \log_2(n_{BWP}) \rceil$ bits, where $n_{BWP} = n_{BWP,PRC} + 1$ if $n_{BWP,PRC} \leq 3$, in which case the bandwidth part indicator is equivalent to the ascending order of the higher layer parameter BWP-Id;
otherwise $n_{BWP} = n_{BWP,PRC}$, in which case the bandwidth part indicator is defined in Table 7.3.1.1.2-1;
If a UE does not support active BWP change via DCI, the UE ignores this bit field.
Frequency domain resource assignment - number of bits determined by the following, where $N_{RB}^{DL,BWP}$ is the size of the active DL bandwidth part:
$N_{RGB}$ bits if only allocation type 0 is configured, where $N_{RBG}$ is defined in Subclause 5.1.2.2.1 of [6, TS38.214], $\lceil \log_2(N_{RB}^{DL,BWP}(N_{RB}^{DL,BWP}+1)/2) \rceil$ bits if only resource allocation type 1 is configured, or
$\max(\lceil \log_2(N_{RB}^{DL,BWP}(N_{RB}^{DL,BWP}+1)/2 \rceil, N_{RBG}) + 1$ bits if both resource allocation type 0 and 1 are configured.
If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
For resource allocation type 0, the $N_{RBG}$ LSBs provide the resource allocation as defined in Subclause 5.1.2.2.1 of [6, TS 38.214].
For resource allocation type 1, the $\lceil \log_2(N_{RB}^{DL,BWP}(N_{RB}^{DL,BWP}+1)/2) \rceil$ LSBs provide the resource allocation as defined in Subclause 5.1.2.2.2 of [6, TS 38.214]
If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
Time domain resource assignment - 0, 1, 2, 3, or 4 bits as defined in Subclause 5.1.2.1 of [6, TS 38.214]. The bitwidth for this field is determined as $\lceil \log_2(I) \rceil$ bits, where I is the number of entries in the TABLE 7-continued higher layer parameter pdsch-TimeDomainAllocationList if the higher layer parameter is configured; otherwise I is the number of entries in the default table.
VRB-to-PRB mapping (virtual resource block-to- physical resource block mapping)
0 or 1 bit:
0 bit if only resource allocation type 0 is configured or if interleaved VRB-to-PRB mapping is not configured by high layers;
1 bit according to Table 7.3.1.2.2-5 otherwise, only applicable to resource allocation type 1, as defined in Subclause 7.3.1.6 of [4, TS 38.211].
PRB bundling size indicator - 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].
Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
ZP CSI-RS trigger (Zero Power Channel State Information Reference Signal trigger) - 0, 1, or 2 bits as defined in Subclause 5.1.4.2 of [6, TS 38.214].
The bitwidth for this field is determined as $\lceil \log_2(N_{ZP}+1) \rceil$ bits, where $n_{ZP}$ is the number of aperiodic ZP CSI-RS resource sets configured by higher layer.
For transport block 1:
Modulation and coding scheme - 5 bits as defined in Subclause 5.1.3.1 of [6, TS 38.214]
New data indicator - 1 bit
Redundancy version - 2 bits as defined in Table 7.3.1.1.1-2
For transport block 2 (only present if maxNrofCodeWordsScheduledByDCI equals 2):
Modulation and coding scheme - 5 bits as defined in Subclause 5.1.3.1 of [6, TS 38.214]
New data indicator - 1 bit
Redundancy version - 2 bits as defined in Table 7.3.1.1.1-2
If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.
HARQ process number - 4 bits
Downlink assignment index - number of bits as defined in the following
4 bits if more than one serving cell are configured in the DL and the higher layer parameter pdsch-HARQ-ACK-Codebook=dynamic, where the 2 MSB bits are the counter DAI and the 2 LSB bits are the total DAI;
2 bits if only one serving cell is configured in the DL and the higher layer parameter pdsch-HARQ-ACK-Codebook=dynamic, where the 2 bits are the counter DAI;
0 bits otherwise.
TPC command for scheduled PUCCH (Transmit Power Control command for scheduled PUSCH) - 2 bits as defined in Subclause 7.2.1 of [5, TS 38.213] PUCCH resource indicator - 3 bits as defined in Subclause 9.2.3 of [5, TS 38.213]
PDSCH-to-HARQ feedback timing indicator - 0, 1, 2, or 3 bits as defined in Subclause 9.2.3 of [5, TS 38.213]. The bitwidth for this field is determined as $\lceil \log_2(I) \rceil$ bits, where I is the number of entries in the higher layer parameter dl-DataToUL-ACK.
Antenna port (s) - 4, 5, or 6 bits as defined by Tables 7.3.1.2.2-1/2/3/4, where the number of CDM groups without data of values 1, 2, and 3 refers to CDM groups {0}, {0, 1}, and {0, 1,2} respectively. The antenna ports $\{p_0,\ldots,p_{0-1}\}$ shall be determined according to the ordering of DMRS port (s) given by Tables 7.3.1.2.2-1/2/3/4.
If a UE is configured with both dmrs-Downlink For PDSCH-MappingTypeA and dmrs-DownlinkForPDSCH-MappingTypeB, the bitwidth of this field equals $\max\{x_A, x_B\}$, where $x_A$ is the the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller TABLE 7-continued value of $x_A$ and $x_B$.
Transmission configuration indication - 0 bit if higher layer parameter tci-PresentInDCI is not enabled; otherwise 3 bits as defined in Subclause 5.1.5 of [6, TS38.214].
If "Bandwidth part indicator" field indicates a bandwidth part other than the active bandwidth part,
if the higher layer parameter toi-PresentInDCI is not enabled for the CORESET used for the PDCCH carrying the DCI format 1_1,
the UE assumes tci-PresentInDCI is not enabled for all CORESETs in the indicated bandwidth part;
otherwise,
the UE assumes tci-PresentInDCI is enabled for all CORESETs in the indicated bandwidth part.
SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
CBG transmission information (CBGTI) (Code Block Group transmission information) - 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCodeWordsScheduledByDCI for the PDSCH.
CBG flushing out information (CBGFI) (Code Block Group flushing out information) - 1 bit if higher layer parameter codeBlockGroupFlush Indicator is configured as "TRUE", 0 bit otherwise.

TABLE 7-continued

DMRS sequence initialization (Demodulation Reference Signal sequence initialization) - 1 bit.

Hereinafter, a method of allocating time domain resources for a data channel in a 5G wireless communication system will be described.

The base station may configure a table for time domain resource allocation information on the physical downlink shared channel (PDSCH) and the physical uplink shared channel (PUSCH) through higher layer signaling (e.g., RRC signaling) to the UE. A table consisting of a maximum of 16 (maxNrofDL-Allocations) entries may be configured for the PDSCH, and a table consisting of a maximum of 16 (maxNrofUL-Allocations) entries may be configured for the PUSCH. The time domain resource allocation information may include, for example, PDCCH-to-PDSCH slot timing (corresponds to the time interval in slot units between the time when the PDCCH is received and the time when the PDSCH scheduled by the received PDCCH is transmitted, denoted by K0) or PDCCH-to-PUSCH slot timing (corresponds to the time interval in slot units between the time when the PDCCH is received and the time when the PUSCH scheduled by the received PDCCH is transmitted, denoted by K2), information on the location and length of a start symbol in which a PDSCH or PUSCH is scheduled in the slot, mapping type of PDSCH or PUSCH, etc. For example, information such as the table below may be notified from the base station to the UE.

TABLE 8

PDSCH-TimeDomainResourceAllocationList information element

```
PDSCH-TimeDomainResourceAllocationList::=SEQUENCE(SIZE(1..maxNrofDL-Allocations))
OF PDSCH-TimeDomainResourceAllocation
PDSCH-TimeDomainResourceAllocation ::=            SEQUENCE {
k0                                                              INTEGER (0..32)
OPTIONAL,      -- Need S
(PDCCH-to-PDSCH timing, per slot)
mappingType                               ENUMERATED {typeA, typeB},
(PDSCH mapping type)
startSymbolAndLength                      INTEGER (0..127)
(Start symbol and length of PDSCH)
}
```

TABLE 9

PUSCH-TimeDomainResourceAllocation information element

```
PUSCH-TimeDomainResourceAllocationList ::= SEQUENCE (SIZE(1..maxNrofUL-
Allocations)) OF PUSCH-TimeDomainResourceAllocation
PUSCH-TimeDomainResourceAllocation ::=        SEQUENCE {
k2                        INTEGER(0..32)            OPTIONAL,      -- Need S
(PDCCH-to-PDSCH timing, per slot)
mappingType                            ENUMERATED {typeA, typeB},
(PUSCH mapping type)
startSymbolAndLength                   INTEGER (0..127)
(Start symbol and length of PDSCH)
}
```

The base station may notify the UE of one of the entries in the table for the time domain resource allocation information through L1 signaling (e.g., DCI). For example, the base station may indicate with the 'time domain resource allocation' field in DCI (for example, it may be indicated by the 'time domain resource allocation' field in DCI). The UE may obtain time domain resource allocation information on the PDSCH or PUSCH based on the DCI received from the base station.

Hereinafter, a method of allocating a frequency domain resource for a data channel in a 5G wireless communication system will be described.

In the 5G wireless communication system, two types, resource allocation type 0 and resource allocation type 1 are supported as a method of indicating frequency domain resource allocation information on a physical downlink shared channel (PDSCH) and a physical uplink shared channel (PUSCH).

Resource Allocation Type 0

RB allocation information may be notified from the base station to the UE in the form of a bitmap for a resource block group (RBG). In this case, the RBG may be composed of a set of consecutive VRBs (Virtual RBs), and the size P of the RBG may be determined based on a value configured by a higher layer parameter (rbg-Size) and a size value of the bandwidth part defined in the table below.

TABLE 10

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Nominal RBG Size P

The total number ($N_{RBG}$) of RBGs of bandwidth part i of size $$N_{BWP,i}^{size}$$

may be defined as follows.

$$N_{RBG} = \left\lceil \left(N_{BWP,i}^{size} + (N_{BWP}^{start}, \mathrm{mod}P)\right) / P \right\rceil, \text{ where}$$

the size of the first RBG is $$RBG_0^{size} = P - N_{BWP,i}^{start} \mathrm{mod}P,$$

the size of last RBG is $$RBG_{last}^{size} = \left(N_{BWP,i}^{start} + N_{BWP,i}^{size}\right)\mathrm{mod}P \text{ if } \left(N_{BWP,i}^{start} + N_{BWP,i}^{size}\right)\mathrm{mod}P > 0 \text{ and } P \text{ otherwise,}$$

the size of all other RBGs is P.

Each bit of the $N_{RBG}$ bit-sized bitmap may correspond to each RBG. RBGs may be indexed in the order of increasing frequency, starting from the lowest frequency location of the bandwidth part. For $N_{RBG}$ RBGs in the bandwidth part, RBG #0 to RBG #($N_{RBG}$−1) may be mapped from MSB to LSB of the RBG bitmap. In a case where a specific bit value in the bitmap is 1, the UE may determine that the RBG corresponding to the bit value is allocated, and in a case where a specific bit value in the bitmap is 0, the UE may determine that the RBG corresponding to the bit value is not allocated.

Resource Allocation Type 1

RB allocation information may be notified from the base station to the UE as information on the start location and length of the consecutively allocated VRBs. In this case, interleaving or non-interleaving may be additionally applied to consecutively allocated VRBs. The resource allocation field of resource allocation type 1 may consist of a resource indication value (RIV), and the RIV may be composed of a starting point (RB_start) of a VRB and a length of a continuously allocated RB (L_RBs). More specifically, the RIV in the bandwidth part of the size $$N_{BWP}^{size}$$

may be defined as follows.

if $(L_{RBs} - 1) \le \lfloor N_{BWP}^{size}/2 \rfloor$ then $$RIV = N_{BWP}^{size}(L_{RBs} - 1) + RB_{start}$$

else $$RIV = N_{BWP}^{size}\left(N_{BWP}^{size} - L_{RBs} + 1\right) + \left(N_{BWP}^{size} - 1 - RB_{start}\right)$$

where LRa>> 1 and shall not exceed $N_{BWP}^{size} - RB_{start}$.

The base station may configure the resource allocation type to the UE through higher layer signaling (for example, the higher layer parameter resourceAllocation may be configured to one of resourceAllocationType0, resourceAllocationType1, or dynamicSwitch). If the UE is configured with both resource allocation types 0 and 1 (or, in the same way, if the higher layer parameter resourceAllocation is configured to dynamicSwitch), the bit corresponding to the most significant bit (MSB) of the field indicating resource allocation in the DCI format indicating scheduling may indicate whether resource allocation type 0 or resource allocation type 1, and based on the indicated resource allocation type, resource allocation information may be indicated through the remaining bits except for the bit corresponding to the MSB, and based on this, the UE may interpret the resource allocation field information of the DCI field. If the UE is configured with one of resource allocation type 0 or resource allocation type 1 (or, in the same way, if the higher layer parameter resourceAllocation is configured to one of the values of resourceAllocationType0 or resourceAllocationType1), resource allocation information may be indicated based on the resource allocation type in which a field indicating resource allocation in the DCI format indicating scheduling is configured, and based on this, the UE may interpret the resource allocation field information of the DCI field.

Hereinafter, a downlink control channel in a 5G communication system will be described in more detail with reference to the diagrams.

Figure 4:
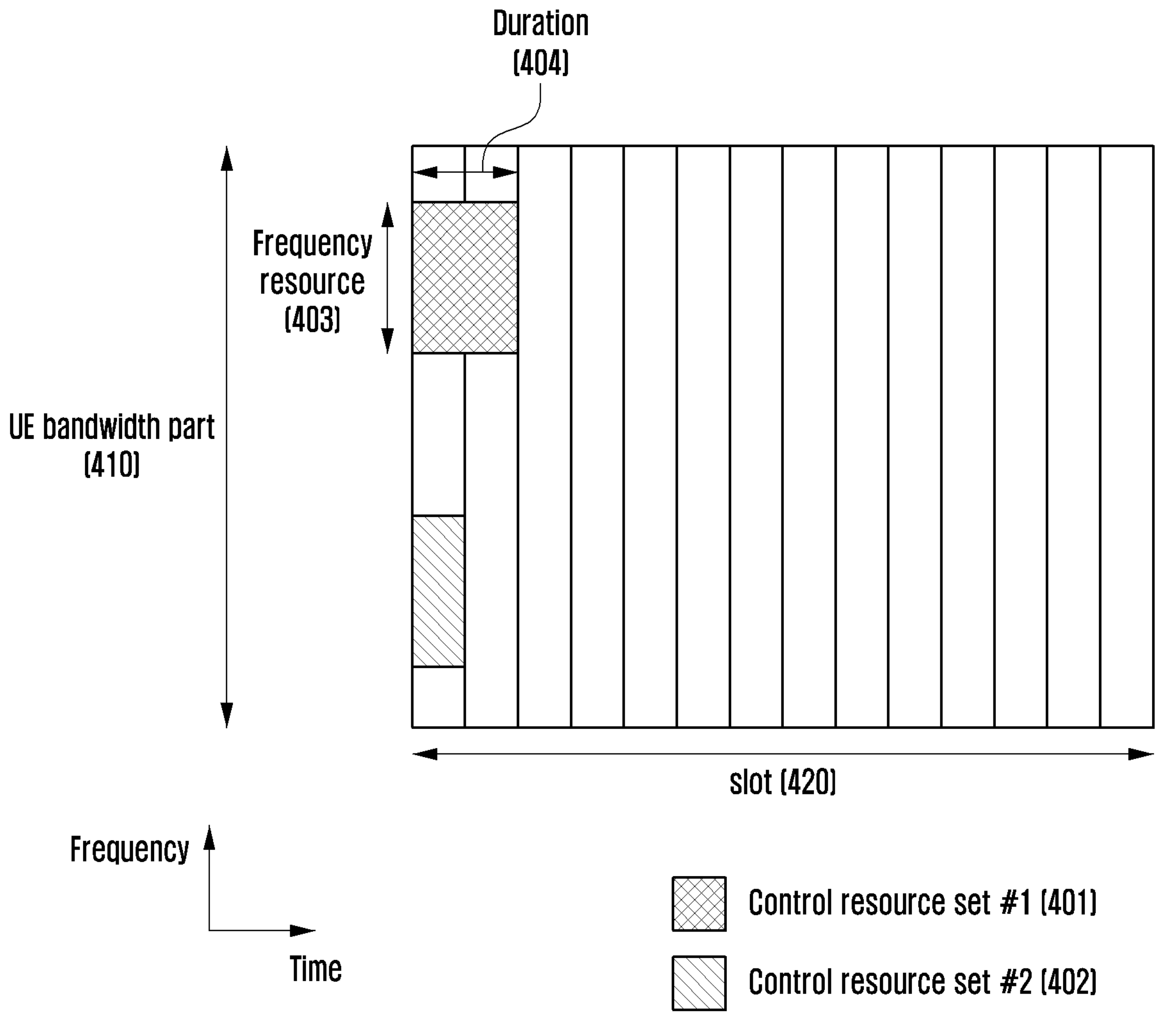
FIG. 4 is a diagram illustrating an example of a control resource set configuration of a downlink control channel of a 5G system.

FIG. 4 is a diagram illustrating an example of a control resource set (CORESET) through which a downlink control channel is transmitted in a 5G wireless communication system. FIG. 4 illustrates an example in which a UE bandwidth part 410 is configured on the frequency axis and two control resource sets (control resource set #1 401 and control resource set #2 402) are configured in one slot 420 on the time axis. The control resource sets 401 and 402 may be configured to a specific frequency resource 403 within the entire UE bandwidth part 410 in the frequency domain. One or a plurality of OFDM symbols may be configured in the time domain, and this may be defined as control resource set duration 404. Referring to the example illustrated in FIG. 4, control resource set #1 401 may be configured to a control resource set length of 2 symbols, and control resource set #2 402 may be configured to a control resource set length of 1 symbol.

The control resource set in the above-described 5G may be configured by the base station to the UE through higher layer signaling (e.g., system information, master information block (MIB), and radio resource control (RRC) signaling). Configuring the control resource set to the UE refers to providing information such as a control resource set identifier (Identity), a frequency location of the control resource set, and a symbol length of the control resource set, etc. For example, the information below may be included.

TABLE 11

```
ControlResourceSet ::=                              SEQUENCE {
Corresponds to L1 parameter 'CORESET-ID'
controlResourceSetId                                ControlResourceSetId,
(Control Resource Set Identity))
frequencyDomainResources                            BIT STRING (SIZE (45)),
(Frequency Domain Resource allocation information)
duration                                                  INTEGER
(1..maxCoReSetDuration),
(Time Domain Resource allocation information)
cce-REG-MappingType                                             CHOICE {
interleaved                                                     SEQUENCE {
reg-BundleSize                                      ENUMERATED {n2, n3, n6},
precoderGranularity                                       ENUMERATED
{sameAsREG-bundle, allContiguousRBs},
interleaverSize                                     ENUMERATED {n2, n3, n6}
shiftIndex
        INTEGER(0..maxNrofPhysicalResourceBlocks-1)             OPTIONAL
(Interleaver Shift))
},
nonInterleaved                                            NULL
},
tci-StatesPDCCH                                           SEQUENCE(SIZE
(1..maxNrofTCI-StatesPDCCH)) OF TCI-StateId               OPTIONAL,
(QCL configuration information)
tci-PresentInDCI                                    ENUMERATED {enabled}
              OPTIONAL,      -- Need S
}
```

In Table 11, the tci-StatesPDCCH (simply named transmission configuration indication (TCI) state) configuration information may include information on one or more synchronization signal (SS)/physical broadcast channel (PBCH) block indexes in a Quasi co-located (QCL) relationship with DMRS transmitted in a corresponding control resource set or channel state information (CSI)-reference signal (RS) indexes.

Figure 5:
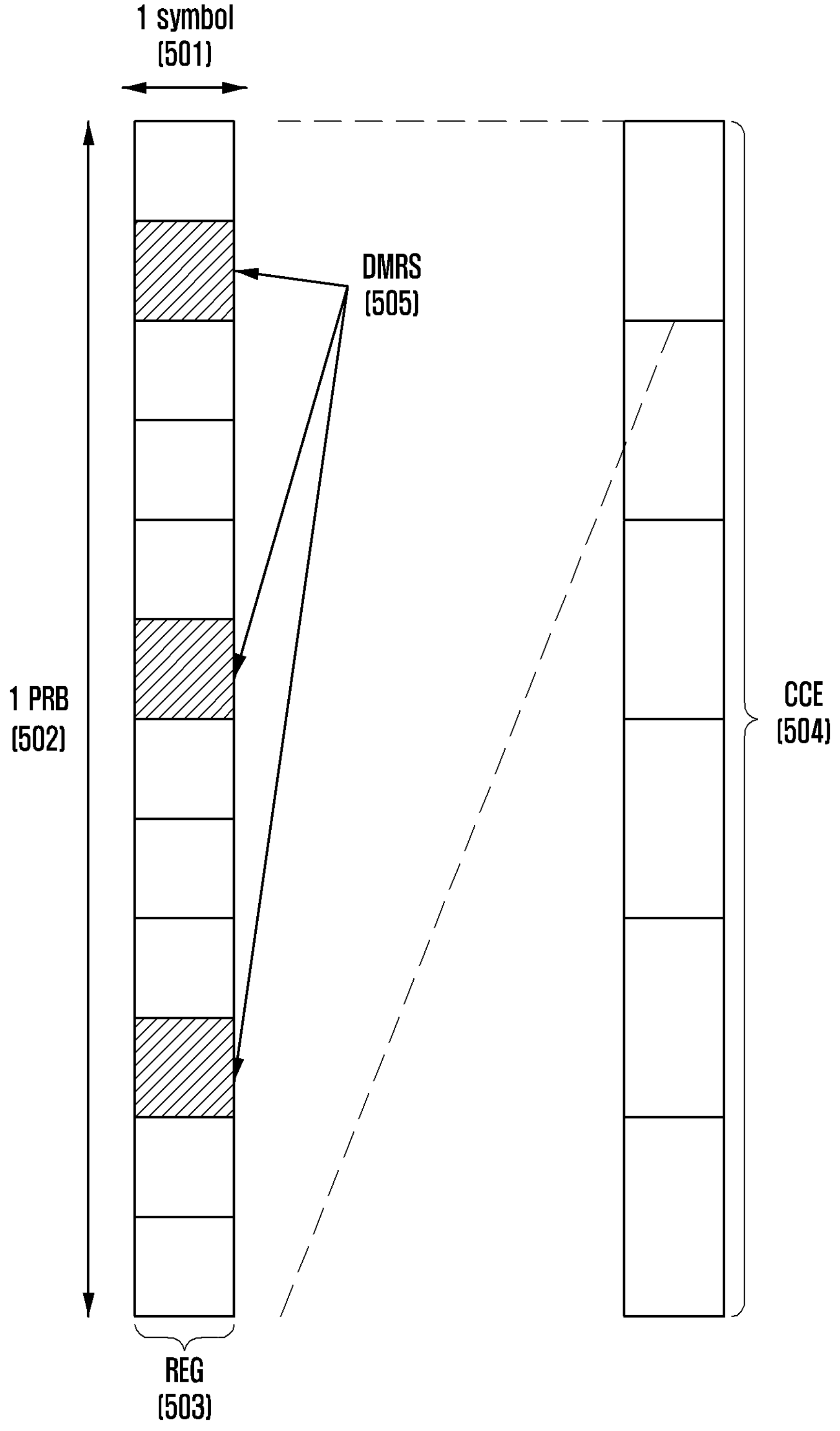
FIG. 5 is a diagram illustrating a structure of a downlink control channel of a 5G system.

FIG. 5 is a diagram illustrating an example of a basic unit of time and frequency resources constituting a downlink control channel that may be used in 5G. According to FIG. 5, the basic unit of time and frequency resources constituting the control channel may be referred to as a resource element group (REG) 503, and the REG 503 may be defined as 1 OFDM symbol 501 on the time axis and 1 physical resource block (PRB) 502 on the frequency axis, that is, 12 subcarriers. The base station may configure a downlink control channel allocation unit by concatenating the REG 503.

As illustrated in FIG. 5, in a case where the basic unit to which a downlink control channel is allocated in a 5G communication system is referred to as a control channel element (CCE) 504, one CCE 504 may be composed of a plurality of REGs 503. Describing the REG 503 illustrated in FIG. 5 as an example, REG 503 may be composed of 12 REs, and if 1 CCE 504 is composed of 6 REGs 503, 1 CCE 504 may be composed of 72 REs. When the downlink control resource set is configured, the corresponding area may be composed of a plurality of CCEs 504, and a specific downlink control channel may be mapped to one or more CCEs 504 according to the aggregation level (AL) in the control resource set and transmitted. The CCEs 504 in the control resource set are divided by numbers, and in this case, numbers of the CCEs 504 may be assigned according to a logical mapping method.

The basic unit of the downlink control channel, i.e., REG 503 illustrated in FIG. 5, may include both REs to which DCI is mapped and areas to which a demodulation reference signal (DMRS) which is a reference signal (RS) for decoding the REs, is mapped. As in FIG. 5, 3 DMRSs 505 may be transmitted within one REG 503. The number of CCEs required to transmit the PDCCH may be 1, 2, 4, 8, or 16 depending on the aggregation level (AL), and different numbers of CCEs may be used to implement link adaptation of the downlink control channel. For example, when AL=L, one downlink control channel may be transmitted through L CCEs. The UE needs to detect a signal without knowing information on the downlink control channel, and for blind decoding, a search space indicating a set of CCEs is defined. Because the search space is a set of downlink control channel candidates consisting of CCEs that the UE should attempt to decode on a given aggregation level, and there are several aggregation levels that make one bundle with 1, 2, 4, 8 or 16 CCEs, the UE may have a plurality of search spaces.

The search space set may be defined as a set of search spaces in all configured aggregation levels.

The search space may be classified into a common search space and a UE-specific search space. A certain group of UEs or all UEs may examine the common search space of the PDCCH to receive cell-common control information such as dynamic scheduling for system information or a paging message. For example, the PDSCH scheduling allocation information for transmission of the SIB including the operator information of the cell may be received by examining the common search space of the PDCCH. In the case of the common search space, because a certain group of UEs or all UEs must receive the PDCCH, the common search space may be defined as a set of promised CCEs. The scheduling assignment information on the UE-specific PDSCH or PUSCH may be received by examining the UE-specific search space of the PDCCH. The UE-specific search space may be UE-specifically defined as a function of the UE's identity and various system parameters.

In the 5G, the parameter for the search space for the PDCCH may be configured from the base station to the UE through higher layer signaling (e.g., SIB, MIB, and RRC signaling). For example, the base station may configure the number of PDCCH candidates in each aggregation level L, a monitoring period for the search space, a monitoring occasion in symbol units in a slot for a search space, a search space type (common search space or UE-specific search space), a combination of a DCI format and RNTI to be monitored in the corresponding search space, a control resource set index for monitoring the search space, and the like to the UE. For example, the parameter for the search space for the PDCCH may include the following information.

TABLE 12

```
SearchSpace ::=                                    SEQUENCE {
Identity of the search space. SearchSpaceId = 0 identifies the SearchSpace configured via PBCH (MIB) or
ServingCellConfigCommon.
searchSpaceId                                          SearchSpaceId,
controlResourceSetId                               ControlResourceSetId,
monitoringSlotPeriodicityAndOffset             CHOICE {
(monitoring slot level periodicity)
sl1                                                         NULL,
sl2                                                         INTEGER
(0..1),
sl4                                                         INTEGER
(0..3),
sl5                                                      INTEGER (0..4),
sl8                                                         INTEGER
(0..7),
sl10                                                     INTEGER (0..9),
sl16                                                     INTEGER (0..15),
sl20                                                     INTEGER (0..19)
}
                                                   OPTIONAL,
duration(monitoring length)          INTEGER (2..2559)
monitoringSymbolsWithinSlot                            BIT STRING (SIZE (14))
        OPTIONAL,
(monitoring symbols within slot)
nrofCandidates                                         SEQUENCE {
(number of PDCCH candidates by aggregation level)
aggregationLevel1                              ENUMERATED {n0, n1, n2, n3, n4, n5, n6, n8},
aggregationLevel2                              ENUMERATED {n0, n1, n2, n3, n4, n5, n6, n8},
aggregationLevel4                              ENUMERATED {n0, n1, n2, n3, n4, n5, n6, n8},
aggregationLevel8                              ENUMERATED {n0, n1, n2, n3, n4, n5, n6, n8},
aggregationLevel16                             ENUMERATED {n0, n1, n2, n3, n4, n5, n6, n8}
},
searchSpaceType                                        CHOICE {
Configures this search space as common search space (CSS) and DCI formats to monitor.
common                                                     SEQUENCE {
(common search space)
}
ue-Specific                                                SEQUENCE {
(UE-specific search space)
Indicates whether the UE monitors in this USS for DCI formats 0-0 and 1-0 or for formats 0-1 and 1-1.
formats                                    ENUMERATED     {formats0-0-And-1-0,
formats0-1-And-1-1},
...
}
```

According to the configuration information, the base station may configure one or a plurality of search space sets to the UE. According to some embodiments, the base station may configure the search space set 1 and the search space set 2 to the UE, the UE may be configured to monitor DCI format A scrambled with X-RNTI in a common search space in search space set 1, and may be configured to monitor DCI format B scrambled with Y-RNTI in the UE-specific search space in search space set 2.

According to the configuration information, one or a plurality of search space sets may exist in the common search space or the UE-specific search space. For example, the search space set #1 and the search space set #2 may be configured as the common search space, and the search space set #3 and the search space set #4 may be configured as the UE-specific search space.

In the common search space, a combination of the following DCI format and RNTI may be monitored. Of course, it is not limited to the following examples.

- DCI format 0_0/1_0 with CRC scrambled by C-RNTI, CS-RNTI, SP-CSI-RNTI, RA-RNTI, TC-RNTI, P-RNTI, SI-RNTI
- DCI format 2_0 with CRC scrambled by SFI-RNTI
- DCI format 2_1 with CRC scrambled by INT-RNTI
- DCI format 2_2 with CRC scrambled by TPC-PUSCH-RNTI, TPC-PUCCH-RNTI
- DCI format 2_3 with CRC scrambled by TPC-SRS-RNTI In the UE-specific search space, a combination of the following DCI format and RNTI may be monitored. Of course, it is not limited to the following examples.

- DCI format 0_0/1_0 with CRC scrambled by C-RNTI, CS-RNTI, TC-RNTI
- DCI format 1_0/1_1 with CRC scrambled by C-RNTI, CS-RNTI, TC-RNTI The specified RNTIs may follow the definitions and uses below.

- C-RNTI (cell RNTI): UE-specific PDSCH scheduling purpose
- TC-RNTI (temporary cell RNTI): UE-specific PDSCH scheduling purpose
- CS-RNTI (configured scheduling RNTI): Semi-statically configured UE-specific PDSCH scheduling purpose
- RA-RNTI (random access RNTI): PDSCH scheduling purpose in the random access phase
- P-RNTI (paging RNTI): PDSCH scheduling purpose for which paging is transmitted
- SI-RNTI (system information RNTI): PDSCH scheduling purpose in which system information is transmitted
- INT-RNTI (interruption RNTI): Used to indicate whether PDSCH is puncturing
- TPC-PUSCH-RNTI (transmit power Control for PUSCH RNTI): Used to indicate power control command for PUSCH
- TPC-PUCCH-RNTI (transmit power control for PUCCH RNTI): Used to indicate power control command for PUCCH
- TPC-SRS-RNTI (transmit power control for SRS RNTI): Used to indicate power control command for SRS The above specified DCI formats may follow the definition below.

TABLE 13

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for UE |
| 2_2 | Transmission of TPC commands for PUCCH and PUSCH |
| 2_3 | Transmission of a group of TPC commands for SRS transmissions by one or more UEs |

In the 5G, the search space of the aggregation level L in the control resource set p and the search space set s may be expressed as the following equation.

$$L\cdot\left\{\left(Y_{p,n^{\mu}_{s,f}}+\left\lfloor\frac{m_{s,n_{CI}}\cdot N_{CCE,p}}{L\cdot M^{(L)}_{p,s,max}}\right\rfloor+n_{CI}\right)\bmod\lfloor N_{CCE,p}/L\rfloor\right\}+i$$

L: aggregation level $n_{CI}$: carrier index $N_{CCE,p}$: the total number of CCEs exist in the control resource set p $n^{\mu}_{s,f}$: slot index $M^{(L)}_{p,s,max}$: the number of PDCCH candidates of aggregation level L $m_{snCI}=0, \ldots, M^{(L)}_{p,s,max}-1$: PDCCH candidate index of aggregation level L $i=0, \ldots, L-1$ $$Y_{p,n^{\mu}_{s,f}}=\left(A_p\cdot Y_{p,n^{\mu}_{s,f}-1}\right)\bmod D,\ Y_{p,-1}=n_{RNTI}\neq 0,_{A\_0=39827,A\_1=39829},$$

A_2=39839, D=65537

$n_{RNTI}$: UE identity

The $Y\_(p,n^{\mu}_{s,f})$ value may correspond to 0 in the case of a common search space.

The $Y\_(p,n^{\mu}_{s,f})$ value may correspond to a value that changes depending on the UE's identity (C-RNTI or ID configured for the UE by the base station) and the time index in the case of a UE-specific search space.

In 5G, as a plurality of search space sets may be configured with different parameters, the set of search space sets monitored by the UE at every time point may vary. For example, in a case where search space set #1 is configured to X-slot period and search space set #2 is configured to Y-slot period and X and Y are different, the UE may monitor both the search space set #1 and the search space set #2 in a specific slot, and may monitor one of the search space set #1 and the search space set #2 in another specific slot.

In a case where a plurality of search space sets are configured to the UE, the following conditions may be considered in a method for determining the search space set to be monitored by the UE.

[Condition 1: Limit the Maximum Number of PDCCH Candidates]

The number of PDCCH candidates that can be monitored per slot does not exceed $M^{\mu}$. $M^{\mu}$ may be defined as the maximum number of PDCCH candidates per slot in a cell configured to a subcarrier interval of $15\cdot2^{\mu}$ kHz, and may be defined in the table below.

TABLE 14

| μ | Maximum number of PDCCH candidates per slot and per serving cell ($M^{\mu}$) |
|---|---|
| 0 | 44 |
| 1 | 36 |
| 2 | 22 |
| 3 | 20 |

[Condition 2: Limit the Maximum Number of CCEs]

The number of CCEs constituting the entire search space per slot (the total search space refers to the entire set of CCEs corresponding to the union area of a plurality of search space sets) does not exceed $C^{\mu}$. $C^{\mu}$ may be defined as the maximum number of CCEs per slot in a cell configured to a subcarrier spacing of $15 \cdot 2^{\mu}$ kHz, and may be defined in the table below.

TABLE 15

| μ | Maximum number of PDCCH candidates per slot and per serving cell ($M^{\mu}$) |
|---|---|
| 0 | 44 |
| 1 | 36 |
| 2 | 22 |
| 3 | 20 |

For convenience of explanation, a situation that satisfies both conditions 1 and 2 at a specific time point is defined as "condition A". Accordingly, not satisfying condition A may refer to not satisfying at least one of conditions 1 and 2 above.

According to the configuration of the search space sets of the base station, the condition A may not be satisfied at a specific time point. In a case where condition A is not satisfied at a specific time point, the UE may select and monitor only some of the search space sets configured to satisfy condition A at the corresponding time point, and the base station may transmit the PDCCH to the selected search space set.

The following method may be followed as a method of selecting some search spaces from among the entire configured search space set.

[Method 1]

In a case where condition A for PDCCH is not satisfied at a specific time point (slot).

The UE (or the base station) may preferentially select a search space set in which a search space type is configured as a common search space from among search space sets existing at a corresponding time, over a search space set configured as a UE-specific search space.

In a case where all search space sets configured as the common search space are selected (that is, in a case where condition A is satisfied even after selecting all search spaces set as common search spaces), the UE (or the base station) may select search space sets configured as the UE-specific search space. In this case, in a case where there are a plurality of search space sets configured as the UE-specific search space, a search space set having a low search space set index may have a higher priority. The UE-specific search space sets may be selected within a range in which condition A is satisfied in consideration of priority.

Figure 6:
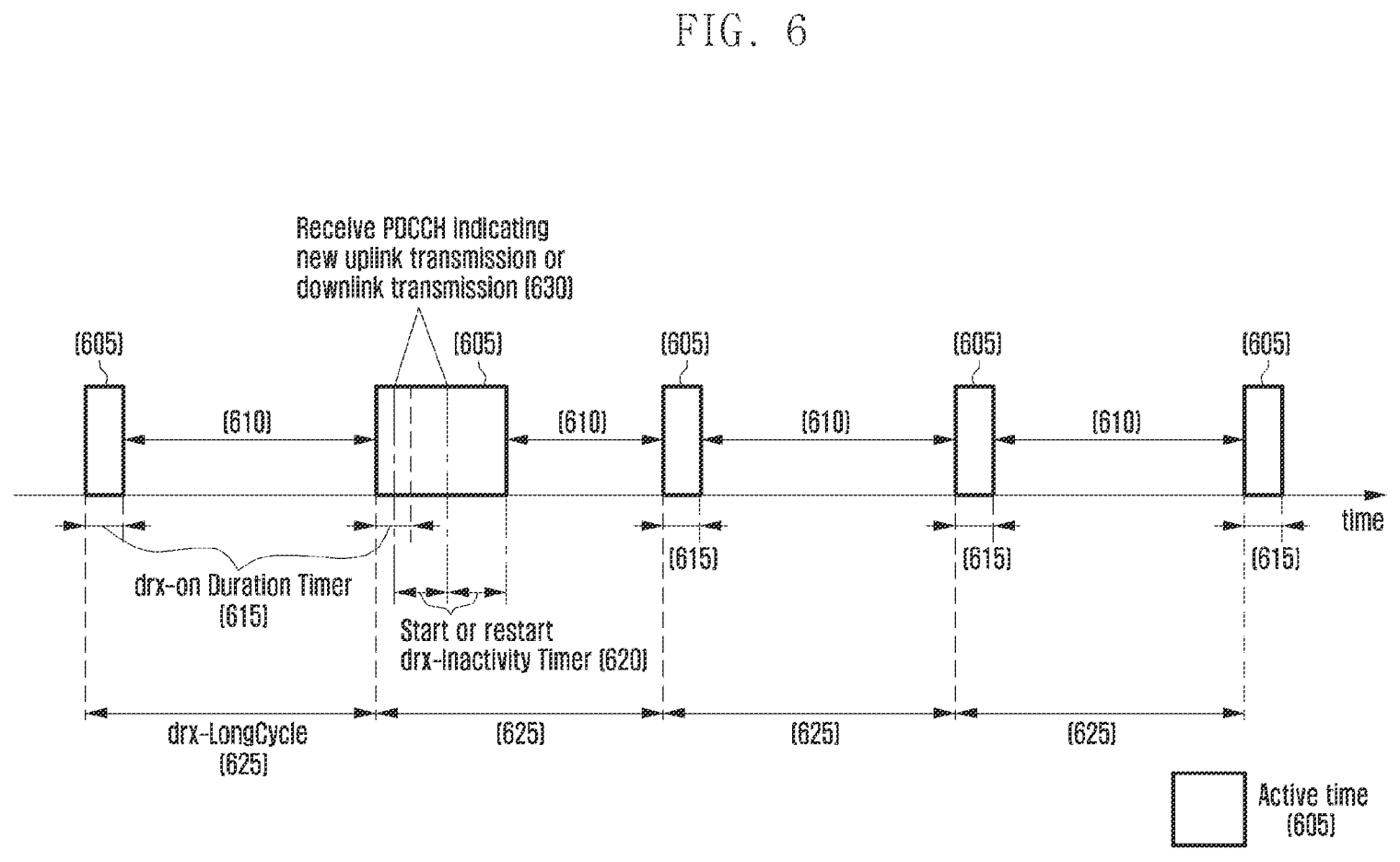

FIG. 6 is a diagram for describing discontinuous reception (DRX).

Discontinuous reception (DRX) is an operation in which a UE using a service discontinuously receives data in an RRC connected state in which a radio link is established between a base station and a UE. If DRX is applied, the UE may turn on the receiver at a specific time to monitor the control channel, and if there is no data received for a certain period of time, turn off the receiver to reduce power consumption of the UE. DRX operation may be controlled by the MAC layer based on various parameters and timers.

Referring to FIG. 6, active time 605 is the time during which the UE wakes up every DRX cycle and monitors the PDCCH. Active time 605 may be defined as follows.

- drx-onDurationTimer or drx-InactivityTimer or drx-RetransmissionTimerDL or drx-RetransmissionTimerUL or ra-ContentionResolutionTimer is running; or
- a Scheduling Request is sent on PUCCH and is pending; or
- a PDCCH indicating a new transmission addressed to the C-RNTI of the MAC entity has not been received after successful reception of a Random Access Response for the Random Access Preamble not selected by the MAC entity among the contention-based Random Access Preamble
- drx-onDurationTimer, drx-InactivityTimer, drx-RetransmissionTimerDL, drx-RetransmissionTimerUL, ra-ContentionResolutionTimer, etc. are timers whose values are set by the base station, and have a function of configuring the UE to monitor the PDCCH when a predetermined condition is satisfied.

The drx-onDurationTimer 615 is a parameter for setting the minimum time that the UE is awake in the DRX cycle. The drx-InactivityTimer 620 is a parameter for setting an additional awake time of the UE when receiving 630 a PDCCH indicating new uplink transmission or downlink transmission. The drx-RetransmissionTimerDL is a parameter for setting the maximum time that the UE is awake in order to receive downlink retransmission in the downlink HARQ procedure. The drx-RetransmissionTimerUL is a parameter for setting the maximum time that the UE is awake in order to receive an uplink retransmission grant in the uplink HARQ procedure. The drx-onDurationTimer, the drx-InactivityTimer, the drx-RetransmissionTimerDL and the drx-RetransmissionTimerUL may be set as, for example, time, number of subframes, number of slots, and the like, ra-ContentionResolutionTimer is a parameter for monitoring the PDCCH in the random access procedure.

The inactive time 610 is time set not to monitor the PDCCH or/or time set not to receive the PDCCH during DRX operation, and the remaining time excluding the Active time 605 from the total time for performing the DRX operation may be the inactive time 610. If the UE does not monitor the PDCCH during the active time 605, the UE may enter a sleep or inactive state to reduce power consumption.

The DRX cycle means a cycle in which the UE wakes up and monitors the PDCCH. That is, after the UE monitors a PDCCH, the DRX cycle means a time interval or an on-duration generation period until monitoring the next PDCCH. There are two types of DRX cycle: short DRX cycle and long DRX cycle. The short DRX cycle may be optionally applied.

The Long DRX cycle 625 is the longest of two DRX cycles configured in the UE. The UE starts the drx-onDurationTimer 615 again when the Long DRX cycle 625 has elapsed from the starting point (e.g., start symbol) of the drx-onDurationTimer 615 while operating in Long DRX. When operating in the Long DRX cycle 625, the UE may start the drx-onDurationTimer 615 in a slot after drx-SlotOffset in a subframe that satisfies [Equation 2] below. Here, drx-SlotOffset means a delay before starting the drx-onDurationTimer 615, drx-SlotOffset may be set to, for example, time, number of slots, and the like.

$$[(SFN\times 10)+\text{subframe number}]\text{modulo}(\text{drx-LongCycle})=\text{drx-StartOffset} \quad \text{[Equation 2]}$$

In this case, the drx-LongCycleStartOffset may include the long DRX cycle 625 and the drx-StartOffset, and may be used to define a subframe in which the long DRX cycle 625 starts, the drx-LongCycleStartOffset may be set as, for example, time, number of subframes, number of slots, and the like.

Short DRX cycle is the shortest of the two DRX cycles defined to the UE. While operating in long DRX cycle 625, if a predetermined event, for example, the case of receiving 630 PDCCH indicating new uplink transmission or downlink transmission, etc., occurs in the active time 605, the UE starts or restarts the drx-InactivityTimer 620, and if the drx-InactivityTimer 620 expires or a DRX command MAC CE is received, the UE may operate in a short DRX cycle. For example, in FIG. 6, the UE starts drx-ShortCycleTimer at the expiration time of the previous drx-onDurationTimer 615 or drx-InactivityTimer 620, and may operate in a short DRX cycle until the drx-ShortCycleTimer expires. In a case where the UE receives 630 a PDCCH indicating new uplink transmission or downlink transmission, the UE may extend the active time 605 or delay the arrival of the inactive Time 610 in anticipation of additional uplink or downlink transmission in the future. During operation in short DRX, the UE starts drx-onDurationTimer 615 again when a short DRX cycle has elapsed from the start point of the previous on duration. After that, when the drx-ShortCycleTimer expires, the UE operates as a long DRX cycle 625 again.

When operating in the short DRX cycle, the UE may start the drx-onDurationTimer 615 after drx-SlotOffset in a subframe satisfying Equation 3 below. Here, the drx-SlotOffset means a delay before starting the drx-onDurationTimer 615. The drx-SlotOffset may be set to, for example, time, number of slots, and the like.

$$[(SFN\times 10)+\text{subframe number}]\text{modulo}(\text{drx-ShortCycle})=(\text{drx-StartOffset})\text{modulo }(\text{drx-ShortCycle}) \quad \text{[Equation 3]}$$

Here, drx-ShortCycle and drx-StartOffset may be used to define a subframe to start a Short DRX cycle. The drx-ShortCycle and the drx-StartOffset may be set, for example, as time, number of subframes, number of slots, etc.

So far, the DRX operation has been described with reference to FIG. 6. According to an embodiment, the UE may reduce power consumption of the UE by performing a DRX operation. However, even if the UE performs the DRX operation, the UE does not always receive the PDCCH associated with the UE in the active time 605. Accordingly, in an embodiment of the disclosure, a signal for controlling the operation of the UE may be provided in order to save power of the UE more efficiently.

Hereinafter, a carrier aggregation and scheduling method in a 5G communication system will be described in detail.

The UE may access a primary cell through initial access, and the base station may additionally configure one or a plurality of secondary cells to the UE. The UE may perform communication through serving cells including primary cells and secondary cells configured by the base station.

The base station may additionally configure whether to perform cross-carrier scheduling for cells configured to the UE. For convenience of explanation, in a case where cross-carrier scheduling is configured, a cell that performs scheduling (that is, a cell that receives downlink control information corresponding to downlink assignment or uplink grant) is collectively referred to as a "first cell", and a cell in which scheduling is performed (that is, a cell in which downlink or uplink data is actually scheduled and transmitted/received based on downlink control information) is called a "second cell". If the UE receives configuration of cross-carrier scheduling for a specific cell A (scheduled cell) from the base station (in this case, cell A corresponds to the "second cell"), the UE may not perform PDCCH monitoring for cell A in cell A, but may perform in another cell B indicated by cross-carrier scheduling, that is, a scheduling cell (in this case, cell B corresponds to the "first cell"). The base station may configure information (e.g., a cell index of a cell corresponding to the "first cell") on the "first cell" that performs scheduling for the "second cell", a carrier indicator field (CIF) value for the "second cell", etc. for the purpose of configuring cross-carrier scheduling to the UE. For example, the following configuration information may be notified from the base station to the UE through higher layer signaling (e.g., RRC signaling).

TABLE 16

```
CrossCarrierSchedulingConfig ::=          SEQUENCE {
schedulingCellInfo                         CHOICE {
own (self- carrier scheduling)            SEQUENCE {       -- No cross
carrier scheduling
cif-Presence                              BOOLEAN
},
other (cross- carrier scheduling)         SEQUENCE {         -- Cross
carrier scheduling
schedulingCellId                           ServCellIndex,
(cell index of scheduling cell)
cif-InSchedulingCell                        INTEGER (1..7)
(GIF value)
}
},
...
}
```

The UE may monitor the PDCCH for a cell configured by cross-carrier scheduling in a cell corresponding to the "first cell". The UE may determine the index of the cell scheduled by the DCI received from the carrier indicator field value in the DCI format for scheduling data, and based on this, data may be transmitted/received in the cell indicated by the carrier indicator. The scheduled cell (cell A) and the scheduling cell (cell B) may be configured with different numerology. Here, the numerology may include a subcarrier interval, a cyclic prefix, and the like. In a case where the cell A and the cell B have different numerologies, when the PDCCH of cell B schedules the PDSCH of the cell A, the following minimum scheduling offset between the PDCCH and the PDSCH may be additionally considered.

[Cross-Carrier Scheduling Method]

- In a case where the subcarrier spacing of cell B ($\mu_B$) is smaller than the subcarrier spacing of cell A ($\mu_A$), a PDSCH may be scheduled from the next PDSCH slot corresponding to X symbols from the last symbol of the PDCCH received in cell B. Here, X may vary according to $\mu_B$, and may be defined as X=4 symbols when $\mu_B$=15 kHz, X=4 symbols when $\mu_B$=30 kHz, and X=8 symbols when $\mu_B$=60 kHz.
- In a case where the subcarrier spacing of cell B ($\mu_B$) is bigger than the subcarrier spacing of cell A ($\mu_A$), a PDSCH may be scheduled from a time point corresponding to after X symbol from the last symbol of the PDCCH received in cell B. Here, X may vary according to $\mu_B$, and may be defined as X=4 symbols when $\mu_B$=30 kHz, X=8 symbols when $\mu_B$=60 kHz, and X=12 symbols when $\mu_B$=120 kHz.

Hereinafter, higher layer signaling may be signaling corresponding to at least one or a combination of one or more of the following signaling.

MIB (master information block)

SIB (system information block) or SIB X (X=1, 2, . . . )

RRC (radio resource control)

MAC (medium access control) CE (control element)

UE capability reporting

In addition, L1 signaling may be signaling corresponding to at least one or a combination of one or more of the following physical layer channels or signaling methods.

PDCCH (physical downlink control channel)

DCI (downlink control information)

UE-specific DCI group common DCI common DCI

Scheduling DCI (for example, DCI used for scheduling downlink or uplink data)

Non-scheduling DCI (for example, DCI not for the purpose of scheduling downlink or uplink data)

PUCCH (physical uplink control channel)

UCI (uplink control information)

First Embodiment

In a next-generation mobile communication system, the base station may transmit an L1 signal to the UE for the purpose of reducing power consumption of the UE, which may be referred to as a power saving signal (POSS). It is not limited to the above-described example, and the power saving signal may be expressed by various names such as a power control signal, a power setting signal, and the like. More specifically, in an embodiment of the disclosure, the power saving signal (POSS) may be referred to as a wake-up signal (WUS), power control signal, DRX activation signal), on duration activation signal, drx-onDurationTimer activation signal, and the like.

According to an embodiment of the disclosure, the UE may monitor the PDCCH to detect downlink control information (DCI) corresponding to the POSS. Hereinafter, in describing the disclosure, the DCI format corresponding to the POSS will be named DCI format 2_6. DCI format 2_6 is only an example and the content of the disclosure is not limited to a specific DCI format. The CRC of DCI format 2_6 may be scrambled with a specific radio network temporary identifier (RNTI). The specific RNTI may be called, for example, a PS-RNTI. In addition, the PS-RNTI may be a newly defined RNTI or an existing RNTI.

Alternatively, the UE may receive configuration of the PS-RNTI from the base station through higher layer signaling. The UE may receive assuming that DCI format 2_6 corresponding to POSS is scrambled with PS-RNTI. In this case, when performing blind decoding on DCI format 2_6, the UE may de-scramble by using PS-RNTI.

According to an embodiment of disclosure, the base station may configure PDCCH configuration information on DCI format 2_6 to the UE (e.g., the above-described control resource set related configuration information and search space related configuration information may be included) through higher layer signaling. The UE may receive PDCCH configuration information for monitoring DCI format 2_6 corresponding to POSS from the base station through higher layer signaling, and may perform monitoring for DCI format 2_6 based on the PDCCH configuration information. If the UE detects DCI format 2_6, the UE may perform a subsequent operation according to indication information in the detected DCI format 2_6. DCI format 2_6 may include, for example, the following control information.

First control information. An indicator for controlling the PDCCH monitoring operation in the DRX occasion existing after the monitoring occasion for DCI format 2_6 (or it may be expressed as an indicator indicating whether to wake up (wake-up indication), ps-Index, or the like.)

For example, if the value of this field indicates "0", the UE may not perform monitoring for the PDCCH in the DRX active time that exists thereafter (or the UE may not start the drx-onDurationTimer in the DRX occasion that exists later. The above-described operation corresponding to the field value "0" may correspond to the operation of not waking up of the UE).

For example, if the value of this field indicates "1", the UE may perform monitoring for the PDCCH in the DRX active time that exists thereafter (or the UE may start the drx-onDurationTimer in the DRX occasion that exists later. The above-described operation corresponding to the field value "I" may correspond to the operation of waking up of the UE).

Second control information: An indicator indicating a dormancy or an active state for a secondary cell (SCell)

It may consist of an N-bit bitmap, and each bit of the bitmap may correspond to one secondary cell or one secondary cell group consisting of a plurality of secondary cells.

For example, if "0" is indicated as one bit value of the bitmap, the UE may set the cell state to the dormant state for all secondary cells in the secondary cell or secondary cell group indicated by the corresponding bit.

For example, if "I" is indicated as one bit value of the bitmap, the UE may set the cell state to the active state for all secondary cells in the secondary cell or secondary cell group indicated by the corresponding bit.

According to an embodiment of the disclosure, the UE may monitor DCI format 2_6 only in an area other than the DRX active time. More specifically, if the PDCCH monitoring occasion for DCI format 2_6 configured in the UE exists in a time domain other than the DRX active time, the UE may determine that the corresponding PDCCH monitoring occasion is valid, and thus may perform monitoring of the PDCCH for DCI format 2_6 of the corresponding occasion. If the PDCCH monitoring occasion for DCI format 2_6 configured in the UE exists in a time domain corresponding to the DRX active time, the UE may determine that the corresponding PDCCH monitoring occasion is not valid, and thus may not perform monitoring of the PDCCH for DCI format 2_6 in the corresponding occasion.

In an embodiment of the disclosure, the UE may determine that the PDCCH monitoring occasion for DCI format 2_6 is not valid in the following situations, and may not perform monitoring for DCI format 2_6 in the corresponding PDCCH monitoring occasion.

In a case where the PDCCH monitoring occasion for the configured DCI format 2_6 exists within the DRX Active Time In a case where a collision occurs with another operation of the UE or a physical channel (or a higher priority physical channel or an operation related thereto) at the time point corresponding to the PDCCH monitoring occasion for the configured DCI format 26 (for example, in the case of overlapping with the SS/PBCH block, or overlapping with a reference signal that is periodically/semi-permanently transmitted or received (e.g., periodic/semi-permanent CSI-RS/SRS, etc.))

In the case of receiving signaling to cancel the PDCCH monitoring operation on the PDCCH monitoring occasion for the configured DCI format 2_6 According to an embodiment of the disclosure, if the UE does not detect DCI format 2_6 on the PDCCH monitoring occasion for the configured DCI format 2_6, the following operation may be performed.

If the UE is configured with a fallback operation (or ps-fallback) through higher layer signaling from the base station, the UE may perform an operation according to the configuration of the base station. The base station may configure one of the following two operations as a fallback operation for the case that DCI format 2_6 is not received from the UE.

First operation: monitoring for the PDCCH is performed in the DRX active time that exists thereafter.

Second operation: monitoring for the PDCCH is not performed in the DRX active time that exists thereafter If the UE does not receive a fallback operation from the base station through higher layer signaling, the UE may not perform monitoring for the PDCCH in the DRX active time that exists thereafter.

According to an embodiment of the disclosure, the UE may be configured to monitor DCI format 2_6 in the PCell that is the primary cell of the master cell group or the primary secondary cell (PSCell) corresponding to the primary cell of the secondary cell group, and may perform monitoring for DCI format 2_6 based on the configuration information. All or part of the content indicated by DCI format 2_6 may be applied to all secondary cells (SCells) in the cell group to which the PCell (or PSCell) belongs (i.e., MCG for PCell and SCG for PSCell). As an example, if the UE receives an indicator indicating a wake-up by monitoring DCI format 2_6 in the PCell, the UE may perform a wake-up operation for all primary cells and secondary cells existing in the MCG, and if the UE receives an indicator indicating not to wake up, the UE may not perform a wake-up operation for all primary cells and secondary cells existing in the MCG. In addition, if the UE receives an indicator indicating a wake-up by monitoring DCI format 2_6 in the PSCell, the UE may perform a wake-up operation for all primary secondary cells and secondary cells existing in the SCG, and if the UE receives an indicator indicating not to wake up, the UE may not perform a wake-up operation for all primary secondary cells and secondary cells existing in the SCG.

After detecting the DCI format by monitoring the DCI format 2_6, the UE may perform subsequent operations according to the received indication information in the DCI format. In this case, the time required for the decoding operation for the PDCCH corresponding to DCI format 2_6 of the UE and the time for preparation or warming up for performing PDCCH monitoring in the DRX Active Time thereafter according to the instructions of the DCI may be required. In consideration of this, the monitoring occasion of DCI format 2_6 may be configured to be positioned earlier by a specific time interval before DRX on or active time (or before the UE starts drx-onDurationTimer in the same way). That is, the PDCCH monitoring occasion for DCI format 2_6 may be configured to exist at a time point before a specific offset from the start time of each DRX occasion determined by the DRX cycle.

Figure 7:
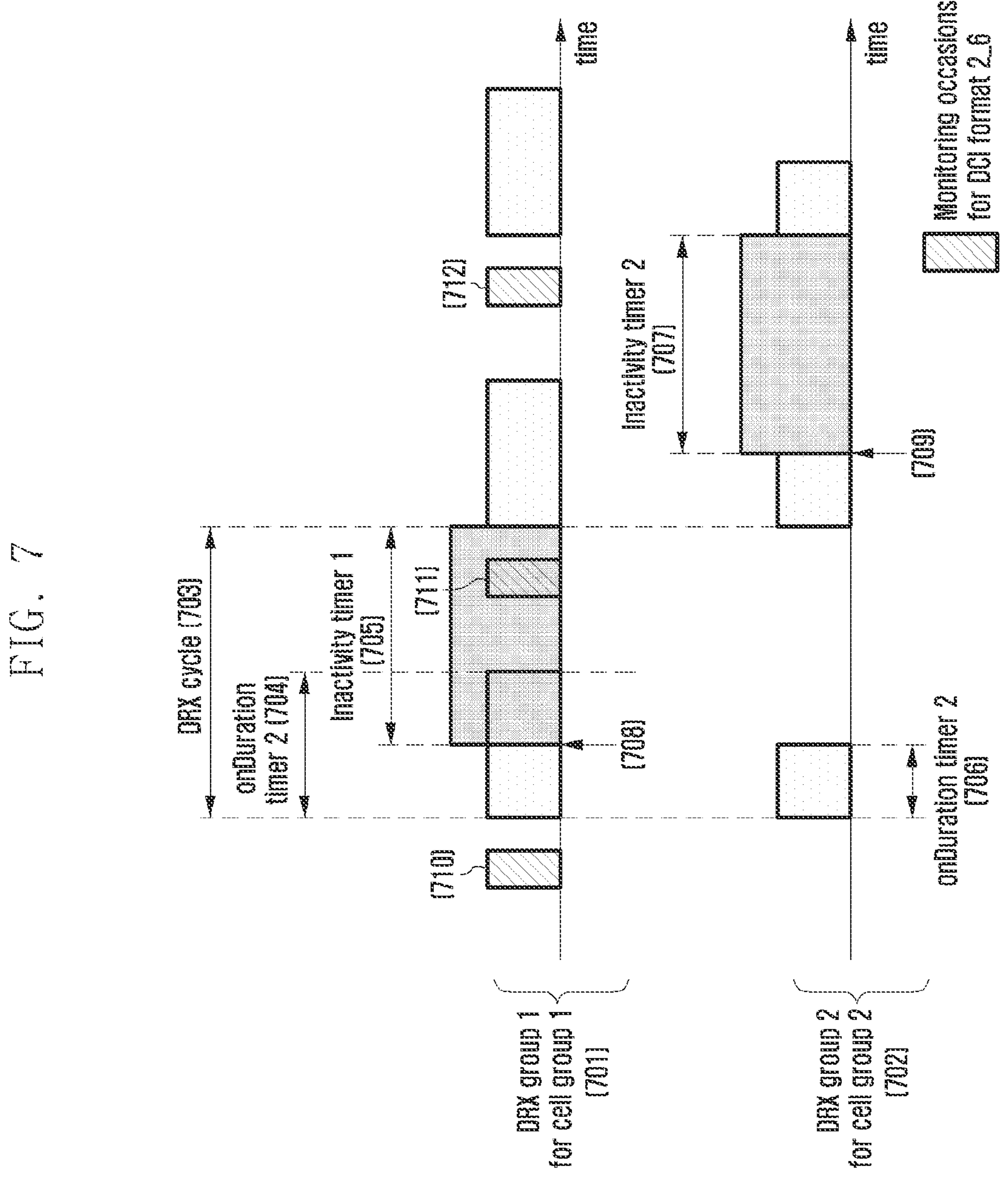
FIG. 7 is a diagram illustrating an example of a DRX operation according to an embodiment of the disclosure.

According to an embodiment of the disclosure, the UE may receive configuration of a plurality of cell groups and DRX groups from the base station, and may control the PDCCH monitoring operation of the UE for each cell group based on DRX configuration information of each DRX group. For example, the UE may receive configuration of N DRX groups, DRX group #1, DRX group #2, . . . , DRX group #N from the base station, and DRX configuration information of each DRX group may be applied to cell group #1, cell group #2, . . . , cell group #N respectively. Values corresponding to all or part of DRX-related configuration parameters of different DRX groups may be the same or different values. FIG. 7 is a diagram illustrating an example in which N=2 DRX groups are configured. According to an example of FIG. 7, the UE may receive configuration information corresponding to DRX group 1 701 for cell group 1 and configuration information corresponding to DRX group 2 702 for cell group 2 from the base station. All or part of the DRX configuration parameters of the DRX group 1 701 and the DRX group 2 702 may be identically or differently configured. For example, in FIG. 7, the DRX cycle 703 of the DRX group 1 701 and the DRX group 2 702 may be set to have the same value or may share one DRX cycle 703 value. As another example, in FIG. 7, timer values of the DRX group 1 701 and the DRX group 2 702 may be set differently. For example, in the DRX group 1 701 in FIG. 7, on-duration timer 1 704 and inactivity timer 1 705 may be set, and in the DRX group 2 702, on-duration timer 2 706 and inactivity timer 2 707 may be independently set. The UE may perform a DRX operation based on the DRX parameter set in the DRX group 1 701 for cell group 1, and the UE may perform a DRX operation for cell group 2 based on the DRX parameter set in the DRX group 2 702.

Hereinafter, in a case where a plurality of DRX groups are configured, a monitoring operation for DCI format 2_6 of the UE and a method for controlling a wake-up operation according thereto will be described in detail.

Embodiment 1-1

In some embodiments of the disclosure, the base station may configure the UE to monitor DCI format 2_6 for each DRX group, and DCI format 2_6 configured for each DRX group may control the PDCCH monitoring operation (or DRX operation) for the cell group of each DRX group and the dormant bandwidth part change operation for the secondary cell. For example, in a case where the UE has two DRX groups, DRX group 1 and DRX group 2, the UE may receive DCI format 2_6 monitoring configuration 1 for DRX group 1, and DCI format 2_6 monitoring configuration 2 for DRX group 2. In addition. DCI format 2_6 configured in DRX group 1 may control DRX operation (or PDCCH monitoring operation) and cell idle state change of DRX group 1, and DCI format 2_6 configured in DRX group 2 may control DRX operation (or PDCCH monitoring operation) and cell idle state change of DRX group 2, respectively.

In some embodiments of the disclosure, with respect to a DRX group for a cell group including a primary cell (PCell or PSCell), the base station may configure the UE to monitor DCI format 2_6 in the primary cell (PCell or PSCell).

In some embodiments of the disclosure, with respect to a DRX group for a cell group that does not include a primary cell (PCell or PSCell), the base station may configure the UE to monitor DCI format 2_6 in the secondary cell having the lowest cell index (or the highest cell index) among the secondary cells in the corresponding cell group.

In some embodiments of the disclosure, the UE may monitor DCI format 2_6 configured for each DRX group, and when DCI format 2_6 is detected, the UE may control (control contents corresponding to the DRX operation or PDCCH monitoring operation (control information 1) and cell idle state change operation (control information 2) that may be included in the DCI format 2_6 described above) the operation of each cell group corresponding to the corresponding DRX group based on the received control information of DCI format 2_6.

Embodiment 1-2

In some embodiments of the disclosure, the base station may configure the UE to monitor DCI format 2_6 for one specific DRX group among a plurality of DRX groups. For example, in a case where two DRX groups, DRX group 1 and DRX group 2 are configured to the UE, the UE may be configured to monitor DCI format 2_6 in a specific cell of cell group 1 corresponding to DRX group 1 or to monitor DCI format 2_6 in a specific cell of cell group 2 corresponding to DRX group 2. In addition, DCI format 2_6 configured to a specific DRX group may control the DRX operation (or PDCCH monitoring operation) and cell idle state change of the entire DRX group.

In some embodiments of the disclosure, in a case where a plurality of DRX groups are configured to the UE, the UE may be configured to monitor DCI format 2_6 in the primary cell from the base station. That is, DCI format 2_6 may be configured for the DRX group for the cell group including the primary cell. In an example of FIG. 7, the UE may be configured with two DRX groups, a DRX group 1 701 and a DRX group 2 702, and the UE may monitor DCI format 26 in DRX group 1 for a cell group (corresponding to cell group 1 in FIG. 7) including a primary cell among them. In this case, DCI format 2_6 may be configured to be monitored in the primary cell.

In some embodiments of the disclosure, in a case where a plurality of DRX groups are configured to the UE, the UE may perform monitoring for DCI format 2_6 in a specific cell (e.g., a primary cell) in a cell group belonging to one DRX group. In a case where the UE detects DCI format 2_6, the received control information of DCI format 2_6 may control the DRX operation or the PDCCH monitoring operation (control information 1) and the cell idle state change operation (control information 2) for the entire DRX group. To explain with a specific example, in an example illustrated in FIG. 7, the UE may be configured with DRX group 1 and DRX group 2, and may be configured to monitor DCI format 26 in a specific cell of specific DRX group 1. If the UE obtains an indicator indicating wake-up from the received DCI format 2_6, the UE may start drx-onDurationTimer for both DRX group 1 and DRX group 2, and if the UE obtains an indicator indicating not to perform a wake-up from the received DCI format 2_6, the UE may not start drx-onDurationTimer for both DRX group 1 and DRX group 2.

The above operation may be described as follows.

First control information: An indicator (or it may be expressed as an indicator indicating whether to wake up (wake-up indication), ps-Index, or the like) for controlling the PDCCH monitoring operation in the DRX occasion existing after the monitoring occasion for DCI format 2_6

For example, if the value of this field indicates "0", for all configured DRX groups, the UE may not perform monitoring of the PDCCH in the DRX Active Time that exists thereafter (or, for all configured DRX groups, the UE may not start the drx-onDurationTimer in the DRX occasion that exists later. The above-described operation corresponding to the field value "0" may correspond to the operation of not waking up the UE).

For example, if the value of this field indicates "I", for all configured DRX groups, the UE may perform monitoring of the PDCCH in the DRX Active Time that exists thereafter (or, for all configured DRX groups, the UE may start the drx-onDurationTimer in the DRX occasion that exists later. The above-described operation corresponding to the field value "1" may correspond to the operation of waking up the UE).

Embodiment 1-3

According to some embodiments of the disclosure, in a case where a plurality of DRX groups are configured to the UE, in the method of monitoring DCI format 2_6, the UE may monitor only in an area other than the DRX active time in all configured DRX groups. More specifically, if the PDCCH monitoring occasion for DCI format 26 configured to the UE exists in a time domain only other than the DRX active time of all DRX groups, the UE may determine that the PDCCH monitoring occasion is valid, and accordingly, monitoring of the PDCCH for DCI format 2_6 of the corresponding occasion may be performed. If the PDCCH monitoring occasion for DCI format 2_6 configured to the UE exists in the time domain corresponding to the DRX active time of at least one DRX group, the UE may determine that the PDCCH monitoring occasion is not valid, and accordingly, monitoring of the PDCCH for DCI format 2_6 of the corresponding occasion may not be performed. When described with reference to FIG. 7, among the monitoring occasions 710, 711, and 712 for DCI format 2_6 configured to the UE, 711 overlaps the area corresponding to the active time of the DRX group 1 701, 712 overlaps with the area corresponding to the active time of the DRX group 2 702, and 710 exists in the area that is not the active time in both the DRX group 1 701 and the DRX group 2 702. Therefore, the UE may determine that only the monitoring occasion corresponding to 710 among 710, 711, and 712 is valid, and may perform PDCCH monitoring for DCI format 2_6 in 710, and may determine that the monitoring occasions corresponding to 711 and 712 are not valid, and accordingly, monitoring for DCI format 2_6 in 711 and 712 may not be performed.

According to some embodiments of the disclosure, in a case where the UE determines that the PDCCH monitoring occasions for the configured DCI format 2_6 are not valid, and does not receive the DCI format 2_6 on the corresponding monitoring occasion, the UE may follow at least one of the following operations.

Zeroth operation: The currently running DRX timer (e.g., drx-onDurationTimer or drx-inactivityTimer, etc.) of all DRX groups may be maintained as it is. That is, the currently ongoing DRX operation of all DRX groups may be maintained as it is.

First operation: For the DRX occasion of all DRX groups that exist thereafter, the UE may start drx-onDurationTimer.

Second operation: For the DRX occasion of all DRX groups that exist thereafter, the UE may not start drx-onDurationTimer.

Third operation: Whether the first operation or the second operation may be configured by higher layer signaling, and may be performed according to the set operation. If no operation is configured, at least one of the first operation and the second operation may be performed as a basic operation.

Embodiment 1-4

According to some embodiments of the disclosure, in a case where a plurality of DRX groups are configured to the UE, in the method of monitoring DCI format 2_6, the UE may monitor only in an area other than the DRX active time in DRX groups corresponding to a cell in which DCI format 2_6 is configured. More specifically, if the UE is configured to monitor DCI format 2_6 in a specific cell (e.g., primary cell) of DRX group A, the UE may determine that the PDCCH monitoring occasion for DCI format 2_6 is valid only when the PDCCH monitoring occasion for DCI format 2_6 exists in a time domain other than the DRX Active Time of DRX group A, and accordingly, monitoring of the PDCCH for DCI format 2_6 of the corresponding occasion may be performed. If the PDCCH monitoring occasion for DCI format 2_6 configured to the UE exists in the time domain corresponding to the DRX active time of DRX group A, the UE may determine that the corresponding PDCCH monitoring occasion is not valid, and accordingly, monitoring for the PDCCH for DCI format 2_6 may not be performed on the corresponding occasion. When described with reference to FIG. 7, in a case where monitoring for DCI format 2_6 is configured in a specific cell (e.g., primary cell) of DRX group 1 to the UE, among the monitoring occasions 710, 711, and 712 for DCI format 26 configured in the UE, 711 overlaps the area corresponding to the active time of the DRX group 1 701, and 712 overlaps the area corresponding to the active time of the DRX group 2 702, but does not overlap the area corresponding to the active time of the DRX group 1 701, and 710 exists in a non-active time area in both DRX group 1 701 and DRX group 2 702. Accordingly, the UE may determine that the monitoring occasion corresponding to 710, 712 among 710, 711, 712 is valid, perform PDCCH monitoring for DCI format 2_6 in 710 and 712, determine that the monitoring occasion corresponding to 711 is not valid, and accordingly, may not perform monitoring for DCI format 2_6 in 711.

A DRX group for a cell group including a cell in which DCI format 2_6 is configured is named "first DRX group".

In some embodiments of the disclosure, in a case where a plurality of DRX groups are configured to the UE, the PDCCH monitoring occasion for DCI format 2_6 configured to the UE exists in an area other than the DRX active time of the DRX group corresponding to the "1st DRX group", and exists in the area corresponding to the DRX active time of the DRX group other than the "1st DRX group", the UE may determine that the monitoring occasion is valid, and may also apply all or part of the control information transmitted in DCI format 2_6 received on the corresponding monitoring occasion to the cells of the DRX group corresponding to the "1st DRX group", and may perform a basic operation or a countermeasure operation for DRX groups other than the "1st DRX group". For example, in the above-described case, the UE may apply the wake-up indication received in DCI format 2_6 only to the DRX group corresponding to the "first DRX group". In an example of FIG. 7, if the UE receives an indicator indicating to wake up through DCI format 2_6 received in 712, the UE may start drx-onDurationTimer in the DRX occasion that exists later for DRX group 1 701, and if the UE receives an indicator indicating not to wake up through DCI format 2_6 received in 712, the UE may not start the drx-onDurationTimer in the DRX occasion that exists later with respect to the DRX group 1 701. In this case, the UE may perform a basic operation or a fallback operation for the DRX group 2 702 regardless of the contents of the wake-up indicator of the DCI format 2_6, and for example, at least one of the following operations may be followed.

Zeroth operation: The currently running DRX timer (e.g., drx-onDurationTimer or drx-inactivityTimer, etc.) of DRX group other than "first DRX group" may be maintained as it is. That is, the currently ongoing DRX operation of the DRX group other than the "first DRX group" may be maintained as it is.

First operation: For the DRX occasion of DRX groups other than the "1st DRX group" that exists thereafter, the UE may start drx-onDurationTimer.

Second operation: For the DRX occasion of DRX groups other than the "1st DRX group" that exists thereafter, the UE may not start drx-onDurationTimer.

Third operation: Whether the first operation or the second operation may be configured by higher layer signaling, and may be performed according to the set operation. If no operation is configured, at least one of the first operation and the second operation may be performed as a basic operation.

Embodiment 1-5

In an embodiment of the disclosure, in relation to the capability of monitoring the DCI format 2_6 described above, the UE may report the capability for the minimum time interval for the UE to monitor the PDCCH before the DRX occasion (that is, before the starting point of the slot where the UE intends to start drx-onDurationTimer) to the base station. Let the above-mentioned time interval be named "$T_{gap}$,". If the UE reports the capability for the time interval corresponding to the $T_{gap}$ to the base station, even if a monitoring occasion corresponding to DCI format 2_6 exists during a time interval corresponding to $T_{gap}$ from the time when the DRX occasion is started, the UE may not perform monitoring for the same.

In an embodiment of the disclosure, in a case where the bitmap field corresponding to the dormant bandwidth part change indicator is configured in DCI format 2_6, even if a monitoring occasion corresponding to DCI format 2_6 exists during a time interval corresponding to $T_{gap}+T_{bwp}$ from the time when the DRX occasion is started, the UE may not perform monitoring for the same. Here. $T_{bwp}$ may correspond to a bandwidth part change delay time (refer to Table 3) or a delay time required to activate a dormant bandwidth part. In a case where the dormant bandwidth part may be indicated in DCI format 2_6, the UE needs to secure an additional time interval for potential dormant bandwidth part change. Therefore, monitoring for DCI format 2_6 may not be performed during $T_{gap}+T_{bwp}$ longer than $T_{gap}$.

The above-described UE operation may be as follows.

If a UE reports for an active DL BWP a requirement for a number of slots prior to the beginning of a slot where the UE would start the drx-onDurationTimer,
if a UE is configured with the bitmap, the UE is not required to monitor PDCCH for detection of DCI format 2_6 during the number of slots + T_bwp slots where T_bwp is a delay required by the UE for an active DL BWP change [10, TS 38.133].
- otherwise, the UE is not required to monitor PDCCH for detection of DCI format 2_6 during the number of slots.

Embodiment 1-6

According to some embodiments of the disclosure, in a case where a plurality of DRX groups are configured to the UE, in the method of monitoring DCI format 2_6, the UE may monitor only in an area other than the DRX active time DRX group corresponding to a cell in which DCI format 2_6 is configured.

More specifically, if the UE is configured to monitor DCI format 26 in a specific cell (e.g., primary cell) of DRX group A, the UE may determine that the PDCCH monitoring occasion for DCI format 2_6 is valid only when the PDCCH monitoring occasion for DCI format 2_6 exists in a time domain other than the DRX Active Time of DRX group A. and accordingly, monitoring of the PDCCH for DCI format 2_6 of the corresponding occasion may be performed. If the PDCCH monitoring occasion for DCI format 2_6 configured to the UE exists in the time domain corresponding to the DRX active time of DRX group A, the UE may determine that the corresponding PDCCH monitoring occasion is not valid, and accordingly, monitoring for the PDCCH for DCI format 2_6 may not be performed on the corresponding occasion. When described with reference to FIG. 7, in a case where monitoring for DCI format 2_6 is configured in a specific cell (e.g., primary cell) of DRX group 1 to the UE, among the monitoring occasions 710, 711, and 712 for DCI format 26 configured in the UE, 711 overlaps the area corresponding to the active time of the DRX group 1 701, and 712 overlaps the area corresponding to the active time of the DRX group 2 702, but does not overlap the area corresponding to the active time of the DRX group 1 701, and 710 exists in a non-active time area in both DRX group 1 701 and DRX group 2 702. Accordingly, the UE may determine that the monitoring occasion corresponding to 710, 712 among 710, 711, 712 is valid, perform PDCCH monitoring for DCI format 2_6 in 710 and 712, determine that the monitoring occasion corresponding to 711 is not valid, and accordingly, may not perform monitoring for DCI format 2_6 in 711.

A DRX group for a cell group including a cell in which DCI format 2_6 is configured is named "first DRX group".

In some embodiments of the disclosure, in a case where a plurality of DRX groups are configured to the UE, the PDCCH monitoring occasion for DCI format 2_6 configured to the UE exists in an area other than the DRX active time of the DRX group corresponding to the "1st DRX group", and exists in the area corresponding to the DRX active time of the DRX group other than the "1st DRX group", the UE may determine that the monitoring occasion is valid.

In this case, in a case where specific "condition A" is satisfied, all or part of the control information transmitted in DCI format 2_6 received on the corresponding monitoring occasion may be applied not only to the DRX group corresponding to the "1st DRX group" but also to other DRX groups corresponding to the "1st DRX group".

Specific condition A may correspond to, for example, at least one of the following conditions or a combination of one or more of the following conditions.

[Condition A]

In a case where all or part of the PDCCH monitoring occasion corresponding to DCI format 2_6 overlaps with the DRX active time of the DRX group other than the "1st DRX group"

In a case where the time interval between the end of the current DRX active time of the DRX group other than the "1st DRX group" and the start of the subsequent DRX active time is greater than $T_{gap}$ In the condition A, $T_{gap}$ is related to the capability of monitoring DCI format 2_6 and may correspond to the capability for the minimum time interval for the UE to monitor the PDCCH before the DRX occasion (that is, before the starting point of the slot where the UE intends to start drx-onDurationTimer) (refer the definition of the embodiment 1-5).

In this case, in a case where specific "condition A" is satisfied, all or part of the control information transmitted in DCI format 2_6 received from the corresponding monitoring occasion may be applied to cells of the DRX group corresponding to the "1st DRX group", and a basic operation or a fallback operation may be performed for other DRX groups other than the "first DRX group".

Specific condition B may correspond to, for example, at least one of the following conditions or a combination of one or more of the following conditions.

[Condition B]

In a case where all or part of the PDCCH monitoring occasion corresponding to DCI format 2_6 overlaps with the DRX active time of the DRX group other than the "1st DRX group"

In a case where the time interval between the end of the current DRX active time of the DRX group other than the "1st DRX group" and the start of the subsequent DRX active time is smaller than $T_{gap}$ In the condition A, $T_{gap}$ is related to the capability of monitoring DCI format 2_6 and may correspond to the capability for the minimum time interval for the UE to monitor the PDCCH before the DRX occasion (that is, before the starting point of the slot where the UE intends to start drx-onDurationTimer) (refer the definition of the embodiment 1-5).

For example, in the above-described case, the UE may apply the wake-up indication received in DCI format 2_6 only to the DRX group corresponding to the "first DRX group". In an example of FIG. 7, if the UE receives an indicator indicating to wake up through DCI format 2_6 received in 712, the UE may start drx-onDurationTimer in the DRX occasion that exists later for DRX group 1 701, and if the UE receives an indicator indicating not to wake up through DCI format 2_6 received in 712, the UE may not start the drx-onDurationTimer in the DRX occasion that exists later with respect to the DRX group 1 701.

In this case, if condition A is satisfied, the UE may equally apply the contents of the wake-up indicator of the DCI format 2_6 to the DRX group 2 702.

If condition B is satisfied, the UE may perform a basic operation or a fallback operation for the DRX group 2 702 regardless of the contents of the wake-up indicator of the DCI format 2_6, and for example, at least one of the following operations may be followed.

Zeroth operation: The currently running DRX timer (e.g., drx-onDurationTimer or drx-inactivityTimer, etc.) of the DRX group other than the "first DRX group" may be maintained as it is. That is, the currently ongoing DRX operation of the DRX group other than the "first DRX group" may be maintained as it is.

First operation: For the DRX occasion of DRX groups other than the "1st DRX group" that exists thereafter, the UE may start drx-onDurationTimer.

Second operation: For the DRX occasion of DRX groups other than the "1st DRX group" that exists thereafter, the UE may not start drx-onDurationTimer.

Third operation: Whether the first operation or the second operation may be configured by higher layer signaling, and may be performed according to the set operation.

If no operation is configured, at least one of the first operation and the second operation may be performed as a basic operation.

Whether to operate in the above-described embodiments 1-1, 1-2, 1-3, 1-4, and 1-6 may be determined by the configuration of the base station.

Figure 8:
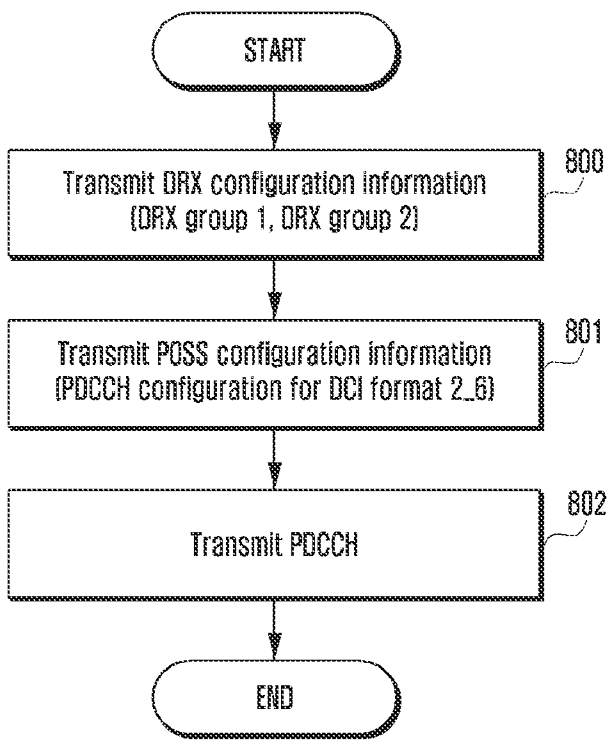
FIG. 8 is a diagram illustrating an operation of a base station according to an embodiment of the disclosure.

FIG. 8 is a diagram illustrating an operation of a base station according to an embodiment of the disclosure.

The base station may transmit configuration information on DRX to the UE through higher layer signaling in step 800. In this case, the base station may transmit configuration information on a plurality of DRX groups, for example, a first DRX group and a second DRX group to the UE. The base station may transmit configuration information on POSS, for example, PDCCH configuration information on DCI format 2_6, to the UE through higher layer signaling in step 801. The base station may transmit the PDCCH to the UE based on the DRX configuration information and the PDCCH configuration information in step 802. In this case, the base station may determine whether the PDCCH monitoring occasion for DCI format 2_6 exists within the active time of the 1st DRX group or the 2nd DRX group. In addition, in a case where it is determined that the PDCCH monitoring occasion for the DCI format 2_6 exists within the active time of the 1st DRX group or the 2nd DRX group, the base station may not transmit the PDCCH for DCI format 2_6 existing within the active time.

Figure 9:
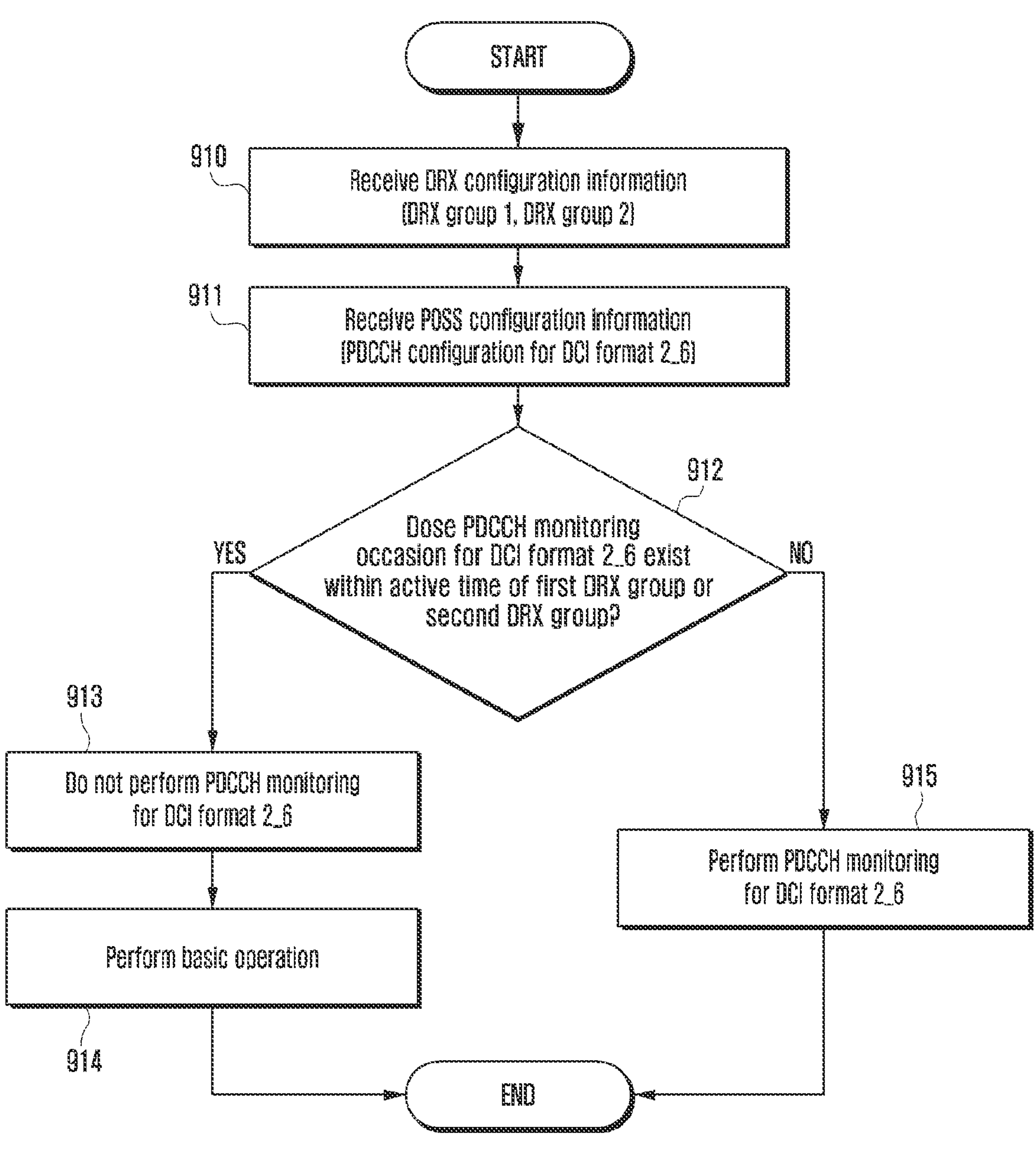
FIG. 9 is a diagram illustrating an operation of a UE according to an embodiment of the disclosure.

FIG. 9 is a diagram illustrating an operation of a UE according to an embodiment of the disclosure.

The UE may receive configuration information on DRX from the base station through higher layer signaling in step 910. In this case, the UE may receive configuration information on a plurality of DRX groups, for example, a first DRX group and a second DRX group from the base station. The UE may receive configuration information on POSS, for example, PDCCH configuration information on DCI format 2_6, from the base station through higher layer signaling in step 911. In step 912, the UE may determine whether the PDCCH monitoring occasion for DCI format 2_6 exists within the active time of the 1st DRX group or the 2nd DRX group (specifically, it is determined based on the contents of the first embodiment described above, such as whether the PDCCH monitoring occasion exists within the active time of the 1st DRX group, or within the active time of the 2nd DRX group, or within the active time of both the 1st DRX group and the 2nd DRX group). If it is determined in step 912 that the PDCCH monitoring occasion exists within the active time of the 1st DRX group or the 2nd DRX group, the UE may not perform PDCCH monitoring for DCI format 2_6 in step 913, and thus may perform a basic operation in step 914 (operation based on the detailed embodiment of the first embodiment described above). If it is determined in step 912 that the PDCCH monitoring occasion does not exist within the active time of the 1st DRX group or the 2nd DRX group, the UE may perform PDCCH monitoring for the corresponding DCI format in step 915.

Second Embodiment

In the following of the disclosure, a dormant bandwidth part is newly proposed in a next-generation mobile communication system, and a UE operation in each bandwidth part is specifically proposed when each bandwidth part is transited or switched.

Figure 10:
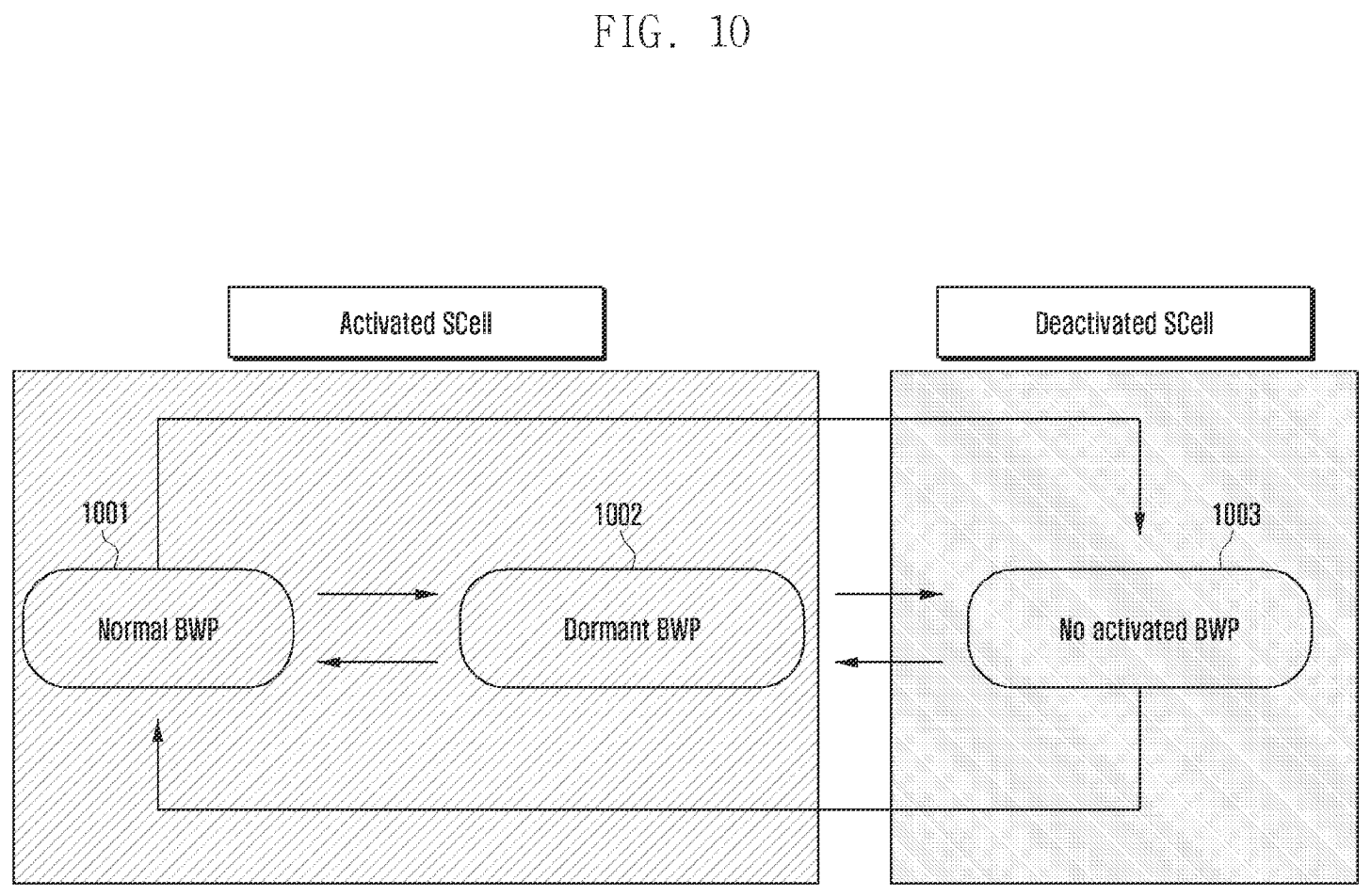

FIG. 10 is a diagram illustrating a state transition or bandwidth part switching procedure for each bandwidth part proposed by the disclosure.

As illustrated in FIG. 10, the bandwidth part of each cell (e.g., SCell) of the UE may be activated as a normal bandwidth part 1001, may be activated as a dormant bandwidth part 1002, or may be deactivated 1003, and may activate or deactivate the normal bandwidth part or the dormant bandwidth part due to an indication by the configuration information of the RRC message, the MAC control information, or the DCI of the PDCCH. As another method, the bandwidth part of each cell of the UE may have an active state 1001, a deactivated state 1003, or a dormant state 1002, and may perform state transition due to an indication by configuration information of an RRC message or MAC control information or DCI of a PDCCH.

State transition operation (activation or deactivation or dormancy) for each bandwidth part of the Scell, or activating a normal bandwidth part, or activating a dormant bandwidth part, or activating the first active bandwidth part that becomes active from dormancy, or deactivating a normal bandwidth part or a dormant bandwidth part proposed in the disclosure may be performed due to an indication or configuration in one of the following cases.

In a case where the state of the bandwidth part of the SCell is configured with the RRC message, or the bandwidth part of each SCell is configured with the RRC message, and the dormant bandwidth part is configured in the SCell, or the first active bandwidth part is configured as the dormant bandwidth part, it may be characterized by switching or activating the dormant bandwidth part to start the SCell and performing the operation in the dormant bandwidth part.

In a case where Scell activation or deactivation or dormant MAC CE is received,

In a case where the MAC CE is received from normal bandwidth part or dormant to activate or deactivate the first active bandwidth part or dormant bandwidth part, In a case where the DCI of the PDCCH is received from the normal bandwidth part or dormant to activate or deactivate or switch the first active bandwidth part or dormant bandwidth part, In a case where the cell dormancy timer is not set in the active state Scell and the set cell deactivation timer expires, In a case where the bandwidth part dormancy timer is not set in the active state bandwidth part, and the set bandwidth part state deactivation timer (e.g., bwpDeactivatedTimer) expires, In a case where the cell dormancy timer set in the active state Scell expires, In a case where the bandwidth part dormancy timer set in the active state bandwidth part expires, In a case where the dormant state Scell deactivation timer set in the dormant state Scell expires, In a case where the dormant bandwidth part deactivation timer (dormantBWPDeactivatedTimer) set in the dormant bandwidth part expires.

In addition, the state transition operation or the dormant bandwidth part operation method proposed by the disclosure may have the following characteristics.

In the Spcell (Pcell or Pscell)(or the downlink bandwidth part or the uplink bandwidth part of the cell), the dormant bandwidth part cannot be configured, but only the normal bandwidth part is configured and is always activated. Because Spcell synchronizes and major control signals are transmitted and received, if the bandwidth part of Spcell becomes dormant or inactive, or operates as a dormant bandwidth part, the connection with the base station is released, so it must always be kept active.

Although it is a bandwidth part of Scell or SCell, if PUCCH is configured, it is characterized in that dormant state or dormant bandwidth part cannot be configured. Because there may be other cells that need to send feedback such as HARQ ACK/NACK with PUCCH, the active state or the normal bandwidth part should be activated and used.

Due to the above characteristics, neither the cell deactivation timer (ScellDeactivationTimer) or the bandwidth part dormancy timer is applied to the bandwidth part of the Spcell or Spcell and the bandwidth part of the Scell or SCell in which the PUCCH is configured, but may be driven only for other Scells.

The cell or bandwidth part dormancy timer (ScellHibernationTimer) has priority over the cell or bandwidth part state deactivation timer (ScellDeactivationTimer). In addition, if one value is set for the timer value with the RRC message, the same value may be applied to all cells. As another method, the base station may provide different timer values for each Scell or for each BWP in consideration of the characteristics of each Scell or each BWP.

If the Scell or bandwidth part is not indicated to be activated or dormant with the RRC message, it may be characterized in that the Scell or bandwidth part basically operates in a deactivated state initially.

In the disclosure, the uplink may indicate the uplink bandwidth part, and the downlink may indicate the downlink bandwidth part. This is because only one activated or dormant bandwidth part may be operated for each uplink or downlink.

In the following of the disclosure, a method for operating a state transition by the bandwidth part-level proposed above of the disclosure is specifically proposed to enable the carrier aggregation technology to be rapidly activated, and to save the battery of the UE.

In the disclosure, the bandwidth part may be configured for each cell as follows in the RRCSetup message, the RRCReconfiguration message, or the RRCResume message as described with reference to FIG. 1F. The RRC message may include configuration information on a PCell or Pscell or a plurality of Scells, and may configure a plurality of bandwidth parts for each cell (PCell or Pscell or Scell). When configuring a plurality of bandwidth parts for each cell in the RRC message, a plurality of bandwidth parts to be used in the downlink of each cell may be configured, and in the case of the FDD system, a plurality of bandwidth parts to be used in the uplink of each cell may be configured separately from the downlink bandwidth parts. In the case of the TDD system, a plurality of bandwidth parts to be commonly used in the downlink and the uplink of each cell may be configured.

The first method of the information configuration method for configuring the bandwidth part of each cell (PCell or Pscell or Scell) may indicate whether each bandwidth part is a normal bandwidth part (e.g., bandwidth part that may be operated or configured in an active or deactivated state) or a dormant bandwidth part (e.g., bandwidth part that may be operated or configured in dormant state) by including one or a plurality of pieces of information among the following information and introducing a new indicator to the bandwidth part. For example, the bandwidth part identifier may be used to indicate whether the bandwidth part is dormant or not.

Downlink bandwidth part configuration information of each cell

Initial downlink bandwidth part (initial downlink BWP) configuration information Multiple bandwidth part configuration information and bandwidth part identifier (BWP ID) corresponding to each bandwidth part Downlink initial state configuration information of the cell (e.g., active state, dormant state, or deactivated state)

Bandwidth part identifier indicating the first active downlink bandwidth part (first active downlink BWP)

Bandwidth part identifier indicating the default bandwidth part (default BWP)

Bandwidth part identifier indicating a dormant bandwidth part or a 1-bit indicator indicating a dormant bandwidth part for each bandwidth part in the bandwidth part configuration information Bandwidth part deactivation timer configuration and timer value Uplink bandwidth part configuration information of each cell Initial uplink bandwidth part (initial uplink BWP) configuration information Multiple bandwidth part configuration information and bandwidth part identifier (BWP ID) corresponding to each bandwidth part Uplink initial state configuration information of the cell (e.g., active state, dormant state, or deactivated state)

Bandwidth part identifier indicating the first active uplink bandwidth part (first active uplink BWP)

Bandwidth part identifier indicating a dormant bandwidth part or a 1-bit indicator indicating a dormant bandwidth part for each bandwidth part in the bandwidth part configuration information As another method of the information configuration method for configuring the bandwidth part of each cell (PCell or Pscell or Scell), the second method may not configure configuration information (e.g., search space, PDCCH transmission resource, period, etc.) required to read the PDCCH for the bandwidth part corresponding to the dormant bandwidth part (as another method, the cycle may be set very long along with other configuration information), and may configure configuration information (e.g., search space, PDCCH transmission resource, period, etc.) required to read the PDCCH for the normal bandwidth part. This is because the dormant bandwidth part is a bandwidth part not to read the PDCCH for reducing the UE's battery consumption, and to allocate fast uplink or downlink transmission resources by enabling the activation of a fast bandwidth part or cell through performing channel measurement and reporting the channel measurement result to the PCell. Accordingly, in the disclosure, the dormant bandwidth part may indicate a bandwidth part in which configuration information (e.g., search space, PDCCH transmission resource, period, etc.) for PDCCH monitoring is not configured, or may mean a bandwidth part indicated by the dormant bandwidth part identifier, or may mean a bandwidth part configured to monitor with a very long period although configuration information for PDCCH monitoring is configured. As another method, in the disclosure, the dormant bandwidth part may indicate a bandwidth part that configures search space information or cross-carrier scheduling configuration information to receive switching or indications for the dormant bandwidth part in another cell through cross-carrier scheduling while configuring not to perform PDCCH monitoring in the cell in which the dormant bandwidth part is configured by not configuring PDCCH transmission resource, period, etc. in the configuration information for PDCCH monitoring, and because data transmission and reception is impossible in the dormant bandwidth part, it may be characterized in that only PDCCH configuration information (PDCCH-config) is configured (e.g., only search space information is configured) for the dormant bandwidth part (or the first bandwidth part). On the other hand, because PDCCH monitoring must also be performed and data transmission and reception must be possible in the normal bandwidth part (or the second bandwidth part) not the dormant bandwidth part, it may be characterized in that PDCCH configuration information (e.g., CORESET configuration information or search space configuration information or PDCCH transmission resource or period, etc.) and PDSCH configuration information or PUSCH configuration information or random access related configuration information may be further configured.

Accordingly, as described above, although the uplink or downlink normal bandwidth part should be configured for each cell, the dormant bandwidth part may or may not be configured for each cell, and the configuration may be left to the base station implementation according to the purpose. In addition, depending on the implementation of the base station, the first active bandwidth part, the basic bandwidth part, or the initial bandwidth part may be configured as the dormant bandwidth part.

In the dormant bandwidth part, it is characterized that the UE cannot transmit and receive data with the base station, does not monitor the PDCCH for identifying the indication of the base station, does not transmit a pilot signal, but performs channel measurement, and reports the measurement result for the measured frequency/cell/channel periodically or when an event occurs according to the base station configuration. Accordingly, because the UE does not monitor the PDCCH in the dormant bandwidth part and does not transmit a pilot signal, it is possible to save battery compared to the active mode, and performs a channel measurement report unlike the inactive mode, the base station may use the carrier aggregation technique by quickly activating the cell in which the dormant bandwidth part is configured based on the measurement report of the dormant bandwidth part. In addition, in the disclosure, the dormant bandwidth part is configured in the downlink bandwidth part configuration information, and may be characterized in that the dormant bandwidth part is used only for the downlink bandwidth part.

In the disclosure, the UE operation for the dormant bandwidth part (dormant BWP) or the UE operation of the activated SCell when the dormant bandwidth part is activated is as follows.

One or a plurality of operations may be performed among the following operations if the UE is instructed to operate or activate the dormant bandwidth part for the serving cell (PCell or SCell), or if an instruction to put the bandwidth part (e.g., downlink bandwidth part) of the current cell (PCell or SCell) or the cell dormant, or an instruction to activate the dormant bandwidth part is received through DCI (L1 control signal) or MAC CE or RRC message of PDCCH, or if an instruction to switch the bandwidth part (e.g., downlink bandwidth part) to the dormant bandwidth part is received through a DCI (L1 control signal) or MAC CE or RRC message of the PDCCH (in the case of receiving an indication with the L1 control signal of the PDCCH in the above, the indication may be received on the PDCCH of one's own cell by self-scheduling, or the indication may be received on the PDCCH for the cell in the PCell by cross-carrier scheduling), or if the bandwidth part dormancy timer was set and the timer expired, or if the activated bandwidth part of the activated Scell is the dormant bandwidth part, or if the activated bandwidth part of the activated SCell is not the normal bandwidth part.

In the above, the uplink bandwidth part or the downlink bandwidth part is switched to a bandwidth part (e.g., dormant bandwidth part) configured in RRC, and the bandwidth part is activated or dormant.

Stop the cell deactivation timer set or running in the cell or bandwidth part.

If the bandwidth part dormancy timer is set in the bandwidth part of the cell, stop the bandwidth part dormancy timer.

Start or restart the dormant state bandwidth part deactivation timer in the bandwidth part of the cell.

Stop the bandwidth part deactivation timer set for the bandwidth part of the cell. This is to prevent an unnecessary bandwidth part switching procedure in the cell.

It is possible to clear the periodic downlink transmission resource (DL SPS or configured downlink assignment) or the configured periodic uplink transmission resource (UL SPS or configured uplink grant Type 2) in the bandwidth part of the cell. In the above, clear means that the UE stores configuration information such as period information set in the RRC message, but means that information on periodic transmission resources indicated or activated by L1 signaling (e.g., DCI) is removed and is no longer used. The method proposed above, that is, clearing the configured periodic downlink transmission resource (DL SPS or configured downlink assignment) or the configured periodic uplink transmission resource (UL SPS or configured uplink grant) may be performed only when the bandwidth part transits from the active state to the dormant state. This is because, when the bandwidth part transits from the inactive state to the dormant state, there is no information on periodic transmission resource information indicated by L1 signaling or activated. As another method, the periodic transmission resources may be cleared only when the periodic downlink transmission resource or the periodic uplink transmission resource is configured or configured and used.

It is possible to suspend the use of the periodic uplink transmission resource (configured uplink grant Type 1 configured with RRC) configured in the bandwidth part of the cell. In the above, the meaning of suspending means that the UE stores the transmission resource configuration information configured in the RRC message, but does not use it anymore. The method proposed above, that is, the operation of suspending the configured periodic uplink transmission resource (configured uplink grant Type 1) may be performed only when the bandwidth part transits from the active state to the dormant state. This is because, when the bandwidth part transits from the inactive state to the dormant state, periodic transmission resources are not used. As another method, the periodic transmission resources may be cleared only when the periodic downlink transmission resource or the periodic uplink transmission resource is configured or configured and used.

All HARQ buffers configured in the uplink or downlink bandwidth part are emptied.

The UE does not transmit SRS for the uplink bandwidth part of the cell.

In the bandwidth part of the cell, the UE performs channel measurement (CSI or CQI or PMI or RI or PTI or CRI, etc.) for downlink according to the configuration of the base station and performs measurement report. For example, a channel or frequency measurement report may be periodically performed.

In the bandwidth part of the cell, uplink data is not transmitted on the UL-SCH.

The random access procedure is not performed on the bandwidth part of the cell.

The UE does not monitor the PDCCH in the bandwidth part of the cell.

The UE does not monitor the PDCCH for the bandwidth part of the cell. However, in the case of cross-scheduling, the scheduled cell (e.g., PCell) may receive an instruction by monitoring the PDCCH for the cell (e.g., SCell).

PUCCH or SPUCCH transmission is not performed in the bandwidth part of the cell.

In the above, the downlink bandwidth part may be dormant and channel measurement may be performed and reported, and the uplink bandwidth part of the cell may be deactivated and not used. This is because, in the dormant Scell, channel measurement is performed only for the downlink bandwidth part, and the measurement result is reported as the uplink bandwidth part of the Spcell (Pcell or Pscell) or the Scell with PUCCH.

If switching or activation to the dormant bandwidth part is indicated for the downlink or dormancy is indicated for the bandwidth part in the above, the random access procedure may be performed without canceling. This is because the Scell transmits the preamble to the uplink and receives the random access response to the downlink of the Pcell when performing the random access procedure. Accordingly, even if the downlink bandwidth part becomes dormant or is switched to the dormant bandwidth, there is no problem.

Among the UE operations for the above-described dormant bandwidth part (dormant BWP) or UE operations when the dormant bandwidth part is activated, an operation related to downlink is called “downlink dormant operation” and an operation related to uplink is called “uplink dormant operation”.

In the disclosure, when the normal bandwidth part of the activated SCell (active BWP, active Band Width Part) is activated, or when the bandwidth part other than the dormant bandwidth part is activated, the UE operation is as follows.

One or a plurality of operations may be performed among the following operations if an instruction to activate a normal bandwidth part other than the normal bandwidth part (e.g., downlink bandwidth part) or dormant bandwidth part of the current cell (PCell or SCell) or an instruction to activate the cell is received with a DCI (L1 control signal) or MAC CE or RRC message of the PDCCH, or if an instruction to switch the bandwidth part (e.g., the downlink bandwidth part) to the active bandwidth part (or the bandwidth part not the dormant partial bandwidth) is received with the DCI (L1 control signal) of the PDCCH or the MAC CE or RRC message, or if the active bandwidth part of the currently active cell is a normal bandwidth part, or if the active bandwidth part of the currently active cell is not the dormant bandwidth part (in the case of receiving an indication with the L1 control signal of the PDCCH in the above, the indication may be received on the PDCCH of one’s own cell by self-scheduling, or the indication may be received on the PDCCH for the cell in the PCell by cross-carrier scheduling).

Switch to and activate the uplink or downlink bandwidth part indicated above. Alternatively, the uplink or downlink bandwidth part is switched to a designated bandwidth part (e.g., an uplink or uplink first activated bandwidth part) and the bandwidth part is activated.

In the activated bandwidth part, a sounding reference signal (SRS) is transmitted so that the base station may perform channel measurement for uplink. For example, the SRS may be transmitted periodically.

If PUCCH is configured in the activated bandwidth part, PUCCH transmission is performed.

Start or restart the bandwidth part or cell deactivation timer for the above. As another method, the bandwidth part or cell deactivation timer may be started or restarted only when the bandwidth part or cell dormancy timer is not set. In the above, if the bandwidth part or cell dormancy timer may be configured with the RRC message, when the timer expires, the bandwidth part or the cell may be dormancy. For example, the bandwidth part or cell deactivation timer may be started or restarted only in a dormant bandwidth part or cell.

If there is a type 1 configuration transmission resource that has been stopped in use, the stored type 1 transmission resource may be initialized and used as the original configuration. In the above, the type 1 configuration transmission resource is a periodic transmission resource (uplink or downlink) pre-allocated with an RRC message, and means a transmission resource that may be activated and used with an RRC message.

trigger a PHR for the bandwidth part.

In the activated bandwidth part, the UE may report a channel measurement result (CSI or CQI or PMI or RI or PTI or CRI, etc.) for downlink according to the base station configuration.

Monitor the PDCCH to read the indication of the base station in the activated bandwidth part.

Monitor the PDCCH to read the cross-scheduling for the activated bandwidth part.

Start or restart the bandwidth part deactivation timer in the above. As another method, the bandwidth part deactivation timer can be started or restarted only when the bandwidth part dormancy timer is not set. In the above, if the bandwidth part dormancy timer may be set with an RRC message, when the timer expires, the bandwidth part may be switched to dormancy or dormant bandwidth part. For example, the bandwidth part deactivation timer may be started or restarted only in the dormant bandwidth part.

If a link bandwidth part dormant timer is set for the bandwidth part

Start or restart the bandwidth part dormancy timer for the bandwidth part.

Among the UE operations for the normal bandwidth part other than the above-described dormant BWP or UE operations when the normal bandwidth part other than the dormant bandwidth part is activated, the downlink-related operation is called “downlink non-dormant operation” and the uplink-related operation is called “uplink non-dormant operation”.

According to an embodiment of the disclosure, the UE may receive an indicator (this is called as the “Dormancy Indicator”) indicating a dormant state for the secondary cell or an indicator indicating a bandwidth change as a dormant bandwidth part through L1 signaling from the base station.

It may consist of an N-bit bitmap, and each bit of the bitmap may correspond to one secondary cell or one secondary cell group consisting of a plurality of secondary cells.

The size of the bitmap may be the same as the number of configured secondary cells or secondary cell groups.

For example, if "0" is indicated as one bit value of the bitmap, the UE may change the cell state to the dormant state (or activate the dormant bandwidth part) for the secondary cell indicated by the corresponding bit or all secondary cells in the secondary cell group.

For example, if "1" is indicated as one bit value of the bitmap, the UE may change the cell state to the active state (or activating a bandwidth part other than the dormant bandwidth part, the UE may receive a bandwidth part other than the dormant bandwidth part from the base station through higher layer signaling) for all secondary cells in the secondary cell or secondary cell group indicated by the corresponding bit.

In an embodiment of the disclosure, the UE may receive the above-described dormancy indicator through a specific DCI format. That is, the above-described dormancy indicator may be delivered to the UE through a specific DCI format. The specific DCI format may correspond to a DCI format (non-scheduling DCI, for example, may correspond to DCI format 2_X (X=0, 1, 2, . . . )) that does not include scheduling information on data or a DCI format (scheduling DCI with scheduling information, for example, may correspond to DCI format 0_X or DCI format 1_X (X=0, 1, 2, . . . )) that may include scheduling information on data, or may correspond to a DCI format (scheduling DCI without scheduling information, for example, may correspond to DCI format 0_X or DCI format 1_X (X=0, 1, 2, . . . )) that may include scheduling information on data but does not actually include scheduling information.

According to an embodiment of the disclosure, in a case where a specific field value of the DCI format satisfies a specific condition, the UE may assume that the DCI format is a DCI format including the dormancy indicator field. For example, if the UE receive configuration of a search space set to monitor the PDCCH for a specific DCI format, and if the value of the frequency domain resource allocation field satisfies a specific condition A, the UE may regard the DCI format as a DCI format including a dormancy indicator field. The specific condition A may correspond to, for example, conditions including the following conditions.

[Condition A]

The resource allocation type (resourceAllocation) is set to type 0 (resourceAllocationType0), and all frequency domain resource allocation field values in the corresponding DCI format are '0', or The resource allocation type (resourceAllocation) is set to type 1 (resourceAllocationType1), and all frequency domain resource allocation field values in the corresponding DCI format are '1', or The resource allocation type (resourceAllocation) is set to dynamicSwitch (or equally set to both type 0 and type 1), and all frequency domain resource allocation field values in the corresponding DCI format are '0', or '1'

If it is determined that the DCI format includes the DCI format dormancy indicator field by satisfying the above-described condition A, a combination of specific fields in the corresponding DCI format may be assumed as the dormancy indicator field. For example, the UE may interpret the following fields as a dormancy indicator field.

[Field A]

Modulation and coding scheme

New data indicator

Redundancy version

HARQ process number

Antenna port(s)

DMRS sequence initialization

In this case, the UE may assume that each bit of the bitmap corresponding to the dormancy indicator field is sequentially mapped with the cell indices in ascending order (or in descending order) with respect to the secondary cells in which the dormant bandwidth part is configured, starting with the most significant bit (MSB) (or least significant bit (LSB)). For example, in a case where the above-described field A consists of a total of N bits and a dormant bandwidth part is set in a total of M secondary cells, starting from the first bit (or the last bit) of the N-bit bitmap, the indexes of the M secondary cells for which the dormant bandwidth part is configured for a total of M bits sequentially may be mapped respectively in ascending order (or in descending order) from the lowest index. In this case, if N>M, the UE may assume that '0' is indicated for all remaining N-M bits except for the M bits mapped with the indexes of the secondary cells. For example, in a case where the size of the bitmap corresponding to the above-described dormancy indicator field is 4 bits, and a dormant bandwidth part is set in a total of two secondary cells, cell #2, and cell #3, the UE may assume that the first bit is mapped to cell #2 and the second bit is mapped to cell #3 among the four bits, and may expect to receive the remaining third and fourth bits as '0' values.

In an embodiment of the disclosure, the bandwidth part operation of the UE may have the following characteristics in TDD.

In the case of TDD (or unpaired spectrum), when the downlink bandwidth part index and the uplink bandwidth part index are the same, the downlink bandwidth part having the index provided as the bandwidth part ID in the configured downlink bandwidth part set may be connected to the uplink bandwidth part having the index provided as the bandwidth part ID in the configured uplink bandwidth part set. When the downlink bandwidth part ID and the uplink bandwidth part ID are the same, the UE may not expect that the center frequency of the downlink bandwidth part is set differently from the center frequency of the uplink bandwidth part.

In an embodiment of the disclosure, the bandwidth part operation of the UE may have the following characteristics in TDD and FDD.

In TDD, if the UE receives an indicator for activating the downlink bandwidth part or the uplink bandwidth part through the downlink DCI or the uplink DCI, the UE may activate both the downlink bandwidth part and the uplink bandwidth part corresponding to the bandwidth part ID indicated by the corresponding DCI.

In FDD (or paired spectrum), if the UE receives a bandwidth part activation indicator through downlink DCI, the UE may activate the downlink bandwidth part corresponding to the bandwidth part ID indicated by the corresponding downlink DCI, and if the UE receives the bandwidth part activation indicator through uplink DCI, the UE may activate the uplink bandwidth part corresponding to the bandwidth part ID indicated by the corresponding uplink DCI.

According to an embodiment of the disclosure, the UE may receive a downlink dormant bandwidth part configured for the secondary cell, and may additionally receive an indicator for activating the downlink dormant bandwidth part through L1 signaling. The UE may receive the downlink dormant bandwidth part activation indicator at time point X, and may activate the downlink dormant bandwidth part at time point Y (>X) according to the command of the indicator. From the point in time when the downlink dormant bandwidth part of the corresponding secondary cell is activated, the UE may perform the above-described uplink dormant operation and downlink dormant operation for the corresponding secondary cell.

According to an embodiment of the disclosure, the relationship between time point X at which the UE receives an indicator for activating the downlink dormant bandwidth part, time point Y at which the UE activates the downlink dormant bandwidth part based on the received indicator, time point Z1 at which the UE performs the corresponding downlink dormant operation, and time point Z2 at which the UE performs uplink dormant operation, may follow the following characteristics. An operation corresponding to at least one or a combination of one or more of the following operations may be followed.

[Operation 1]

In the case of TDD, if the UE receives an indicator for activating the dormant bandwidth part in slot n, after slot $n+T_{bwp}$, the UE may activate the downlink dormant bandwidth part and the uplink bandwidth part having the same bandwidth part index as the corresponding downlink dormant bandwidth part. Here, $T_{bwp}$ may correspond to a bandwidth part change delay time (refer to Table 3) or a delay time required to activate a dormant bandwidth part. Subsequently, the UE may perform the above-described downlink dormant operation and uplink dormant operation from after slot $n+T_{bwp}$. In the case of TDD, because the downlink bandwidth part and the uplink bandwidth part are changed at the same time, the uplink and downlink dormant operation may also be performed at the same time.

[Operation 2]

In the case of FDD, the change of the downlink bandwidth part and the uplink bandwidth part may be performed independently. Accordingly, even if the downlink bandwidth part is changed to the dormant bandwidth part, the uplink bandwidth part may still be maintained as the currently active bandwidth part. Accordingly, in the case of FDD, when the downlink dormant bandwidth part is activated, it is necessary to determine from which time point the UE starts the uplink dormant operation. In addition, in FDD, subcarrier intervals of the downlink bandwidth part and the uplink bandwidth part may be set independently. Accordingly, in FDD, as the downlink dormant bandwidth part is activated, the time point of starting the uplink dormant operation may be determined by considering a delay time required for activating the downlink dormant bandwidth part and a set value for a subcarrier interval between the downlink bandwidth part and the uplink bandwidth part.

In the case of FDD, if the UE receives an indicator for activating the dormant bandwidth part in slot n through downlink DCI or DCI format 2_6, the UE may activate the downlink dormant bandwidth part after slot $n+T_{bwp}$. Here, $T_{bwp}$ may correspond to a bandwidth part change delay time (refer to Table 3) or a delay time required to activate a dormant bandwidth part. The UE may perform the above-described downlink dormant operation from after slot $n+T_{bwp}$ based on the downlink bandwidth part, and perform the above-described uplink dormant operation from after slot $f(n+T_{bwp})$ based on the uplink bandwidth part. Here, f(•) may correspond to a function using as parameters the subcarrier spacing setting of the downlink bandwidth part and the subcarrier spacing setting value of the uplink bandwidth part. For example, f(•) may correspond to at least one of the following equations.

$$f(n+T_{bwp}) = ciel\left((n+T_{bwp}) * 2^{\mu UL} / 2^{\mu DL}\right)$$

$$f(n+T_{bwp}) = \text{floor}\left((n+T_{bwp}) * 2^{\mu UL} / 2^{\mu DL}\right)$$

In the above equation, μUL and μDL may correspond to a subcarrier spacing setting configured in the uplink bandwidth part and a subcarrier spacing setting configured in the downlink bandwidth part, respectively.

[Operation 2-1]

In the case of FDD, the change of the downlink bandwidth part and the uplink bandwidth part may be performed independently. Accordingly, even if the downlink bandwidth part is changed to the dormant bandwidth part, the uplink bandwidth part may still be maintained as the currently active bandwidth part. Accordingly, in the case of FDD, when the downlink dormant bandwidth part is activated, if the UE has an uplink dormant bandwidth part configured, the UE needs to change the uplink dormant bandwidth part as well. In addition, in FDD, subcarrier intervals of the downlink bandwidth part and the uplink bandwidth part may be set independently. Accordingly, in FDD, as the downlink dormant bandwidth part is activated, the time point of activating the uplink dormant bandwidth part and the time point of starting the uplink dormant operation may be determined by considering a delay time required for activating the downlink dormant bandwidth part and a set value for a subcarrier interval between the downlink bandwidth part and the uplink bandwidth part.

In the case of FDD, if the UE receives an indicator for activating the dormant bandwidth part in slot n through downlink DCI or DCI format 2_6, the UE may activate the downlink dormant bandwidth part after slot $n+T_{bwp}$. Here, $T_{bwp}$ may correspond to a bandwidth part change delay time (refer to Table 3) or a delay time required to activate a dormant bandwidth part. The UE may perform the above-described downlink dormant operation from after slot $n+T_{bwp}$ based on the downlink bandwidth part. In addition, the UE may activate the uplink dormant bandwidth part and perform the above-described uplink dormant operation from after slot $f(n+T_{bwp})$ based on the uplink bandwidth part. Here, f(•) may correspond to a function using as parameters the subcarrier spacing setting of the downlink bandwidth part and the subcarrier spacing setting value of the uplink bandwidth part. For example, f(•) may correspond to at least one of the following equations.

$$f(n+T_{bwp}) = ciel\left((n+T_{bwp}) * 2^{\mu UL} / 2^{\mu DL}\right)$$

$$f(n+T_{bwp}) = \text{floor}\left((n+T_{bwp}) * 2^{\mu UL} / 2^{\mu DL}\right)$$

In the above equation, μUL and μDL may correspond to a subcarrier spacing setting configured in the uplink bandwidth part and a subcarrier spacing setting configured in the downlink bandwidth part, respectively.

According to an embodiment of the disclosure, in a case where the UE receives configuration of the downlink dormant bandwidth part for the secondary cell and the downlink dormant bandwidth part is activated and operates, the UE may receive an indicator for activating a downlink bandwidth part other than the downlink dormant bandwidth part through L1 signaling. For convenience of explanation, a bandwidth part that is not a dormant bandwidth part among downlink bandwidth parts configured to the UE is called a "non-dormant bandwidth part". For a secondary cell in which the dormant downlink bandwidth part is currently activated, the UE may receive a downlink non-dormant bandwidth part activation indicator for the secondary cell at time point X, and activate the downlink non-dormant bandwidth part at time Y (>X) according to the instruction of the indicator. From the point in time when the downlink non-dormant bandwidth part of the corresponding secondary cell is activated, the UE may perform the above-described uplink non-dormant operation and downlink non-dormant operation for the corresponding secondary cell.

According to an embodiment of the disclosure, the relationship between time point X at which the UE receives an indicator for activating the non-dormant bandwidth part for the secondary cell in which the dormant downlink bandwidth part is currently activated, time point Y at which the UE activates the downlink non-dormant bandwidth part based on the received indicator, time point Z1 at which the UE performs the corresponding downlink non-dormant operation, and time point Z2 at which the UE performs uplink non-dormant operation, may follow the following characteristics. An operation corresponding to at least one or a combination of one or more of the following operations may be followed.

[Operation 3]

In the case of TDD, if the UE receives an indicator for activating the non-dormant bandwidth part for the secondary cell in which the dormant downlink bandwidth part is activated in slot n, the UE may activate the downlink non-dormant bandwidth part and the uplink bandwidth part having the same bandwidth part index as the corresponding downlink non-dormant bandwidth part. Here, $T_{bwp}$ may correspond to a bandwidth part change delay time (refer to Table 3) or a delay time required to activate a dormant bandwidth part. Subsequently, the UE may perform the above-described downlink non-dormant operation and uplink non-dormant operation from after slot $n+T_{bwp}$. In the case of TDD, because the downlink bandwidth part and the uplink bandwidth part are changed at the same time, the uplink and downlink dormant operation may also be performed at the same time.

[Operation 4]

In the case of FDD, the change of the downlink bandwidth part and the uplink bandwidth part may be performed independently. Accordingly, even if the downlink bandwidth part is changed to the dormant bandwidth part, the uplink bandwidth part may still be maintained as the currently active bandwidth part. Accordingly, in the case of FDD, when the downlink dormant bandwidth part is activated, it is necessary to determine from which time point the UE starts the uplink dormant operation. In this case, as the downlink dormant bandwidth part is activated, the time point of starting the uplink dormant operation may be determined by considering a delay time required for activating the downlink dormant bandwidth part and a set value for a subcarrier interval between the downlink bandwidth part and the uplink bandwidth part.

In the case of FDD, if the UE receives an indicator for activating the non-dormant bandwidth part for the secondary cell in which the dormant downlink bandwidth part is activated in slot n through L1 signaling, the UE may activate the downlink non-dormant bandwidth part after slot $n+T_{bwp}$. Here, $T_{bwp}$ may correspond to a bandwidth part change delay time (refer to Table 3) or a delay time required to activate a dormant bandwidth part. The UE may perform the above-described downlink non-dormant operation from after slot $n+T_{bwp}$ based on the downlink bandwidth part, and perform the above-described uplink non-dormant operation from after slot $f(n+T_{bwp})$ based on the uplink bandwidth part. Here, f(•) may correspond to a function using as parameters the subcarrier spacing setting of the downlink bandwidth part and the subcarrier spacing setting value of the uplink bandwidth part. For example, f(•) may correspond to at least one of the following equations.

$$f(n+T_{bwp}) = ciel\left((n+T_{bwp}) * 2^{\mu UL} / 2^{\mu DL}\right)$$

$$f(n+T_{bwp}) = \text{floor}\left((n+T_{bwp}) * 2^{\mu UL} / 2^{\mu DL}\right)$$

In the above equation, μUL and μDL may correspond to a subcarrier spacing setting configured in the uplink bandwidth part and a subcarrier spacing setting configured in the downlink bandwidth part, respectively.

[Operation 4-1]

In the case of FDD, the change of the downlink bandwidth part and the uplink bandwidth part may be performed independently. Accordingly, even if the downlink bandwidth part is changed to the dormant bandwidth part, the uplink bandwidth part may still be maintained as the currently active bandwidth part. Accordingly, in the case of FDD, when the downlink dormant bandwidth part is activated, it is necessary to determine from which time point the UE starts the uplink dormant operation. In this case, as the downlink dormant bandwidth part is activated, the time point of starting the uplink dormant operation may be determined by considering a delay time required for activating the downlink dormant bandwidth part and a set value for a subcarrier interval between the downlink bandwidth part and the uplink bandwidth part.

In the case of FDD, if the UE receives an indicator for activating the non-dormant bandwidth part for the secondary cell in which the dormant downlink bandwidth part is activated in slot n through L1 signaling, the UE may activate the downlink non-dormant bandwidth part after slot $n+T_{bwp}$. Here, $T_{bwp}$ may correspond to a bandwidth part change delay time (refer to Table 3) or a delay time required to activate a dormant bandwidth part. The UE may perform the above-described downlink non-dormant operation from after slot $n+T_{bwp}$ based on the downlink bandwidth part. In addition, the UE may activate the uplink non-dormant bandwidth part from after slot $f(n+T_{bwp})$ based on the uplink bandwidth part and perform the above-described uplink non-dormant operation. Here, f(•) may correspond to a function using as parameters the subcarrier spacing setting of the downlink bandwidth part and the subcarrier spacing setting value of the uplink bandwidth part. For example, f(•) may correspond to at least one of the following equations.

$$f(n+T_{bwp}) = ciel\left((n+T_{bwp}) * 2^{\mu UL} / 2^{\mu DL}\right)$$

$$f(n+T_{bwp}) = \text{floor}\left((n+T_{bwp}) * 2^{\mu UL} / 2^{\mu DL}\right)$$

In the above equation, μUL and μDL may correspond to a subcarrier spacing setting configured in the uplink bandwidth part and a subcarrier spacing setting configured in the downlink bandwidth part, respectively.

Embodiment 2-1

According to an embodiment of the disclosure, the UE may receive configuration of a downlink dormant bandwidth part for the second cell (e.g., secondary cell), and additionally receive an indicator for activating the downlink dormant bandwidth part through L1 signaling (e.g., DCI). In this case, the base station may transmit an L1 signal including an indicator for activating the downlink dormant bandwidth part of the second cell to the UE in the first cell (e.g., primary cell or primary secondary cell). The UE may receive the downlink dormant bandwidth part activation indicator at time point X in the first cell, activate the downlink dormant bandwidth part of the second cell at time point Y (≥X) according to the instruction of the indicator, and accordingly, the UE may perform the above-described uplink dormant operation and downlink dormant operation for the corresponding second cell from a specific time point.

According to an embodiment of the disclosure, the relationship between time point X at which the UE receives an indicator for activating the downlink dormant bandwidth part in the first cell, time point Y at which the UE activates the downlink dormant bandwidth part of the second cell based on the received indicator, time point Z1 at which the UE performs the corresponding downlink dormant operation, and time point Z2 at which the UE performs uplink dormant operation, may be defined. In this case, in the method for determining the relationship between X, Y, Z1, and Z2, system parameters such as the subcarrier spacing (or numerology) of the first cell, the subcarrier spacing of the second cell, the slot format or configuration information on downlink and uplink in the slot, whether TDD or FDD, etc. may be comprehensively considered and determined.

Hereinafter, this will be described in detail.

In describing the disclosure, the indicator activating the dormant bandwidth part may include both control information for changing the non-dormant bandwidth part to the dormant bandwidth part and control information for changing the dormant bandwidth part to the non-dormant bandwidth part. Hereinafter, a case in which a non-dormant bandwidth part is changed to a dormant bandwidth part will be described as an example, and the following content may be equally or similarly applied to a case where the dormant bandwidth part is changed to a non-dormant bandwidth part.

[Operation 1—Operation in TDD]

According to an embodiment of the disclosure, if the UE receives an indicator activating the dormant bandwidth part in slot X of the first cell, the UE may complete activation of the dormant downlink bandwidth part or the uplink bandwidth part set to the same bandwidth part index as the dormant downlink bandwidth part at a time point not later than slot Y of the second cell. Thereafter, the UE may perform a downlink dormant operation from the downlink bandwidth part reference slot Z1 for the second cell, and may perform an uplink dormant operation from the uplink bandwidth part reference slot Z2. In this case, each Y, Z1, and Z2 values may be determined based on the parameters of the delay time required for bandwidth change or the delay time required to activate the dormant bandwidth part, slot format or configuration information on downlink and uplink within the slot, the subcarrier interval (μ1_DL) of the downlink bandwidth part of the first cell or the subcarrier interval of the PDCCH in which the dormant bandwidth part activation indicator is transmitted in the same way, the subcarrier spacing of the downlink bandwidth part of the second cell (μ2_DL), the subcarrier spacing of the uplink bandwidth part of the second cell (μ2_UL), etc. For example, the following methods may be considered.

[Method 1]

Assuming that the subcarrier interval μ2_DL of the downlink bandwidth part of the second cell is the reference subcarrier, the time point at which the UE operation is performed may be determined based on the calculated slot index. If the subcarrier interval is changed when changing from the non-dormant downlink bandwidth part to the dormant downlink bandwidth part, μ2_DL may follow the smaller value of the subcarrier interval of the bandwidth part before the change and the subcarrier interval of the bandwidth part after the change.

In a case where the slot in which the PDCCH including the dormant bandwidth part activation indicator is received is the first cell reference slot X, considering the ratio of the subcarrier interval μ1_DL of the first cell to the subcarrier interval μ2_DL of the second cell, a slot in which the PDCCH including the dormant bandwidth part activation indicator is received may be converted into a second cell reference time slot X'. For example, X and X' may have the following relationship.

$$X' = \text{floor}\left(X \cdot \left(2^{\mu 2\_DL} / 2^{\mu 1\_DL}\right)\right)$$

In the slot in which the PDCCH including the dormant bandwidth part activation indicator is received, the dormant downlink bandwidth part may be activated after a specific delay time ($T_{bwp}$) after the second cell reference time slot X'. Here. Tb, may correspond to a bandwidth part change delay time (refer to Table 3) or a delay time required to activate a dormant bandwidth part. For example, Y and X' may have the following relationship.

$$Y = X' + T_{BWP}$$

In the above, Y may correspond to the earliest time point at which the dormant downlink bandwidth part may be activated. In TDD, all or part of symbols constituting one slot may be set or indicated as a downlink symbol or an uplink symbol. Accordingly, the time when the dormant downlink bandwidth part is actually activated may correspond to the first downlink slot that exists immediately after the start point of the slot Y. For example, if slot Y corresponds to a slot configured as downlink, the slot in which the dormant downlink bandwidth part is activated may be the same as the slot Y, and if slot Y+N corresponds to the slot configured as the first downlink after slot Y, the slot in which the dormant downlink bandwidth part is activated may correspond to Y+N.

From the above-described slot Y, the UE may perform a downlink dormant operation and an uplink dormant operation. For example, Z1 and Z2 may have the following relationship.

$$Z1 = Y, Z2 = Y$$

As before, in TDD, depending on the configuration information of the downlink symbol or uplink symbol constituting the slot, there may be a substantial difference in the time at which the downlink dormant operation and the uplink dormant operation actually start. For example, the UE may perform a downlink dormant operation from the first downlink slot that exists immediately after the start point of slot Y. and perform an uplink dormant operation from the first uplink slot that exists immediately after the start point of slot Y.

[Method 2]

Assuming that the subcarrier interval μ2_DL of the downlink bandwidth part of the second cell is the reference subcarrier, the time point at which the UE operation is performed may be determined based on the calculated slot index. If the subcarrier interval is changed when changing from the non-dormant downlink bandwidth part to the dormant downlink bandwidth part. μ2_DL may follow the smaller value of the subcarrier interval of the bandwidth part before the change and the subcarrier interval of the bandwidth part after the change.

In a case where the slot in which the PDCCH including the dormant bandwidth part activation indicator is received is the first cell reference slot X, considering the ratio of the subcarrier interval μ1_DL of the first cell to the subcarrier interval μ2_DL of the second cell, a slot in which the PDCCH including the dormant bandwidth part activation indicator is received may be converted into a second cell reference time slot X'. For example, X and X' may have the following relationship.

$$X' = \text{floor}\left(X \cdot \left(2^{\mu 2\_DL} / 2^{\mu 1\_DL}\right)\right)$$

In the slot in which the PDCCH including the dormant bandwidth part activation indicator is received, the dormant downlink bandwidth part may be activated after a specific delay time ($T_{bwp}$) after the second cell reference time slot X'. Here, $T_{bwp}$ may correspond to a bandwidth part change delay time (refer to Table 3) or a delay time required to activate a dormant bandwidth part. For example, Y and X' may have the following relationship.

$$Y = X' + T_{BWP}$$

In the above, Y may correspond to the earliest time point at which the dormant downlink bandwidth part may be activated. In TDD, all or part of symbols constituting one slot may be set or indicated as a downlink symbol or an uplink symbol. Accordingly, the time when the dormant downlink bandwidth part is actually activated may correspond to the first downlink slot that exists immediately after the start point of the slot Y. For example, if slot Y corresponds to a slot configured as downlink, the slot in which the dormant downlink bandwidth part is activated may be the same as the slot Y, and if slot Y+N corresponds to the slot configured as the first downlink after slot Y, the slot in which the dormant downlink bandwidth part is activated may correspond to Y+N. That is, if the time point at which the dormant downlink bandwidth part is actually activated is defined as Y', Y may satisfy the following relationship.

$$Y' = Y + N \text{ where } N \geq 0$$

The time at which the UE performs the downlink dormant operation and the uplink dormant operation may be determined from the time when the dormant downlink bandwidth part is actually activated. That is, if the dormant downlink bandwidth part is activated in slot Y'=Y+N, the UE may perform a downlink dormant operation and an uplink dormant operation from slot Y'. For example, Z1 and Z2 may have the following relationship.

$$Z1 = Y', Z2 = Y'$$

Accordingly, the UE may still perform an uplink non-dormant operation instead of an uplink dormant operation for the uplink operation in the time interval between slot Y, which is the earliest time when the dormant downlink bandwidth part can be activated, and slot Y'=Y+N, which is the time when the dormant downlink bandwidth part is actually activated.

[Method 3]

Assuming that the subcarrier interval μ2_DL of the downlink bandwidth part or the subcarrier interval μ2_UL of the uplink bandwidth part of the second cell is the reference subcarrier, the time point at which the UE operation is performed may be determined based on the calculated slot index. One subcarrier spacing of μ2_DL or μ2_UL may be assumed as the reference subcarrier spacing μ2. For example, if the slot of the second cell corresponds to the downlink slot (or a slot set as a downlink symbol) at the slot X time point of the first cell at which the UE receives the PDCCH including the dormant bandwidth part activation indicator, μ2=μ2_DL may be assumed. Alternatively, if the slot of the second cell corresponds to the uplink slot (or a slot set as an uplink symbol) at the slot X time point of the first cell at which the UE receives the PDCCH including the dormant bandwidth part activation indicator, μ2=μ2_UL may be assumed.

If the subcarrier interval is changed when changing from the non-dormant downlink bandwidth part to the dormant downlink bandwidth part, if μ2=μ2_DL, μ2_DL may follow the smaller value of the subcarrier interval of the downlink bandwidth part before the change and the subcarrier interval of the downlink bandwidth part after the change, and if μ2=μ2_UL, μ2_UL may follow a small value among the subcarrier interval of the uplink bandwidth part having the same bandwidth part index as the downlink bandwidth part before the change and the subcarrier interval of the uplink bandwidth part having the same bandwidth part index as the downlink bandwidth part after the change.

In a case where the slot in which the PDCCH including the dormant bandwidth part activation indicator is received is the first cell reference slot X, considering the ratio of the subcarrier interval μ1_DL of the first cell to the subcarrier interval μ2_DL of the second cell, a slot in which the PDCCH including the dormant bandwidth part activation indicator is received may be converted into a second cell reference time slot X'. For example, X and X' may have the following relationship.

$$X' = \text{floor}\left(X \cdot \left(2^{\mu 2} / 2^{\mu 1\_DL}\right)\right)$$

In the slot in which the PDCCH including the dormant bandwidth part activation indicator is received, the dormant downlink bandwidth part may be activated after a specific delay time (Tb p) after the second cell reference time slot X'. Here, $T_{bwp}$ may correspond to a bandwidth part change delay time (refer to Table 3) or a delay time required to activate a dormant bandwidth part. For example, Y and X' may have the following relationship.

$$Y = X' + T_{BWP}$$

In the above, Y may correspond to the earliest time point at which the dormant downlink bandwidth part or the uplink bandwidth part to which the same bandwidth index as the dormant downlink bandwidth part is configured may be activated. In TDD, all or part of symbols constituting one slot may be set or indicated as a downlink symbol or an uplink symbol. Accordingly, the time when the dormant downlink bandwidth part is activated may correspond to the first downlink slot that exists immediately after the start point of the slot Y. Similarly, the time when the uplink bandwidth part to which the same bandwidth index as the dormant downlink bandwidth part is set is activated may correspond to the first uplink slot that exists immediately after the start point of slot Y.

From the above-described slot Y, the UE may perform a downlink dormant operation and an uplink dormant operation. For example, Z1 and Z2 may have the following relationship.

$$Z1 = Y, Z2 = Y$$

As before, in TDD, depending on the configuration information of the downlink symbol or uplink symbol constituting the slot, there may be a substantial difference in the time at which the downlink dormant operation and the uplink dormant operation actually start. For example, the UE may perform a downlink dormant operation from the first downlink slot that exists immediately after the start point of slot Y, and perform an uplink dormant operation from the first uplink slot that exists immediately after the start point of slot Y.

[Operation 2—Operation in FDD]

In the case of FDD, the change of the downlink bandwidth part and the uplink bandwidth part may be performed independently. Accordingly, even if the downlink bandwidth part is changed to the dormant downlink bandwidth part, the uplink bandwidth part may still be maintained as the currently active bandwidth part. Accordingly, in the case of FDD, when the dormant downlink bandwidth part is activated, it is necessary to determine from which time point the UE starts the uplink dormant operation. In this case, as the downlink dormant bandwidth part is activated, the time point of starting the uplink dormant operation may be determined by considering a delay time required for activating the downlink dormant bandwidth part and a set value for a subcarrier interval between the downlink bandwidth part and the uplink bandwidth part.

According to an embodiment of the disclosure, if the UE receives an indicator activating the dormant bandwidth part in slot X of the first cell, the UE may complete activation of the dormant downlink bandwidth part at a time point not later than slot Y of the second cell. Thereafter, the UE may perform a downlink dormant operation from the downlink bandwidth part reference slot Z1 for the second cell, and may perform an uplink dormant operation from the uplink bandwidth part reference slot Z2. In this case, each Y. Z1, and Z2 values may be determined based on the parameters of the delay time required for bandwidth change or the delay time required to activate the dormant bandwidth part, slot format or configuration information on downlink and uplink within the slot, the subcarrier interval (μ1_DL) of the downlink bandwidth part of the first cell or the subcarrier interval of the PDCCH in which the dormant bandwidth part activation indicator is transmitted in the same way, the subcarrier spacing of the downlink bandwidth part of the second cell (μ2_DL), the subcarrier spacing of the uplink bandwidth part of the second cell (μ2_UL), etc. For example, the following methods may be considered.

[Method 1]

Assuming that the subcarrier interval μ2_DL of the downlink bandwidth part of the second cell is the reference subcarrier, the time point at which the UE operation is performed may be determined based on the calculated slot index. If the subcarrier interval is changed when changing from the non-dormant downlink bandwidth part to the dormant downlink bandwidth part, μ2_DL may follow the smaller value of the subcarrier interval of the bandwidth part before the change and the subcarrier interval of the bandwidth part after the change.

In a case where the slot in which the PDCCH including the dormant bandwidth part activation indicator is received is the first cell reference slot X, considering the ratio of the subcarrier interval μ1_DL of the first cell to the subcarrier interval μ2_DL of the second cell, a slot in which the PDCCH including the dormant bandwidth part activation indicator is received may be converted into a second cell reference time slot X'. For example, X and X' may have the following relationship.

$$X' = \text{floor}(X \cdot (2\mu 2\_DL / 2\mu 1\_DL))$$

In the slot in which the PDCCH including the dormant bandwidth part activation indicator is received, the dormant downlink bandwidth part may be activated after a specific delay time ($T_{bwp}$) after the second cell reference time slot X'. Here, $T_{bwp}$ may correspond to a bandwidth part change delay time (refer to Table 3) or a delay time required to activate a dormant bandwidth part. For example, Y and X' may have the following relationship.

$$Y = X' + T_{BWP}$$

In FDD, unlike TDD, all slots correspond to downlink in the downlink band, and all slots correspond to uplink in the uplink band. Therefore, the UE can operate by activating the downlink bandwidth part from slot Y. Accordingly, the UE may perform a downlink dormant operation from slot Y. For example, Z1 may have the following relationship.

$$Z1 = Y,$$

In the case of FDD, even if the downlink bandwidth part is changed, the uplink bandwidth part is not changed but maintains the existing bandwidth part. In this case, it is necessary to define a time point at which the uplink dormant operation of the UE is performed. For example, the time point Z2 at which the uplink dormant operation is performed may coincide with the time point Y (=Z1) at which the downlink dormant operation starts because the downlink bandwidth part is activated. In this case, considering the ratio of the subcarrier spacing μ2_DL of the downlink bandwidth part of the second cell to the subcarrier spacing $\mu2\_UL$ of the downlink bandwidth part, Z2 and Y may satisfy the relationship. For example, it may have the following relationship.

$$Z2=\text{floor}\left(Y\cdot\left(2^{\mu2\_UL}/2^{\mu1\_DL}\right)\right)\text{ or }Z2=\text{floor}\left(Z1\cdot\left(2^{\mu2\_UL}/2^{\mu1\_DL}\right)\right)$$

Or $$Z2=ciel\left(Y\cdot\left(2^{\mu2\_UL}/2^{\mu1\_DL}\right)\right)\text{ or }Z2=ciel\left(Z1\cdot\left(2^{\mu2\_UL}/2^{\mu1\_DL}\right)\right)$$

The UE may perform an uplink dormant operation from the Z2 slot based on the uplink bandwidth part.

[Method 2]

Assuming that the subcarrier interval $\mu2\_DL$ of the downlink bandwidth part of the second cell is the reference subcarrier, the time point at which the UE operation is performed may be determined based on the calculated slot index. If the subcarrier interval is changed when changing from the non-dormant downlink bandwidth part to the dormant downlink bandwidth part, $\mu2\_DL$ may follow the smaller value of the subcarrier interval of the bandwidth part before the change and the subcarrier interval of the bandwidth part after the change.

In a case where the slot in which the PDCCH including the dormant bandwidth part activation indicator is received is the first cell reference slot X, considering the ratio of the subcarrier interval $\mu1\_DL$ of the first cell to the subcarrier interval $\mu2\_DL$ of the second cell, a slot in which the PDCCH including the dormant bandwidth part activation indicator is received may be converted into a second cell reference time slot X'. For example, X and X' may have the following relationship.

$$X'=\text{floor}\left(X\cdot\left(2^{\mu2\_DL}/2^{\mu1\_DL}\right)\right)$$

In the slot in which the PDCCH including the dormant bandwidth part activation indicator is received, the dormant downlink bandwidth part may be activated after a specific delay time ($T_{bwp}$) after the second cell reference time slot X'. Here, $T_{bwp}$ may correspond to a bandwidth part change delay time (refer to Table 3) or a delay time required to activate a dormant bandwidth part. For example, Y and X' may have the following relationship.

$$Y=X'+T_{BWP}$$

In FDD, unlike TDD, all slots correspond to downlink in the downlink band, and all slots correspond to uplink in the uplink band. Therefore, the UE can operate by activating the downlink bandwidth part from slot Y. Accordingly, the UE may perform a downlink dormant operation from slot Y. For example, Z1 may have the following relationship.

$$Z1=Y,$$

In the case of FDD, even if the downlink bandwidth part is changed, the uplink bandwidth part is not changed but maintains the existing bandwidth part. In this case, it is necessary to define a time point at which the uplink dormant operation of the UE is performed. For example, the time point Z2 at which the uplink dormant operation is performed may coincide with the time point Y (=Z1) at which the downlink dormant operation starts because the downlink bandwidth part is activated. In this case, considering the ratio of the subcarrier spacing $\mu2\_DL$ of the downlink bandwidth part of the second cell to the subcarrier spacing $\mu2\_UL$ of the downlink bandwidth part, Z2 and Y may satisfy the relationship. In this case, when $\mu2\_DL$ is greater than $\mu2\_UL$, a plurality of downlink slots may exist in a time interval corresponding to one uplink slot. In this case, the time point Y (=Z1) at which the downlink dormant operation starts may be located in the middle of a specific uplink slot. In this case, it may be impossible for the UE to perform an uplink dormant operation from the corresponding uplink slot. Accordingly, when $\mu2\_DL$ is greater than $\mu2\_UL$, it may be more preferable to define the uplink dormant operation from the slot immediately following the uplink slot overlapping the downlink slot.

As a method of determining Z2 in consideration of the above, $\mu2\_DL$ may be differently adjusted considering an additional offset according to the magnitude relation of $\mu2\_UL$. For example, it may be defined as follows.

If, $\mu2\_DL\le\mu2\_UL$, $Z2=\text{floor}(Y\cdot(2^{\mu2\_UL}/2^{\mu1\_DL}))$

Or $Z2=\text{floor}(Z1\cdot(2^{\mu2\_UL}/2^{\mu1\_DL}))$

Or $Z2=\text{ceil}(Y\cdot(2^{\mu2\_UL}/2^{\mu1\_DL}))$

Or $Z2=\text{ceil}(Z1\cdot(2^{\mu2\_UL}/2^{\mu1\_DL}))$

If, $\mu2\_DL>\mu2\_UL$, $Z2=\text{floor}(Y\cdot(2^{\mu2\_UL}/2^{\mu1\_DL}))+d$

Or $Z2=\text{floor}(Z1\cdot(2^{\mu2\_UL}/2^{\mu1\_DL}))+d$

Or $Z2=\text{ceil}(Y\cdot(2^{\mu2\_UL}/2^{\mu1\_DL}))+d$

Or $Z2=\text{ceil}(Z1\cdot(2^{\mu2\_UL}/2^{\mu1\_DL}))+d$ for example, d=1 slot

Embodiment 2-2

According to an embodiment of the disclosure, if the UE receives a specific DCI format indicating to change the non-dormant bandwidth part to the dormant bandwidth part (or the dormant bandwidth part to the non-dormant bandwidth part), a transmission or reception operation of the UE may be restricted during a specific time period. More specifically, if the UE receives a specific DCI format indicating a change between the non-dormant bandwidth part and the dormant bandwidth part, the UE may not be required to perform transmission or reception during a time period from the end of the X-th (e.g., X=3) symbol of the slot in which the PDCCH including the corresponding DCI format is received in the first cell to the start point of the slot Y in which the dormant or non-dormant downlink bandwidth part is activated. Here, the slot Y in which the downlink bandwidth part is activated may correspond to a slot in which the bandwidth part change delay time or the delay time for the dormant bandwidth part activation is considered as described above. By limiting the transmission and reception of the UE, it is possible to secure time for the UE to perform an operation for changing to a non-dormant or dormant bandwidth part.

Embodiment 2-3

According to an embodiment of the disclosure, if the UE receives an indicator activating the dormant bandwidth part in slot X of the first cell, the UE may complete activation of the dormant downlink bandwidth part at a time point not later than slot Y of the second cell. Thereafter, the UE may perform a downlink dormant operation from the downlink bandwidth part reference slot Z1 for the second cell, and may perform an uplink dormant operation from the uplink bandwidth part reference slot Z2. In this case, it may take more than a certain amount of time for the UE to perform processing such as reception and decoding of a PDCCH in which an indicator for activating the dormant bandwidth part of the first cell is transmitted. The time point Z2 at which the UE performs the uplink dormant operation may include a time interval corresponding to slot X of the first cell in which the PDCCH in which the dormant bandwidth part activation indicator is transmitted is transmitted, depending on the case. In this case, it is difficult for the UE to determine whether the uplink dormant operation is performed from the uplink slot at the time point before determining the content of the dormant bandwidth part indicator by completing the decoding of the PDCCH. Accordingly, even if the UE needs to perform the uplink dormant operation from slot Z2, there may be a period in which the uplink dormant operation cannot be performed for some time intervals considering the processing time required for PDCCH decoding of the UE. In consideration of this, the time period during which the uplink dormant operation of the UE is performed may be limited to the remaining time period except for the specific time ($T_{proc}$) in the slot Z2.

Based on the above description, the following UE operation may be defined.

[Operation]

If the UE receives the DCI format indicating activation of the dormant bandwidth part in the first cell in slot X, the UE may not perform an uplink dormant operation for a time corresponding to symbols corresponding to the $T_{proc}$ time from the last symbol of the control resource set that has received the DCI format (or it may not be expected to perform an uplink dormant operation).

In the above operation, $T_{proc}$ may correspond to the processing capability of the UE, and the UE may notify the base station of the $T_{proc}$ capability through higher layer signaling.

In the above operation, $T_{proc}$ may correspond to one of the following processing times.

PDCCH processing time

PUSCH preparation time

The PUSCH preparation time ($T_{proc,2}$) may be defined as follows. If $T_{proc}=T_{proc,2}$, the subcarrier interval μ for defining $T_{proc,2}$ may be defined in consideration of μ1_DL and μ2_UL. For example, μ may correspond to a smaller value among μ1_DL and μ2_UL. In addition, when $T_{proc}=T_{proc,2}$, it may be assumed that the parameter $d_{2,1}=1$ for defining $T_{proc,2}$.

TABLE 17

| |
|---|
| If the first uplink symbol in the PUSCH allocation for a transport block, including the DM-RS, as defined by the slot offset K2 and the start and length indicator SLIV of the scheduling DCI and including the effect of the timing advance, is no earlier than at symbol L2, where L2 is defined $T_{proc,2} = \max((N_2 + d_{2,1})(2048 + 144) \cdot \kappa 2^{-\mu} \cdot T_C, d_{2,2})$ as the next uplink symbol with its CP starting after the end of the reception of the last symbol of the PDCCH carrying the DCI scheduling the PUSCH, then the UE shall transmit the transport block, $N_2$ is based on μ of Table 6.4-1 and Table 6.4-2 for UE processing capability 1 and 2 respectively, where u corresponds to the one of ($\mu_{DL}$, $\mu_{UL}$) resulting with the largest $T_{proc,2}$, where the $\mu_{DL}$ corresponds to the subcarrier spacing of the downlink with wnch the PDCCH carrying the DCI scneduling the PUSCH was transmitted and $\mu_{UL}$ corresponds to the subcarrier spacing of the uplink channel with which the PUSCH is to be transmitted, and κ is defined in subclause 4.1 of [4, TS 38.211]. |
| If the first symbol of the PUSCH allocation consists of DM-RS only, then $d_{2,1} = 0$, otherwise $d_{2,1} = 1$. |
| If the UE is configured with multiple active component carriers, the first uplink symbol in the PUSCH allocation further includes the effect of timing difference between component carriers as given in [11, TS 38.133]. |
| If the scheduling DCI triggered a switch of BWP, $d_{2,2}$ equals to the switching time as defined in [11, TS 38.133], otherwise $d_{2,2} = 0$. |
| For a UE that supports capability 2 on a given cell, the processing time according to UE processing capability 2 is applied if the high layer parameter processingType2Enabled in PUSCH-ServingCellConfig is configured for the cell and set to enable, |
| if the PUSCH indicated by the DCI is overlapping with one or more PUCCH channels, then the transport block is multiplexed following the procedure in subclause 9.2.5 of [9, TS 38.213], otherwise the transport block is transmitted on the PUSCH indicated by the DCI. |
| Otherwise the UE may ignore the scheduling DCI. |
| The value of $T_{proc,2}$ is used both in the case of normal and extended cyclic prefix. |

TABLE 6.4-1

| PUSCH preparation time for PUSCH timing capability 1 | |
|---|---|
| μ | PUSCH preparation time $N_2$ [symbols] |
| 0 | 10 |
| 1 | 12 |
| 2 | 23 |
| 3 | 36 |

TABLE 6.4-2

| PUSCH preparation time for PUSCH timing capability 2 | |
|---|---|
| μ | PUSCH preparation time $N_2$ [symbols] |
| 0 | 5 |
| 1 | 5.5 |
| 2 | 11 for frequency range 1 |

Embodiment 2-4

According to an embodiment of the disclosure, if the UE receives an indicator activating the dormant bandwidth part in slot n of the first cell, the UE may complete activation of the dormant downlink bandwidth part at a time point not later than slot of the second cell. More specifically, if an indicator for activating the dormant bandwidth part is received in slot n of the first cell, the UE may activate the dormant downlink bandwidth part from the first slot existing after the time interval corresponding to $T_{dormantBWPswitchDealy}$ from the start time of slot n and perform the downlink dormant operation. That is, the slot n may correspond to the first slot existing after the time period corresponding to $T_{dormantBWPswitchDealy}$ from the start time of the slot n. In this case, $T_{dormantBWPswitchDealy}$ may be specifically determined as follows.

TABLE 18

| |
|---|
| If the BWP switch is triggered within or outside DRX active time, and one of the two BWPS in a BWP switching is a dormant BWP [TS 38.321, 7], UE shall be able to complete active BWP switching within $T_{dormantBWPswitchDelay} = T_{BWPswitchDelay} + X$, provided that the dormancy indication is received in any of the first 3 OFDM symbols of a slot in the serving cell where DCI for dormancy indication is received, or $T_{dormantBWPswitchDelay} = T_{BWPswitchDelay} + X + Z$, provided that the dormancy indication is received after the first 3 OFDM symbols of a slot in the serving cell where DCI for dormancy indication is received, where $T_{BWPswitchDelay}$ is defined in Table 8.6.2-1 corresponding to the smaller value between the SCS of the serving cell where UE receives dormancy indication and the SCS of the serving cell where BWP switching occurs; X=1 slot corresponding to the smaller value between the SCS of the serving cell where UE receives dormancy indication and the SCS of the serving cell where BWP switching occurs. Z=1 slot corresponding to the SCS of the serving cell where UE receives dormancy indication. |

TABLE 8.6.2-1

BWP switch delay

| μ | NR Slot length (ms) | BWP switch delay $T_{BWPswitchDelay}$ (slots) Type 1[Note 1] | Type 2[Note 1] |
|---|---|---|---|
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the smaller SCS between the SCS before BWP switch and the SCS after BWP switch.

If the UE detects the DCI format including the dormant state indicator (or an indicator indicating activation or deactivation of the downlink dormant bandwidth part of the second cell in the same way) for the second cell in slot n, the UE may not perform transmission or reception during the time period corresponding to the bandwidth part change delay time required for the previously defined dormant bandwidth part change. In this case, it may take a certain amount of time or more for the UE to receive and decode the PDCCH in which the DCI format including the dormant state indicator is transmitted. Accordingly, if there is an uplink transmission that the UE is performing in slot n, it may be difficult to immediately stop the corresponding uplink transmission. Therefore, the UE may maintain the uplink transmission at the time as it is before determining the contents of the dormant bandwidth part indicator by completing the decoding of the PDCCH, and may stop transmission for uplink transmission at a time point after the UE completes decoding of the PDCCH and determines the contents of the dormant bandwidth part indicator. In consideration of this, the time period during which uplink transmission of the UE is stopped may be limited to the remaining time period except for a specific time (e.g., a specific time $T_{proc}$ related to processing time) in slot n. Based on the above description, the following UE operation may be defined.

[Operation]

If the UE detects a DCI format including a dormant state indicator indicating a change in a downlink bandwidth part for the second cell (e.g., a secondary cell) in slot n of the first cell, The UE may not perform transmission or reception during the time period corresponding to the delay time according to the change of the dormant state.

The UE may not stop transmission for uplink transmission (e.g., SRS transmission, PUCCH transmission, PUSCH transmission, and RACH transmission) in symbols within a specific time interval within slot n. Here, the specific time interval may be related to the processing time $T_{proc}$. For example, the specific time interval may correspond to a time interval from the last symbol of the control resource set in which the UE receives the DCI format to the $T_{proc}$ time. In this case, $T_{proc}$ may correspond to the time for the parameter p associated with a particular subcarrier interval, and here, p may be determined to be a smaller value among the subcarrier spacing μ1 of the PDCCH through which the corresponding DCI format is transmitted and the subcarrier spacing μ2 for uplink transmission (e.g., SRS transmission, PUCCH transmission, PUSCH transmission, and RACH transmission).

The above operation may be expressed as follows.

TABLE 19

If a UE detects a DCI format with SCell dormancy indication that indicates an active DL BWP change for an Scell in slot n of primary cell,
the UE is not required to receive or transmit in the SCell during a time duration specified in [10, TS 38.133].
- the UE does not expect to cancel the transmission of the SRS, or the PUCCH, or the PUSCH, or the PRACH in symbols from the set of symbols in the slot, if any, starting before a symbol that is after the PUSCH preparation time $T_{proc,2}$ for the corresponding PUSCH timing capability [6, TS 38.214] assuming $d_{2,1} = 1$ after a last symbol of a CORESET where the UE detect the DCI format and μ corresponds to the smallest SCS configuration between the SCS configuration of the PDCCH carrying the DCI format and the SCS configuration of the SRS, PUCCH, PUSCH or $\mu_r$, where $\mu_r$ corresponds to the SCS configuration of the PRACH if it is 15kHz or higher; otherwise $\mu_r = 0$.

The above operation may be limitedly applied to FDD.

In the above operation, $T_{proc}$ may correspond to the processing capability of the UE, the UE may notify the base station of the $T_{proc}$ capability through higher layer signaling. In the above operation. $T_{proc}$ may correspond to one of the following processing times, PDCCH processing time PUSCH preparation time The PUSCH preparation time ($T_{proc,2}$) may be defined as follows. If $T_{proc}=T_{proc,2}$, the subcarrier interval μ for defining $T_{proc,2}$ may be defined in consideration of μ1_DL and μ2_UL. For example, μ may correspond to a smaller value among μ1_DL and μ2_UL. In addition, when $T_{proc}=T_{proc,2}$ it may be assumed that the parameter $d_{2,1}=1$ for defining $T_{proc,2}$.

TABLE 20

If the first uplink symbol in the PUSCH allocation for a transport block, including the DM-RS, as defined by the slot offset $K_2$ and the start and length indicator SLIV at the scheduling DCI and including the effect of the timing advance, is no earlier than at symbol $L_2$, where $L_2$ is defined as the next uplink symbol with its CP starting $T_{proc,2} = \max((N_2 + d_{2,1})(2048 + 144) \cdot \kappa 2^{-\mu} \cdot T_C, d_{2,2})$ after the end of the reception of the last symbol of the PDCCH carrying the DCI scheduling the PUSCH, then the UE shall transmit the transport block.
$N_2$ is based on μ of Table 6.4-1 and Table 6.4-2 for UE processing capability 1 and 2 respectively, where μ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and k is defined in subclause 4.1 of [4, TS 38.211].
If the first symbol of the PUSCH allocation consists of DM-RS only, TABLE 20-continued

|  |
|---|
| then $d_{2,1}$ = 0, otherwise $d_{2,1}$ = 1. If the UE is configured with multiple active component carriers, the first uplink symbol in the PUSCH allocation further includes the effect of timing alfference between component carriers as given in [11, TS 38.133] . If the scheduling DCI triggered a switch of BWP, $d_{2,2}$ equals to the switching time as defined in [11, TS 38.133], otherwise $d_{2,2}$ = 0. For a UE that supports capability 2 on a given cell, the processing time according to UE processing capability 2 is applied if the high layer parameter processingType2Enabled in PUSCH-ServingCellConfig is configured for the cell and set to enable, if the PUSCH indicated by the DCI is overlapping with one or more PUCCH channels, then the transport block is multiplexed following the procedure in subclause 9.2.5 of [9, TS 38.213], otherwise the transport block is transmitted on the PUSCH indicated by the DCI. Otherwise the UE may ignore the scheduling DCI. The value of $T_{proc,2}$ is used both in the case of normal and extended cyclic prefix. |

TABLE 6.4-1

| PUSCH preparation for for PUSCH timing capability 1 | |
|---|---|
| μ | PUSCH preparation time $N_2$ [symbols] |
| 0 | 10 |
| 1 | 12 |
| 2 | 23 |
| 3 | 36 |

TABLE 6.4-2

| PUSCH preparation time for PUSCH timing capability 2 | |
|---|---|
| μ | PUSCH preparation time $N_2$ [symbols] |
| 0 | 5 |
| 1 | 5.5 |
| 2 | 11 for frequency range 1 |

The above-described first embodiment, embodiment 1-1, embodiment 1-2, embodiment 1-3, embodiment 1-4, embodiment 1-5, embodiment 1-6, second embodiment, embodiment 2-1, embodiment 2-2, embodiment 2-3, and embodiment 2-4 may be implemented in combination with each other.

Figure 11:
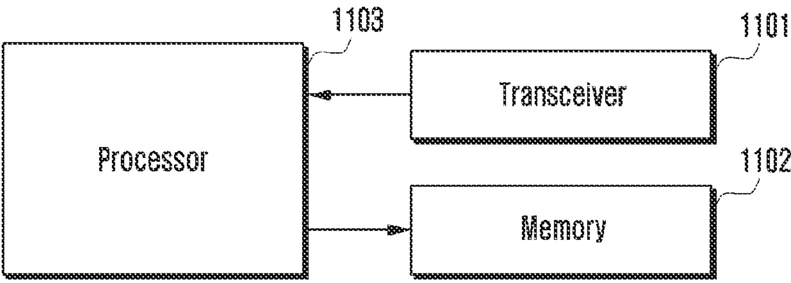
FIG. 11 is a block diagram illustrating an internal structure of a UE according to an embodiment of the disclosure.

FIG. 11 is a block diagram illustrating a structure of a UE according to an embodiment of the disclosure.

Referring to FIG. 11, the UE may include a transceiver 1101, a memory 1102, and a processor 1 103. However, the components of the UE are not limited to the above-described example. For example, the UE may include more or fewer components than the above-described components. In addition, at least some or all of the transceiver 1101, the memory 1102, and the processor 1103 may be implemented in the form of a single chip.

In an embodiment, the transceiver 1101 may transmit/receive a signal to/from a base station. The above-described signal may include control information and data. To this end, the transceiver 1101 may include an RF transmitter that up-converts and amplifies a frequency of a transmitted signal, and an RF receiver that low-noise amplifies and down-converts a received signal. In addition, the transceiver 1101 may receive a signal through a wireless channel and output the signal to the processor 1103, and transmit the signal output from the processor 1103 through a wireless channel.

In an embodiment, the memory 1102 may store programs and data necessary for the operation of the UE. In addition, the memory 1102 may store control information or data included in a signal transmitted and received by the UE. The memory 1102 may be configured as a storage medium or a combination of storage media, such as ROM, RAM, hard disk, CD-ROM, and DVD. In addition, the memory 602 may be composed of a plurality of memories. According to an embodiment, the memory 602 may store a program for executing an operation for power saving of the UE.

In an embodiment, the processor 1103 may control a series of processes in which the UE may operate according to the above-described embodiments of the disclosure. In one embodiment, the processor 1103 may receive WU configuration information from the base station by executing the program stored in the memory 1102, monitor a physical downlink control channel, (PDCCH) based on the POSS configuration information, receive the POSS from the base station through the downlink control channel, and control to wake up based on the POSS.

Figure 12:
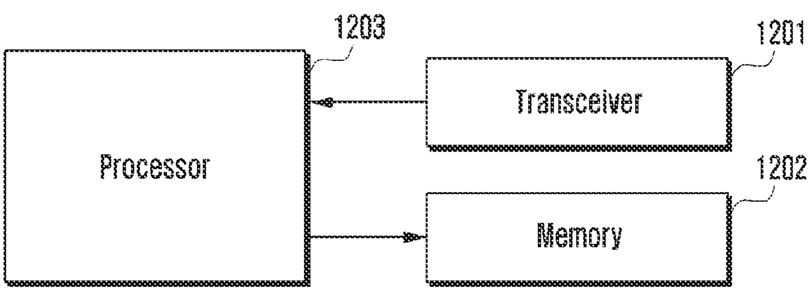
FIG. 12 is a block diagram illustrating an internal structure of a base station according to an embodiment of the disclosure.

FIG. 12 is a block diagram illustrating a structure of a base station according to an embodiment of the disclosure.

Referring to FIG. 12, the base station may include a transceiver 1201, a memory 1202, and a processor 1203. However, the components of the base station are not limited to the above-described example. For example, the UE may include more or fewer components than the above-described components. In addition, the transceiver 1201, the memory 1202, and the processor 1203 may be implemented in the form of a single chip.

In an embodiment, the transceiver 1201 may transmit/receive a signal to/from a UE. The above-described signal may include control information and data. To this end, the transceiver 1201 may include an RF transmitter that up-converts and amplifies a frequency of a transmitted signal, and an RF receiver that low-noise amplifies and down-converts a received signal. In addition, the transceiver 1201 may receive a signal through a wireless channel and output the signal to the processor 1203, and transmit the signal output from the processor 1203 through a wireless channel.

In an embodiment, the memory 1202 may store programs and data necessary for the operation of the UE. In addition, the memory 1202 may store control information or data included in a signal transmitted and received by the UE. The memory 1202 may be configured as a storage medium or a combination of storage media, such as ROM, RAM, hard disk, CD-ROM, and DVD. In addition, the memory 1202 may be composed of a plurality of memories. According to an embodiment, the memory 1202 may store a program for executing an operation for power saving of the UE.

In an embodiment, the processor 1203 may control a series of processes in which the base station may operate according to the above-described embodiments of the disclosure. In one embodiment, the processor 1203 may transmit the POSS configuration information to the UE by executing the program stored in the memory 1202, may transmit the POSS to the UE through the downlink control channel based on the POSS configuration information, and control to transmit control information to the UE through a downlink control channel based on the POSS.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. Further, the embodiments of the disclosure may be applied to other communication systems, and other variants based on the technical idea of the embodiments may also be implemented. For example, the embodiments may be applied to LTE, 5G. NR, or other systems.

The invention claimed is:

1. A method for a user equipment (UE) to control power in a wireless communication system, the method comprising:

receiving, from a base station, discontinuous reception (DRX) configuration information including first DRX group configuration information of a first DRX group and second DRX group configuration information of a second DRX group, wherein the first DRX group corresponds to a first cell group and the second DRX group corresponds to a second cell group;

receiving, from the base station, power saving signal (POSS) configuration information including configuration information of a physical downlink control channel (PDCCH) for a POSS;

identifying whether a time domain of active time determined based on the DRX configuration information and the POSS configuration information overlaps a monitoring occasion for the PDCCH determined based on the POSS configuration information and the monitoring occasion for the PDCCH is associated with the first DRX group; and determining whether the UE monitors the PDCCH for the POSS in the monitoring occasion based on the identified result, wherein the UE does not monitor the PDCCH in the monitoring occasion for the POSS for any cell included in the first DRX group, in case that the monitoring occasion for the first DRX group overlaps the active time, and wherein the active time is time for the UE to monitor the PDCCH in any cell included in the first DRX group or the second DRX group.

2. The method of claim 1, wherein the UE monitors the PDCCH for the POSS in the monitoring occasion for any cell included in the first DRX group in case that the monitoring occasion for the first DRX group does not overlap the active time.

3. The method of claim 1, wherein the first DRX group configuration information and the second DRX group configuration information include DRX cycle information on a cycle in which the UE monitors the PDCCH, or information on a value of a DRX timer including at least one of drx-onDurationTimer, drx-InactivityTimer, drx-RetransmissionTimerDL, drx-RetransmissionTimerUL, or ra-ContinenceResolutionTime, and wherein the first DRX group is a group including a primary cell (pcell), and the second DRX group is a group that does not include the primary cell.

4. The method of claim 2, wherein the preset operation is one of maintaining the same value of the DRX timer, starting drx-onDurationTimer, or not starting drx-onDurationTimer with respect to the active time of the first DRX group or the second DRX group that arrives after the monitoring occasion.

5. A method for a base station to control power of a user equipment (UE) in a wireless communication system, the method comprising:

transmitting, to the UE, discontinuous reception (DRX) configuration information including first DRX group configuration information of a first DRX group and second DRX group configuration information of a second DRX group, wherein the first DRX group corresponds to a first cell group and the second DRX group corresponds to a second cell group;

transmitting, to the UE, power saving signal (POSS) configuration information including configuration information of a physical downlink control channel (PDCCH) for a POSS;

identifying whether a time domain of active time determined based on the DRX configuration information and the POSS configuration information overlaps a monitoring occasion for the PDCCH determined based on the POSS configuration information and the monitoring occasion for the PDCCH is associated with the first DRX group; and determining whether to transmit the PDCCH to the UE in the time domain in which the time domain of the active time overlaps the monitoring occasion based on the identified result, wherein the PDCCH is not transmitted in the monitoring occasion, in case that the monitoring occasion overlaps the active time, wherein the active time is time for a UE to monitor the PDCCH in any cell included in the first DRX group or the second DRX group.

6. The method of claim 5, wherein the PDCCH is transmitted in the monitoring occasion, in case that the monitoring occasion for the first DRX group does not overlap the active time.

7. The method of claim 5, wherein the first DRX group configuration information and second DRX group configuration information include DRX cycle information on a cycle in which the UE monitors the PDCCH, or information on a value of a DRX timer including at least one of drx-onDurationTimer, drx-InactivityTimer, drx-RetransmissionTimerDL, drx-RetransmissionTimerUL, or ra-ContinenceResolutionTime, and wherein the first DRX group is a group including a primary cell (pcell), and the second DRX group is a group that does not include the primary cell.

8. A user equipment (UE) for controlling power in a wireless communication system, the UE comprising:

a transceiver; and a controller configured to:

receive, from the base station, discontinuous reception (DRX) configuration information including first DRX group configuration information of a first DRX group and second DRX group configuration information of a second DRX group, wherein the first DRX group corresponds to a first cell group and the second DRX group corresponds to a second cell group, receive, from the base station, power saving signal (POSS) configuration information including configuration information of a physical downlink control channel (PDCCH) for a POSS, identify whether a time domain of active time determined based on the DRX configuration information and the POSS configuration information overlaps a monitoring occasion for the PDCCH determined based on the POSS configuration information and the monitoring occasion for the PDCCH is associated with the first DRX group, and control the UE to determine whether the UE monitors the PDCCH for the POSS in the monitoring occasion based on the identified result, wherein the UE does not monitor the PDCCH in the monitoring occasion for any cell included in the first DRX group, in case that the monitoring occasion for the first DRX group overlaps the active time, wherein the active time is time for the UE to monitor the PDCCH in any cell included in the first DRX group or the second DRX group.

9. The UE of claim 8, wherein the controller is configured to:

control the UE to monitor the PDCCH for the POSS in the monitoring occasion in case that the monitoring occasion for the first DRX group does not overlap with the active time.

10. The UE of claim 8, wherein the first DRX group configuration information and second DRX group configuration information include DRX cycle information on a cycle in which the UE monitors the PDCCH, or information on a value of a DRX timer including at least one of drx-onDurationTimer, drx-InactivityTimer, drx-RetransmissionTimerDL, drx-RetransmissionTimerUL, or ra-ContinenceResolutionTime, and wherein the first DRX group is a group including a primary cell (pcell), and the second DRX group is a group that does not include the primary cell.

11. The UE of claim 9, wherein the preset operation is one of maintaining the same value of the DRX timer, starting drx-onDurationTimer, or not starting drx-onDurationTimer with respect to the active time of the first DRX group or the second DRX group that arrives after the monitoring occasion.

12. A base station in a wireless communication system, the base station comprising:

a transceiver; and a controller configured to:

perform controlling to transmit, to a user equipment (UE), discontinuous reception (DRX) configuration information including first DRX group configuration information of a first DRX group and second DRX group configuration information of a second DRX group, wherein the first DRX group corresponds to a first cell group and the second DRX group corresponds to a second cell group, transmit, to the UE, power saving signal (POSS) configuration information including configuration information of a physical downlink control channel (PDCCH) on a POSS, identify whether a time domain of active time determined based on the DRX configuration information and the POSS configuration information overlaps a monitoring occasion for the PDCCH determined based on the POSS configuration information and the monitoring occasion for the PDCCH is associated with the first DRX group, and determine whether to transmit the PDCCH to the UE in the time domain in which the time domain of the active time and the monitoring occasion overlap based on the identified result, wherein the base station does not transmit the PDCCH in the monitoring occasion in case that the monitoring occasion overlaps the active time, wherein the active time is time for a UE to monitor the PDCCH in any cell included in the first DRX group or the second DRX group.

13. The base station of claim 12, wherein the controller is configured to perform controlling:

to transmit the PDCCH in the monitoring occasion in case that the monitoring occasion for the first DRX group does not overlap the active time.

14. The base station of claim 12, wherein the first DRX group configuration information and second DRX group configuration information include DRX cycle information on a cycle in which the UE monitors the PDCCH, or information on a value of a DRX timer including at least one of drx-onDurationTimer, drx-InactivityTimer, drx-RetransmissionTimerDL, drx-RetransmissionTimerUL, or ra-ContinenceResolutionTime, and wherein the first DRX group is a group including a primary cell (pcell) and the second DRX group is a group that does not include the primary cell.

* * * * *